(12) United States Patent
Jundt et al.

(10) Patent No.: US 10,528,037 B2
(45) Date of Patent: Jan. 7, 2020

(54) DETERMINING DEVICE SYSTEM TAGS FOR COMMISSIONING PORTIONS OF A DISCONNECTED PROCESS CONTROL LOOP

(71) Applicant: FISHER-ROSEMOUNT SYSTEMS, INC., Round Rock, TX (US)

(72) Inventors: Larry O. Jundt, Round Rock, TX (US); Cristopher Ian S. Uy, Metro Manila (PH); Deborah R. Colclazier, Round Rock, TX (US); Sergio Diaz, Pflugerville, TX (US); Gary K. Law, Georgetown, TX (US); Julian K. Naidoo, Cedar Park, TX (US); Daniel R. Strinden, Austin, TX (US); Kent A. Burr, Rond Rock, TX (US); Neil J. Peterson, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/313,030

(22) PCT Filed: Oct. 12, 2016

(86) PCT No.: PCT/US2016/056598
§ 371 (c)(1),
(2) Date: Nov. 21, 2016

(87) PCT Pub. No.: WO2017/066294
PCT Pub. Date: Apr. 20, 2017

(65) Prior Publication Data
US 2018/0210429 A1    Jul. 26, 2018

Related U.S. Application Data

(60) Provisional application No. 62/240,084, filed on Oct. 12, 2015.

(51) Int. Cl.
*H04L 12/24* (2006.01)
*G05B 19/418* (2006.01)
(Continued)

(52) U.S. Cl.
CPC ..... *G05B 19/4185* (2013.01); *G05B 19/0423* (2013.01); *G05B 19/414* (2013.01);
(Continued)

(58) Field of Classification Search
CPC ............ G05B 19/4185; G05B 19/0423; G05B 19/414; G05B 19/4183; G05B 19/4186;
(Continued)

(56) References Cited

U.S. PATENT DOCUMENTS 5,970,430 A    10/1999    Burns et al.
6,098,116 A    8/2000    Nixon et al.
(Continued)

OTHER PUBLICATIONS

"DeltaV™ CHARMs Commissioning," Emerson Process Management (Jan. 2013), 27 pages.
(Continued)

*Primary Examiner* — Jason D Mitchell
(74) *Attorney, Agent, or Firm* — Marshall, Gerstein & Borun LLP

(57) ABSTRACT

A system tag identifying a device of a process control loop is determined/derived from a unique identifier of the device while the loop is communicatively disconnected from a process plant's back-end environment or control room. The system tag may be stored at the device itself or at a proxy that is disposed in the field of the process plant (e.g., at another component of the loop). One or more commissioning activities that include the device are performed in the field using the device's system tag, and at least some of the field commissioning activities may be automatically triggered based on the derivation of system tag. Upon the loop (Continued)

being communicatively connected to the back-end environment of the plant, the device's system tag known to the loop in the field is synchronized with the device's system tag known to the back-end of the process plant.

27 Claims, 18 Drawing Sheets

(51) Int. Cl.
*H04L 29/08* (2006.01)
*G06K 7/10* (2006.01)
*G05B 19/042* (2006.01)
*G05B 23/02* (2006.01)
*G05B 19/414* (2006.01)

(52) U.S. Cl.
CPC ..... *G05B 19/4183* (2013.01); *G05B 19/4186* (2013.01); *G05B 23/02* (2013.01); *G05B 23/0224* (2013.01); *G06K 7/10366* (2013.01); *H04L 41/0806* (2013.01); *H04L 67/12* (2013.01); *G05B 2219/31121* (2013.01); *Y02P 90/08* (2015.11); *Y02P 90/18* (2015.11); *Y02P 90/26* (2015.11); *Y02P 90/265* (2015.11); *Y02P 90/86* (2015.11)

(58) Field of Classification Search
CPC ................ G05B 23/02; G05B 23/0224; G06K 7/10366; H04L 67/12; Y02P 90/08; Y02P 90/26; Y02P 90/265; Y02P 90/86
USPC .......................................................... 700/95
See application file for complete search history.

(56) References Cited

U.S. PATENT DOCUMENTS

| | | | |
|---|---|---|---|
| 6,415,439 B1* | 7/2002 | Randell | A63H 30/04 348/61 |
| 6,975,966 B2 | 12/2005 | Scott et al. | |
| 7,237,109 B2 | 6/2007 | Scott et al. | |
| 7,272,815 B1 | 9/2007 | Eldridge et al. | |
| 7,330,768 B2 | 2/2008 | Scott et al. | |
| 7,496,634 B1* | 2/2009 | Cooley | G06Q 10/107 709/205 |
| 7,668,608 B2 | 2/2010 | Nixon et al. | |
| 8,570,922 B2* | 10/2013 | Pratt, Jr. | H04L 12/66 370/310 |
| 2003/0051056 A1 | 3/2003 | Pascual et al. | |
| 2004/0162829 A1* | 8/2004 | Gabos | G06F 17/3056 |
| 2005/0096872 A1 | 5/2005 | Blevins et al. | |
| 2006/0020423 A1 | 1/2006 | Sharpe | |
| 2007/0150574 A1* | 6/2007 | Mallal | H04L 63/1408 709/223 |
| 2010/0149997 A1 | 6/2010 | Law et al. | |
| 2010/0290351 A1 | 11/2010 | Toepke et al. | |
| 2011/0265151 A1* | 10/2011 | Furlan | H04L 12/2809 726/4 |
| 2011/0313547 A1 | 12/2011 | Hernandez et al. | |
| 2012/0290991 A1 | 11/2012 | Ojha et al. | |
| 2013/0031260 A1* | 1/2013 | Jones | H04L 63/0853 709/228 |
| 2013/0184837 A1 | 7/2013 | Blevins et al. | |
| 2013/0282931 A1 | 10/2013 | Petzen et al. | |
| 2014/0025186 A1 | 1/2014 | Ojha et al. | |
| 2014/0067091 A1 | 3/2014 | Vishwanath et al. | |
| 2015/0066162 A1 | 3/2015 | Hokeness et al. | |
| 2015/0127876 A1 | 5/2015 | Erni et al. | |
| 2015/0233790 A1 | 8/2015 | Ratilla et al. | |
| 2016/0216706 A1 | 7/2016 | Christensen et al. | |
| 2016/0259315 A1 | 9/2016 | Alexander et al. | |

OTHER PUBLICATIONS

"Getting Started With Your DeltaV™ Digital Automation System," Emerson Process Management (May 2010), 202 pages.
Gregg, J., "Experion PKS: Overview of R500," Honeywell International Inc. (Jun. 23, 2016), 65 pages.
"Improving Safety System Project Efficiencies" webinar, Honeywell International Inc. (Dec. 3, 2015), 30 pages.
"QuickCheck Snap-On™ Application" Product Data Sheet, Emerson Process Management (Apr. 2013), http://www.proconexdirect.com/wp-content/uploads/2016/04/QuickCheck.pdf, 4 pages.
Spiropoulos, E., "Agile Project Execution: The Future of Industrial Process Automation Projects," Yokogawa Electric Corporation (Oct. 26, 2015), 26 pages.
International Search Report and Written Opinion for Application No. PCT/US2016/056595, dated Jan. 16, 2017.
International Search Report and Written Opinion for Application No. PCT/US2016/056598, dated Dec. 12, 2016.
International Search Report and Written Opinion for Application No. PCT/US2016/056614, dated Mar. 24, 2017.
International Search Report and Written Opinion for Application No. PCT/US2016/056610, dated Feb. 28, 2017.
Berge et al., "Fieldbus Foundation FAT & Commissioning," Manila End-User Seminar, pp. 1-19 (2008).
International Search Report and Written Opinion for Application No. PCT/US2016/056604, dated Jan. 30, 2017.
International Search Report and Written Opinion for Application No. PCT/US2016/056619, dated Jan. 30, 2017.
Partial International Search Report for Application No. PCT/US2016/056614, dated Jan. 30, 2017.
International Preliminary Report on Patentability for Application No. PCT/US2016/056595, dated Apr. 26, 2018.
International Preliminary Report on Patentability for Application No. PCT/US2016/056598, dated Apr. 26, 2018.
International Preliminary Report on Patentability for Application No. PCT/US2016/056604, dated Apr. 26, 2018.
International Preliminary Report on Patentability for Application No. PCT/US2016/056610, dated Apr. 26, 2018.
International Preliminary Report on Patentability for Application No. PCT/US2016/056614, dated Apr. 26, 2018.
International Preliminary Report on Patentability for Application No. PCT/US2016/056619, dated Apr. 17, 2018.

* cited by examiner

| Task | Traditional Commissioning | Smart Commissioning |
|---|---|---|
| Walk to location of device and reach it | 0:20 | - |
| Confirm device and veryfy wiring | 0:10 | 0:02 |
| Identify, scan, and assign device to AMS | 0:06 | - |
| Configure device parameters | 0:18 | 0:01 |
| Download module | 0:01 | 0:01 |
| Perform commissioning check | 0:15 | 0:01 |
| Generate as-built loop diagram | 0:10 | 0:05 |
| Total Duration | 1:10 | 0:10 |
| Average Number of People | 2 | 1 |
| Total Person-Hours | 2:20 | 0:10 |

93% Reduction

FIG. 10

DETERMINING DEVICE SYSTEM TAGS FOR COMMISSIONING PORTIONS OF A DISCONNECTED PROCESS CONTROL LOOP

REFERENCE TO RELATED APPLICATIONS

This application is a national phase of International PCT Patent Application No. PCT/US16/56598, filed Oct. 12, 2016, which in turn claims priority to and the benefit of U.S. Application No. 62/240,084 entitled "Smart Commissioning of Process Control Plants" and filed on Oct. 12, 2015, the entire disclosures of which are incorporated by reference herein.

This application is related to U.S. application Ser. No. 14/605,304 entitled "Commissioning Field Devices in a Process Control System Supported by Big Data" and filed on Jan. 26, 2015, and to U.S. patent application Ser. No. 15/291,200, filed concurrently herewith and entitled "Method and System for Commissioning Process Control Hardware", the entire disclosures of which are hereby incorporated by reference herein.

TECHNICAL FIELD

The present disclosure relates generally to process plants and process control systems, and more particularly, to smart or intelligent commissioning of field devices and loops of process plants and process control systems.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices, controllers, and I/O devices are generally referred to as "process control devices," and are generally located, disposed, or installed in a field environment of a process control system or plant.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally, the commissioning of a process plant or system involves bringing various components of the plant or system to the point where the system or plant can operate as intended. As is commonly known, physical process elements (such as valves, sensors, etc. that are to be utilized to control a process in a process plant) are installed at respective locations within the field environment of the plant, e.g., in accordance with Piping and Instrumentation Diagrams (P&IDs) and/or other plans or "blueprints" of the plant floor layout and/or of the process layout. After the process elements have been installed, at least some of the process elements are commissioned. For example, field devices, sampling points, and/or other elements are subject to being commissioned. Commissioning is an involved and complex process which typically includes multiple actions or activities. For example, commissioning may include actions or activities such as, inter alia, verifying or confirming an identity of an installed process control device (such as a field device) and its expected connections; determining and providing tags that uniquely identify the process control device within the process control system or plant; setting or configuring initial values of parameters, limits, etc. for the device; verifying the correctness of the device's installation, operation and behaviors under various conditions, e.g., by manipulating signals provided to the devices and performing other tests, and other commissioning activities and actions. Device verification during commissioning is important for safety reasons, as well as to conform to regulatory and quality requirements.

Other commissioning actions or activities are performed on a process control loop in which the device is included. Such commissioning actions or activities include, for example, verifying that various signal sent across the interconnection result in expected behavior at both ends of the interconnection, integrity checks on the process control loop, generating as-built I/O lists to indicate the actual physical connections of the devices that are implemented within the plant as well as recording other "as-installed" data, to name a few.

For some commissioning tasks, a user may utilize a commissioning tool (e.g., a handheld or portable computing device) locally at various target process control devices, components, and loops. Some commissioning tasks may be performed at an operator interface of the process control system, e.g., at an operator interface of an operator workstation included in a back-end environment of the process plant.

Typically, the commissioning of a process plant requires physical devices, connections, wiring, etc. to be installed, set up, and inter-connected in the field environment of the process plant. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices.

Of course, in addition to commissioning actions performed in the back-end environment, commissioning actions or activities are also performed to verify the correctness of the connections and operations in the field environment of both the physical and logical devices, both individually and integrally. For example, a field device may be physically installed and individually verified, e.g., power-on, power-off, etc. A port of a field device may then be physically connected to a commissioning tool via which simulated signals may be sent to the field device, and the behavior of the field device in response to the various simulated signals may be tested. Similarly, a field device whose communication port is commissioned may eventually be physically connected to a terminal block, and actual communications between the terminal block and the field device may be tested. Typically, commissioning of field devices and/or other components in the field environment require knowledge of component identifications, and in some cases, knowledge of component interconnections so that test signals and responses can be communicated amongst field devices and other loop components and resultant behaviors verified. In currently known commissioning techniques, such identification and interconnection knowledge or data is generally provided to components in the field environment by the back-end environment. For example, the back-end environment will download field device tags that are used in control modules into the field devices that will be controlled by the control modules during live plant operations.

Eventually, after various components and portions of a process control loop have been respectively commissioned, checked, or tested, the entire loop itself is commissioned, checked, and/or tested, e.g., a "loop test." Typically, a loop test involves testing the behavior of the loop in response to various inputs or conditions, and/or in various states. An operator in the back-end environment coordinates with an operator in the field environment to inject various inputs and/or generate various conditions and/or states at the process control loop, and resultant behavior and/or measurements are examined for their level of adherence to acceptable target values and/or ranges.

SUMMARY

Techniques, systems, apparatuses, components, devices, and methods for smart commissioning (also referred to as "intelligent commissioning" or "parallel commissioning") are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes (also referred to herein as "industrial processes") that operate to manufacture, refine, or transform, raw physical materials to generate or produce products.

Smart commissioning of process control systems and/or plants include various techniques, systems, apparatuses, components, and/or methods that allow for at least some portions of the commissioning process to be performed locally, automatically, and/or distributively, so that devices, components, and other portions of a process plant may be partially or even entirely commissioned prior to being incorporated or integrated into the plant or system as a whole. Smart commissioning allows, for example, various portions of process control systems and/or their respective safety instrumented systems (SIS) (e.g., stand-alone or integrated safety systems (ICSS)) to be built and at least partially commissioned at different geographical locations (e.g., at different "mod yards") prior to being brought together and integrated at the resident location or site of the process plant. In a sense, smart/intelligent commissioning allows for parallel commissioning activities and actions to take place.

For example, smart commissioning allows for some (if not most) commissioning activities and/or actions to be performed independently (and indeed, in parallel, if desired) in the field environment and in the back-end environment of the process plant. Commissioning of the design and engineering implemented in the field environment no longer is dependent on the progress (and completion) of the functional design, engineering, and commissioning being performed and mostly completed in the back-end environment. As such, a significant portion of local commissioning activities of the physical components of the field environment are able to be performed independently of the commissioning of the functional or logical components of the back-end environment, and vice versa. That is, at least some portion of commissioning activities and actions in either the field environment or the back-end environment may be performed while the field environment and the back-end environment are communicatively disconnected, e.g., while a loop (or portion thereof) that has been (or is being) installed in the field environment is communicatively disconnected from the back-end environment. For instance, using smart commissioning techniques, at least some of portion of the commissioning activities and actions in the field environment and/or in the back-end environment are able to be performed prior to the process control system or plant having knowledge of the assignment of a field device to a particular I/O card and/or channel.

Similarly, with regard to process control loops of process plants, smart commissioning allows for various commissioning activities and/or actions to be performed on various components and portions of the loop without requiring that all of the components of the loop to first be installed and interconnected. Accordingly, at least some portion of the commissioning activities of a process control loop may be performed while various components of the process control loop are disconnected or not yet allocated to each other, to the loop, and/or to the back-end environment. For example, respective commissioning activities may be initiated and performed at both the back-end environment and the field environment of a process plant while the two environments are communicatively disconnected. The field environment and the back-end environment may simultaneously commission various respective portions of a process control loop on their respective sides, and then upon binding of the two sides, the majority of the remaining commissioning activities that are performed are those to which the loop in its entirety is subjected.

Further, smart commissioning allows for certain commissioning actions and activities to be automatically triggered or initiated based on certain conditions without requiring any user input. In some situations, multiple commissioning actions and/activities may be automatically triggered and executed without requiring that a user indicate which activities are to be performed next, on what components, and how they are to be performed.

Consequently, as smart commissioning allows for the physical design and engineering performed in the field environment of the process plant to proceed independently of the functional design and engineering performed in the back-end environment of the process plant, and as smart commissioning also allows for piece-wise commissioning of various portions of a process control loop to be performed independently or on an as-installed basis, commissioning scheduling dependencies between the back-end and the field are reduced, and overall calendar time that is required for commissioning the process plant is also reduced. Thus, smart commissioning optimizes the commissioning process as a whole with significant reduction in both time and personnel resources, and therefore significant reduction in costs.

BRIEF DESCRIPTION OF THE DRAWINGS

FIG. 10 includes a chart comparing traditional commissioning techniques to at least some of the smart commissioning techniques described herein.

DETAILED DESCRIPTION

As discussed above, a process plant, process control system, or process control environment that, when on-line, operates to control one or more industrial processes in real-time may be commissioned utilizing one or more of the novel smart commissioning techniques, systems, apparatuses, components, devices, and/or methods described herein. The process plant, when commissioned and operating on-line, includes one or more wired or wireless process control devices, components, or elements that perform physical functions in concert with a process control system to control one or more processes executing within the process plant. The process plant and/or process control system may include, for example, one or more wired communication networks and/one or more wireless communication networks. Additionally, the process plant or control system may include centralized databases, such as continuous, batch, asset management, historian, and other types of databases.

Figure 1:
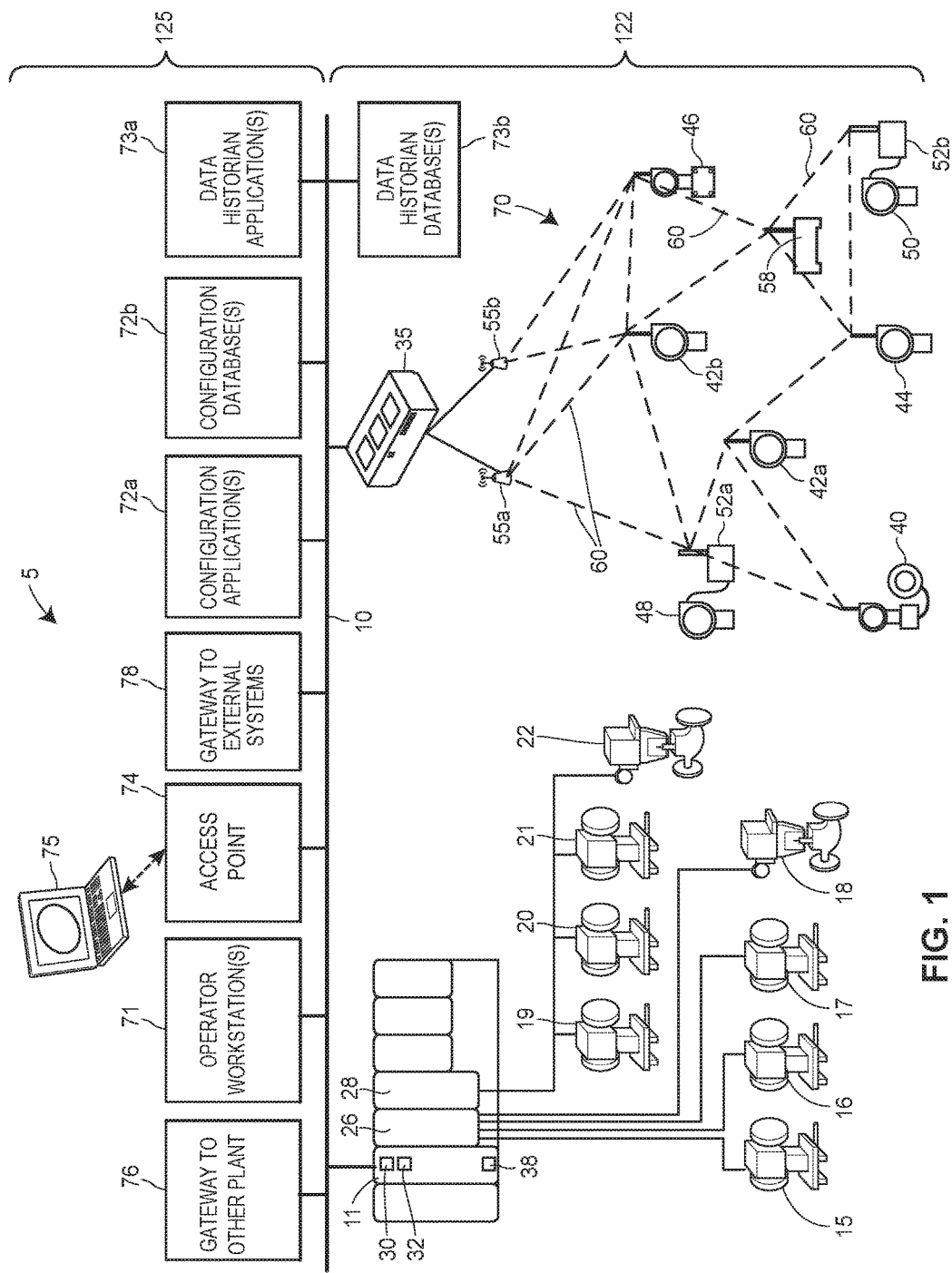
FIG. 1 depicts a block diagram illustrating an example system process plant, at least a portion of which may be commissioned by utilizing one or more of the smart commissioning techniques described herein.

To illustrate, FIG. 1 is a block diagram of an example process plant, process control system, or process control environment 5, at least a portion of which has been commissioned by using any one or more of the smart commissioning techniques described herein. The process plant 5 includes one or more process controllers that receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10. The process control data highway 10 may include one or more wired and/or wireless communication links, and may be implemented using any desired or suitable or communication protocol such as, for example, an Ethernet protocol. In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM) Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or more operator workstations 71 that are communicatively connected to the data highway 10. Via the operator workstations 71, operators may view and monitor run-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The example process control system 5 is further illustrated as including a configuration application 72a and configuration database 72b, each of which is also communicatively connected to the data highway 10. As discussed above, various instances of the configuration application 72a may execute on one or more computing devices (not shown) to enable users to create or change process control modules and download these modules via the data highway 10 to the controllers 11, as well as enable users to create or change operator interfaces via which in operator is able to view data and change data settings within process control routines. The configuration database 72b stores the created (e.g., configured) modules and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

The example process control system 5 includes a data historian application 73a and data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

In some configurations, the process control system 5 includes one or more gateways 76, 78 to systems that are external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

Figure 2A:
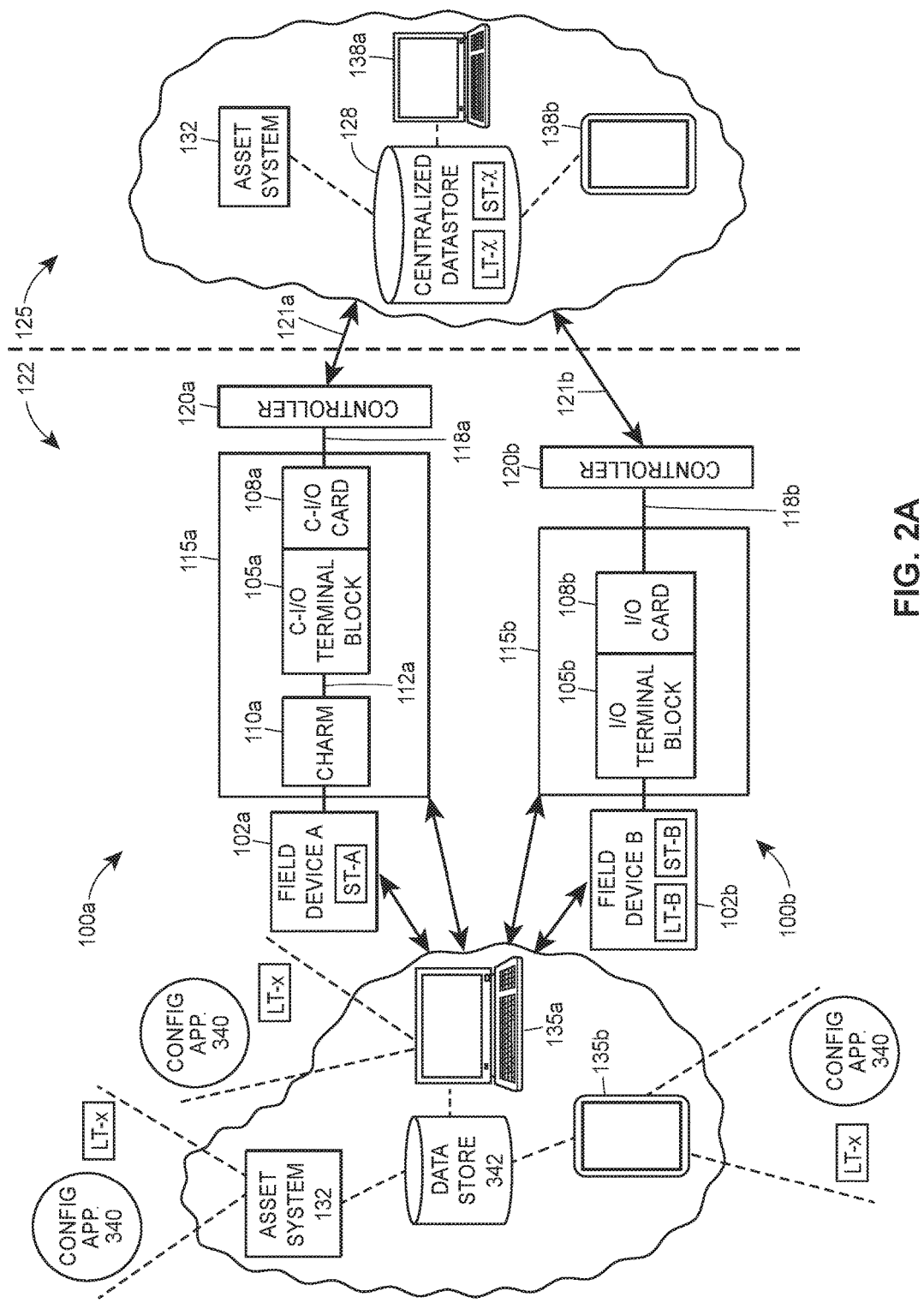
FIG. 2A includes block diagrams of two example loops which may be included in the process plant of FIG. 1 and which may be at least partially commissioned utilizing smart commissioning techniques.

FIG. 2A includes a block diagram depicting an example architecture of an example process control loop 100a in which a smart or intelligent field device 102a is included, and that may be commissioned using any one or more of the smart commissioning techniques described herein. Generally, as used herein, "smart" or "intelligent" field devices are field devices that integrally include one or more processors and one or more memories. On the other hand, as used herein, "dumb" or "legacy" field devices do not include on-board processor(s) and/or on-board memories.

The loop 100a may be integrated or incorporated into a process plant to be utilized in controlling a process therein during run-time operations of the process plant. For example, the loop 100a may be installed or disposed in the field environment 122 of the process plant 5.

Within the example process control loop 100a shown in FIG. 2A, a smart or intelligent field device 102a is communicatively connected (e.g., in a wired or wireless manner) to an electronic marshaling device or component 110a (e.g., a CHARacterization Module or CHARM provided by Emerson Process Management). The electronic marshaling component 110a is communicatively connected 112a to an I/O terminal block 105a that, in turn, is communicatively connected to an I/O card 108a. The I/O-card 108a is communicatively connected 118a to a controller 120a, which, in turn, is communicatively connected 121a to the back-end environment 125 of the process plant 5. During on-line operations of the process plant 5, the process controller 120a receives digital values of the signals generated by the smart field device 102a and operates on the received values to control a process within the plant 5, and/or sends signals to change the operation of the field device 102a. Additionally, the controller 120a may send information to and receive information from the back-end environment 125 via the communicative connection 121*a*.

In FIG. 2A, the electronic marshaling component 110*a*, the I/O terminal block 105*a*, and the I/O card 108*a* are depicted as being located together in a cabinet or housing 115*a* (such as an I/O cabinet) that electrically interconnects the electronic marshaling component 110*a*, the I/O terminal block 105*a*, and the I/O card 108*a* and/or other components housed within the cabinet 115*a* via a bus, backplane, or other suitable interconnection mechanism. Of course, the housing of the CHARM 110*a*, the I/O terminal block 105*a*, and the I/O card 108*a* in the cabinet 115*a* as depicted in FIG. 2A is only one of many possible housing configurations.

Figure 2B:
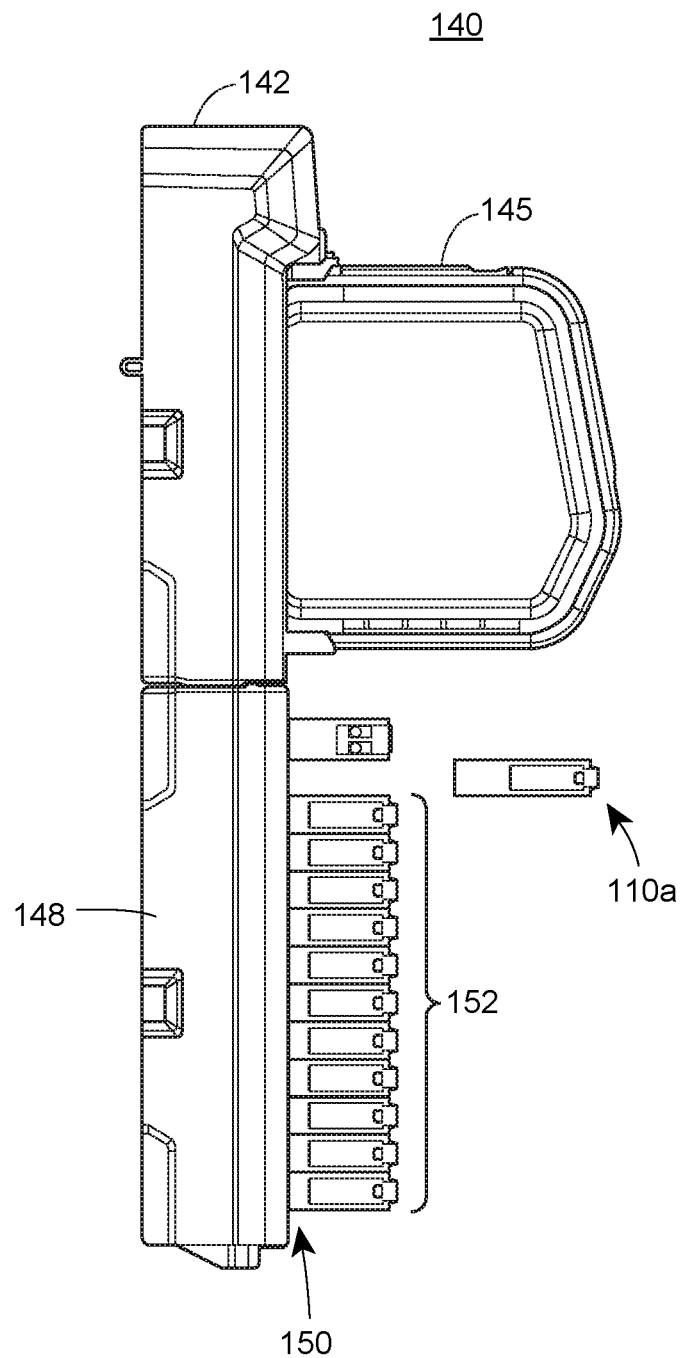
FIG. 2B illustrates an example architecture of an electronic marshaling block or apparatus which may be included in the process plant of FIG. 1.

With particular regard to the electronics marshaling component 110*a*, FIG. 2B illustrates a profile view of an example electronic marshaling block or apparatus 140 that supports the electronic marshaling component 110*a* shown in FIG. 2A, and thus is discussed below with simultaneous reference to FIG. 2A. In FIG. 2B, the electronic marshaling block or apparatus 140 includes a CHARM carrier 142 that supports one or more CHARM I/O cards (CIOCs) 145 to which the process controller 120*a* may be connected (e.g., via the wired or wireless connection 118*a* shown in FIG. 2A). Additionally, the electronic marshaling block or apparatus 140 includes one or more CHARM baseplates 148 that communicatively connect to the CHARM carrier 142 (and therefore, to the CHARM I/O cards 145), and that support a plurality of individually configurable channels. Each channel corresponds to a dedicated CHARM terminal block 150 into which the CHARM 110*a* may be securely received and electronically connected, thereby electronically marshaling the field device 102*a* and the I/O card 108*a* with the controller 120*a*. For instance, the I/O terminal block 105*a* is the CHARM terminal block 150 into which the CHARM 110*a* is received, and the I/O card 108*a* is the CIOC 145 corresponding to the CHARM terminal block 150 and to which the controller 120*a* is connected 118*a*. FIG. 2B also shows other CHARMs 152 which have been received by their respective CHARM terminal blocks 150, and which may be connected other respective devices in the field environment 122 of the process plant 5 (not shown).

Returning now to FIG. 2A, FIG. 2A further includes a block diagram that depicts an example architecture of an example process control loop 100*b* in which a smart/intelligent field device 102*b* is included, however, unlike the loop 100*a*, the loop 100*b* excludes any electronic marshaling components and instead utilizes legacy marshaling techniques, such as direct marshaling. In particular, the smart field device 102*b* is communicatively connected (e.g., in a wired or a wireless manner) to an I/O terminal block 105*b*, which in turn is connected to an I/O card 108*b* that has a particular, direct marshaled connection 118*b* to a process controller 120*b*. The I/O terminal block 105*b*, the I/O card 108*b*, and/or other components are housed or included in an I/O marshaling cabinet 115*b*, for example, and the connection 118*b* is realized through a bus, backplane, or other suitable interconnection mechanism (not shown in FIG. 2A). In this manner, the loop 100*b* may be installed or disposed in the field environment 122 of the process plant 5 and communicatively connected 121*b* to the back-end environment 125, e.g., via the controller 120*b*. During on-line operations of the process plant 5, as the I/O card 108*b* is communicatively connected 118*b* with a process controller 120*b*, the process controller 120*b* receives digital values of the signals generated by the smart field device 102*b* and operates on the received values to control a process within the plant 5, and/or sends signals to change the operation of the field device 102*b*. Additionally, the controller 120*b* may send information to and receive information from the back-end environment 125 via the communicative connection 121*b*.

Figure 2C:
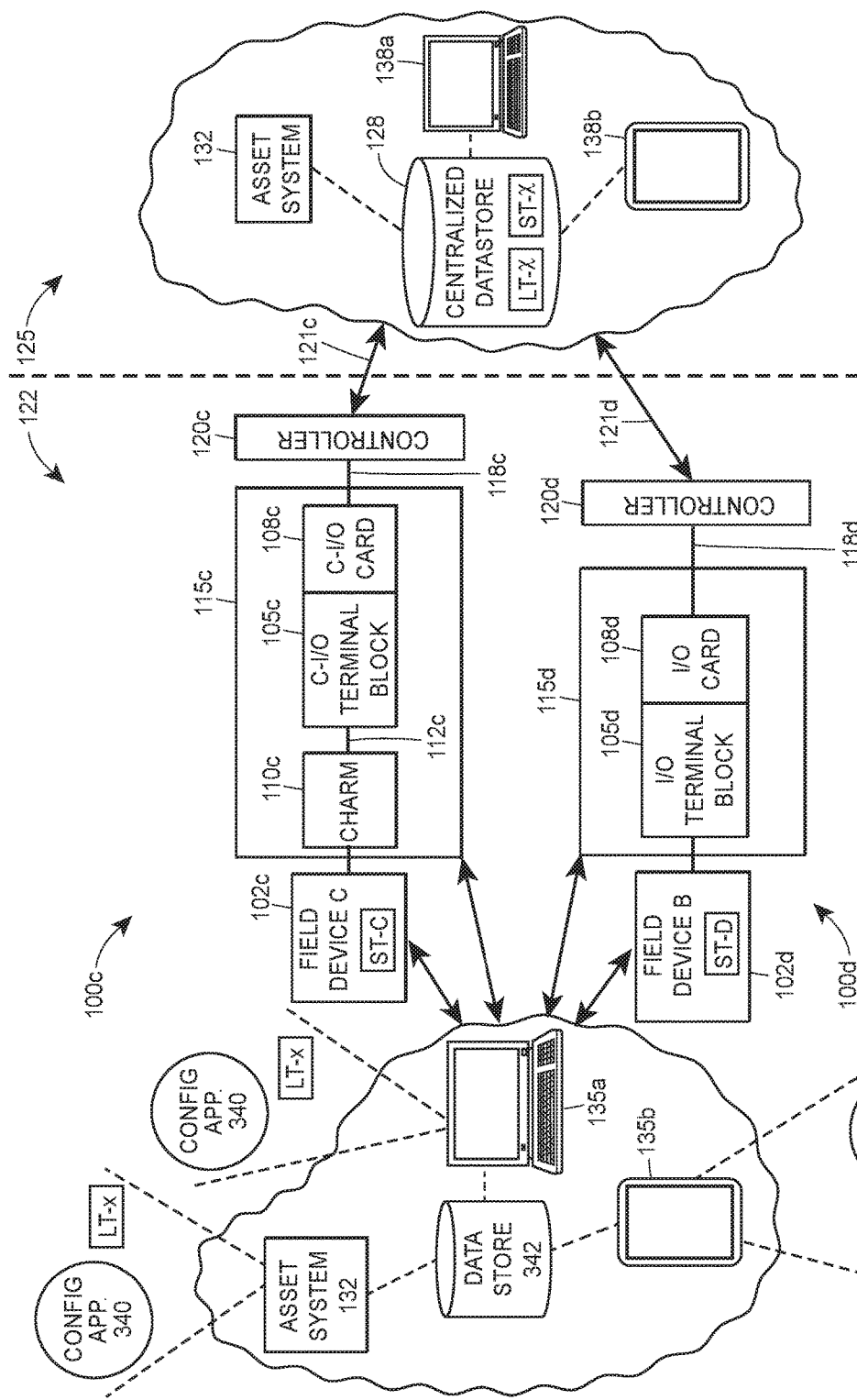
FIG. 2C includes block diagrams of two example loops which may be included in the process plant of FIG. 1 and which may be at least partially commissioned utilizing smart commissioning techniques.

FIG. 2C is a block diagram depicting an example architecture of a process control loop 100*c* in which a legacy field device 102*c* is included. Like the example process control loops 100*a* and 100*b*, the process control loop 100*c* may be commissioned using any one or more of the smart commissioning techniques described herein. Additionally, as previously discussed, the legacy field device 102*c* includes minimal local memory and/or processing abilities, if any at all. The loop 100*c* may be integrated or incorporated into a process plant, such as the process plant 5 of FIG. 1, to be utilized in controlling a process therein during run-time operations of the process plant 5. For example, the loop 100*c* may be installed or disposed in the field environment 122 of the process plant 5.

In FIG. 2C, the legacy device 102*c* is communicatively connected (e.g., in a wired or wireless manner) to an electronic marshaling device or component 110*c* (e.g., a CHARM). The electronic marshaling component 110*c* is communicatively connected 112*c* to an I/O terminal block 105*c* that, in turn, is communicatively connected to an I/O card 108*c*. The I/O-card 108*c* is communicatively connected 118*c* to a controller 120*c*, which, in turn, is communicatively connected 121*c* to the back-end environment 125 of the process plant 5. As such, the I/O terminal block 105*c* may be a CHARM terminal block (e.g., one of the CHARM terminal blocks 150 depicted in FIG. 2B), and the I/O card 108*c* may be a CIOC (e.g., one of the CIOCs 145 depicted in FIG. 2B).

In FIG. 2C, the electronic marshaling component 110*c*, the I/O terminal block 105*c*, and the I/O card 108*c* are depicted as being located in a cabinet or housing 115*c* (such as an I/O cabinet) that electrically interconnects the electronic marshaling component 110*c*, the I/O terminal block 105*c*, and the I/O card 108*c* and/or other components housed within the cabinet 115*c* via a bus, backplane, or other suitable interconnection mechanism. As such, during on-line operations of the process plant 5, the controller 120*c* receives values of the signals generated by the legacy field device 102*c* and operates on the received values to control a process within the plant 5, and/or sends signals to change the operation of the field device 102*c*. Additionally, the controller 120*c* is communicatively connected 121*c* with the back-end environment 125 of the process plant 5, e.g., via the data highway 10.

FIG. 2C also includes a block diagram depicting an example architecture of an example process control loop 100*d* in which a legacy device 102*d* is included, however, unlike the loop 100*c*, the loop 100*d* excludes any electronic marshaling component and instead utilizes legacy marshaling techniques, such as direct marshaling. In FIG. 2C, the legacy field device 102*d* is communicatively connected (e.g., in a wired or a wireless manner) to an I/O terminal block 105*d*, which in turn is connected to an I/O card 108*d* that has a particular, direct marshaled connection 118*d* to a process controller 120*d*, and the controller 120*d* is communicatively connected 121*d* to the back-end environment 125 of the process plant 5, e.g., via the data highway 10. The I/O terminal block 105*d*, the I/O card 108*d*, and/or other components are housed or included in an I/O cabinet 115*d*, as depicted in the example arrangement shown in FIG. 2C. As the I/O card 108*c* is communicatively connected 118*c* with a process controller 120*c*, during on-line operations of the process plant 5, the process controller 120*c* receives values of the signals generated by the legacy field device 102*d* and operates on the received values to control a process within the plant 5, and/or sends signals to change the operation of the field device 102*d*. Additionally, the controller 120*d* is communicatively connected 121*d* with the back-end environment 125 of the process plant 5, e.g., via the data highway 10.

FIGS. 2A and 2C each further illustrate a centralized database or data store 128 that is disposed in the back-end environment 125 of the process plant 5 and that is used for commissioning purposes. The centralized database 128 stores, inter alia, data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and or operator interface modules that will operate in conjunction with the field environment 122 during live operations of the process plant 5. In an example, an approved control module is downloaded into a process controller 120 so that, when executed during live operations, the process controller 120 operates in accordance with its resident control module to send and receive various signals to/from other components in its loop 100 (and, in some cases, to/from other process controllers), thereby controlling at least a portion of the process in the process plant 5.

Thus, data that is known and utilized in the back-end environment 125 and in the field environment 122 must be synchronized and coherent. For example, within the process plant 5, a field device 102 is uniquely identified by the same, particular device tag (e.g., tags ST-A, ST-B, ST-C, and ST-D illustrated in FIGS. 2A and 2C) in both the field environment 122 and the back-end environment 125. Similarly, a signal generated or received by the field device 102 is uniquely identified by the same, particular device signal tag (not shown) in both the field environment 122 and the back-end environment 125 of the process plant 5. Further, the desired or planned associations of various of components included in a process loop 100 must be synchronized and consistent between the field environment 122 and the back-end environment 125. For example, in the back-end environment 125, the database 128 stores information indicating that the field device 102 identified by the device tag ST is assigned to communicate via a particular I/O card 108 and/or particular I/O terminal block or channel 105, that the particular I/O card 108 is assigned to communicate with a particular controller 120, and the like. This set of associations and interconnections that are logically known at the back-end environment 125 should be physically implemented in the field environment 122. Thus, during commissioning of the process plant, not only are physical operations of various devices, components, and connections in the field environment 122 tested and verified, but the naming, associations, interconnections, and other commissioning data are also verified for consistency and coherency between the field environment 122 and the back-end environment 125.

As previously discussed, traditional commissioning techniques require that the names or identifications of various components disposed in the field environment 122 as well as their associations and interconnections with other components to be defined in the back-end environment 125 before commissioning is able to begin in any significant manner in the field environment 122. That is, traditional commissioning techniques require that the names, associations, and interconnections of various field components first be configured or defined in the back-end environment 125, and then be downloaded or otherwise transmitted to the field environment 122 via established communication paths within the process control system 5 in order for such commissioning data to be available in the field environment 122 for use in commissioning components of the field environment 122. For example, using traditional commissioning techniques, commissioning data (including configurations and definitions) typically is transmitted, via the data highway 10, from the back-end environment 125 to a controller 120 and I/O devices 108, and in some cases to field devices 102 in the field environment 122, so that the commissioning data is available for use in performing one or more commissioning actions or activities in the field environment 122.

On the other hand, the smart commissioning of process control systems and/or plants do not require configuration and definition to be mostly completed at the back-end environment 125 prior to initiating commissioning activities in the field environment 122. Instead, the smart commissioning techniques described herein allow for the physical design, installation, engineering, and commissioning to be initiated and performed in the field environment 122 of the process plant 5 independently of the progress of the functional/logical design and engineering being performed in the back-end environment 125 of the process plant. For example, various commissioning activities or actions may be performed in the field environment 122 of the process plant 5 prior to the field environment 122 being communicatively connected to the back-end environment 125 of the process plant 5, e.g. while the field environment 122 and the back-end environment 125 are communicatively disconnected, and/or while a loop 100 (or portion thereof) that has been installed in the field environment 122 is communicatively disconnected from the back-end environment 125. For instance, at least some of portion of the commissioning activities and actions may be performed in the field environment 122 prior to the process control system or plant 5 having knowledge of the assignment of a field device 102 to a particular I/O card 108 and/or I/O channel. Additionally or alternatively, various commissioning activities or actions may be formed on various components of the process control loop 100 while the various components are disconnected from other components of the process control loop 100 and/or while various components are not yet allocated to other components of the loop 100. Accordingly, smart commissioning allows at least some portions of the commissioning process to be performed locally, automatically, distributively, and/or in parallel so that devices, components, and other portions of a process plant 5 may be partially or even entirely commissioned prior to being incorporated or integrated into the plant or system 5 as a whole, thereby significantly reducing time, personnel, and costs needed for commissioning the process plant as compared to traditional commissioning techniques.

Descriptions of various aspects, apparatuses, systems, components, devices, methods, and techniques for smart commissioning a process plant or process control system 5 follow. The smart commissioning techniques are described below with simultaneous reference to FIGS. 1, 2A, 2B, and 2C; however, this is for ease of reading only, and not for limitation purposes. Indeed, as one skilled in the art will recognize, at least some of the smart commissioning techniques described herein are applicable to stand-alone devices, and/or are applicable to portions of process plants in scenarios during which such portions are not being commissioned.

Logical Identifiers

A key aspect of smart commissioning is the independent availability of logical identifiers of components in the field environment for use during commissioning. Examples of such logical identifiers include Device Tags (DTs), each of which represents a particular instrument, controller, valve, or other physical field device, and Device Signal Tags (DSTs), each of which represents a particular signal that is received or generated by a particular device and that typically corresponds to a particular parameter utilized by the field device. For some devices, a Device Signal Tag comprises a combination of a device's Device Tag and an identifier of a specific signal received or generated by that device, e.g., an identifier of a specific parameter referenced by a control module. For some devices, typically legacy or dumb devices, a Device Tag represents both the physical device and a signal generated by the device. Generally speaking, a device's logical identifier is used by the process plant 5 in both the field environment 122 and in the back-end environment 125 to uniquely identify the device.

At any rate, as previously discussed, traditional commissioning procedures required such logical identifiers of devices and signals to be first defined in the back-end environment 125 of a process plant, e.g., during the functional design and engineering phases, and then subsequently provided to the field environment 122 for use in commissioning physical devices and equipment disposed therein. With smart commissioning, though, such logical identifiers are derived and/or obtained independently and asynchronously in the field environment 122 and in the back-end environment 125 so that the logical identifiers are readily available in the respective local environment 122,125 for use in local commissioning activities and actions, e.g., as and when needed. Significantly, logical identifiers are available for use in the field environment 122 much earlier in the commissioning process, thereby making the initiation and progress of commissioning activities in the field environment 122 less dependent on the progress of commissioning activities in the back-end environment 125.

Generally, a logical identifier that represents a particular device 102 is independently and locally derived in the field environment 122 by respectively deriving the logical identifier from a physical or other source identifier of the device 102 that is locally available to the field environment 122. Similarly, but separately, in the back-end environment 125, the logical identifier that represents the particular device 102 is independently and locally derived from a source identifier of the device 102 that is locally available to the back-end environment 125. In an example, the logical identifier of a device 102 is derived from a source identifier that is a unique identifier of the physical device 102. Generally speaking, the physical or other identifier of the device 102 that is locally available is referred to herein as a "source identifier" or "source tag," and the logical identifier of the device 102 that is derived from the system identifier or tag is referred to herein as a "system identifier" or "system tag."

Typically, but not necessarily, the source identifier or tag of the device 102 from which the system identifier or tag is derived has a total number of characters that is different than a total number of characters of the logical identifier, and may be of any desired format. The characters of an identifier tag, whether source or system, generally include alphanumeric characters, which may be interspersed with dashes or other non-alphanumeric characters. In an embodiment, the desired format of the system identifier or tag is indicated or selected by a user.

In some cases, a total number of characters included in the source tag of the device 102 is greater than a total number of characters included in the system tag of the device 102. For example, when the source tag of the device 102 is a physical identifier such as a 32-character HART long tag that identifies the device 102, the derived system tag of the device 102 may be a shortened tag such as an 8-character HART short tag (e.g., the 8-character short tag defined by the initial HART protocol specification and revisions thereto prior to Revision 6), or a 16-character host tag utilized by the process control system 5 and its control logic to uniquely identify the device 102.

In some cases, a total number of characters included in the source tag of the device 102 is less than a total number of characters included in the system tag of the device 102. For example, when the source tag of the device 102 is an 8-character HART short tag defined by the initial HART protocol specification and revisions thereto prior to Revision 6, the derived system tag of the device 102 may be the 16-character host tag utilized by the process control system 5, or the derived system tag may be the 8-character HART short tag that is prepended, appended, or otherwise modified to include additional characters.

In an illustrative but non-limiting example described herein, the source tag of the device 102 is referred to as a "long tag" (LT), and the device's system tag is referred to as a "shortened tag" (ST) of the device 102. For ease of reference in the drawings, particular device long tags are referenced by "LT-x" and particular device shortened tags are referenced by "ST-x", where x denotes a particular illustrated field device 102a, 102b, 102c, or 102d. Additionally, for ease of reading, long tags are generally referred to by "LT," and shortened tags are generally referred to by "ST."

The long tag (LT) of a device 102 may be, for example, a model and serial number, a bar code, a identifier in accordance with the HART, WirelessHART, or HART-IP protocols (e.g., a 32-character HART long tag), an identifier in accordance with another industrial protocol, or other suitable identifier that is locally available. The particular characters of the long tag LT of the field device 102 may be assigned by its manufacturer, or may be assigned by a provider of the process plant 5 a priori, e.g., while generating process flow diagrams (PFDs) and/or piping and instrumentation diagrams (P&IDs), or otherwise planning out the process plant. Long tags may be respectively provided in local environments 122, 125, for example, by asset management systems such as the Asset Management Software (AMS) Suite provided by Emerson Process Management, or other inventory and installation systems 132. For some intelligent or smart field devices (e.g., field devices 102a, 102b), respective long tags LT are pre-provisioned or stored into the memory of the physical field device 102 prior to the commissioning of the field device 102. For example, FIG. 2A depicts that the long tag LT-B of device 102b has been pre-provisioned or stored into the physical field device 102b, e.g., at the factory, upon its arrival at the field site, while it is undergoing installation, etc.

Figure 3A:
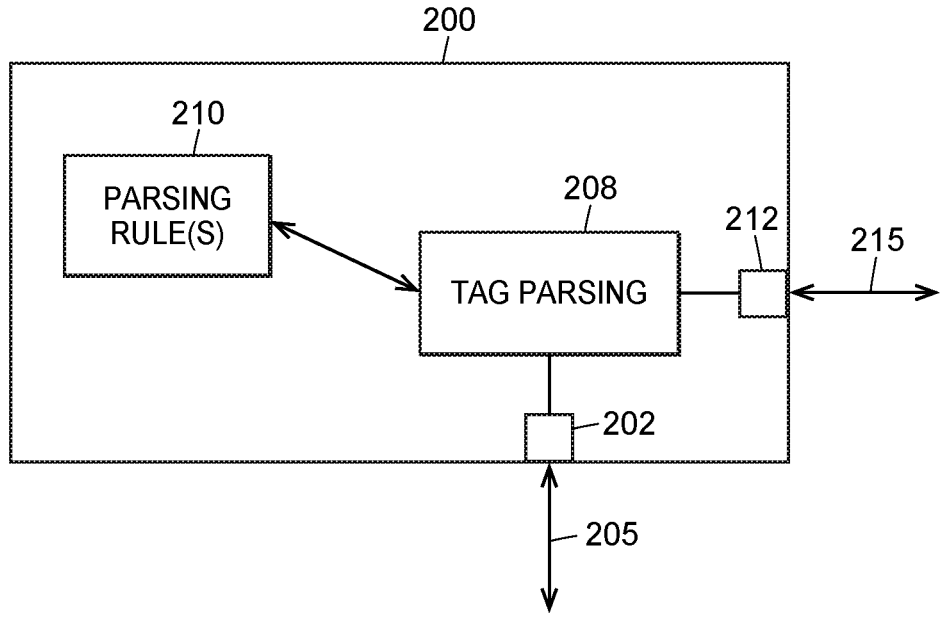
FIG. 3A depicts a block diagram of an example tag parsing apparatus or device.

Generating or determining a system tag that is indicative of a field device 102 (which, in this illustrative example, is represented by the shortened tag ST) may be performed by a tag parsing device, component, or apparatus 200, an example block diagram of which is illustrated in FIG. 3A. The tag parsing apparatus 200 includes an input 202 via which a source tag of a device 102 is received or obtained (which, in this illustrative example, is represented by the long tag LT). The input 202 is communicatively connected to the sender of the long tag LT via a link 205. The link 205 may be of any desired implementation, e.g., a wired link, a wireless link (which may be long range, short range, or near-field, for example), a network link, a function call or other type of software-implemented link, or some other suitable link via which the long tag LT of the device 102 is received. In an example, the long tag LT is obtained via a communication link from another device or from a data store. In another example, the tag parsing apparatus 200 obtains the long tag LT by accessing a local data base.

In some implementations (not shown), the long tag LT is obtained at the input 202 of the tag parsing apparatus 200 via an optical interface. In an example configuration, the tag parsing apparatus 200 includes an optical interface that scans, reads, or otherwise optically obtains a long tag LT from a label, a bar code, an image, a QR code (Quick Response Code), or other two-dimensional representation of the long tag LT. The tag parsing apparatus 200 further includes an image and/or optical processor to automatically determine or obtain the specific characters of the long tag LT from the obtained image.

As shown in FIG. 3A, the tag parsing apparatus 200 includes a tag parser 208 that operates on the long tag LT received via the input 202. The tag parser 208 may comprise (i) a set of computer-executable instructions stored on one or more tangible, non-volatile memories and executable by one or more processors, (ii) executable firmware instructions, and/or (iii) executable hardware instructions. The tag parsing apparatus 200 also includes a set of parsing rules 210 that are accessible to the tag parser 208 and that define or indicate how the set of characters of the shortened tag ST of the field device 102 is to be extracted, selected, derived, or otherwise determined based on the set of characters of the long tag LT of the field device 102. For example, if a long tag LT follows the convention or format AABB-CCCCxxxyyyD-zzE, the set of parsing rules 210 may indicate that the corresponding shortened tag ST is to follow the convention or format CCCCxxxyyyD-zzE. The set of parsing rules 210 may include any type of rules that shorten a length of a tag, such as rules corresponding to truncation of the tag, deletion of various sequential or non-sequential characters, combining or manipulating numerical characters by mathematical operations, etc.

It is noted that while in the present illustrative example, the source tag is implemented as a long tag (LT) and the derived system tag is implemented as a shortened tag (ST), this is only one of many possible embodiments. In other example scenarios, such as when a derived system tag has a longer length than the length of a source tag, the parsing rules 210 nonetheless define or indicate how the set of characters of the system tag are to be determined or derived based on the set of characters of the source tag. For example, the parsing rules 210 may indicate additional characters that are to be prepended, appended, and/or interspersed within the characters of the source tag to generate the system tag. Generally speaking, the parsing rules 210 define or indicate the modifications that are to be applied to the source tag of the device 102 to generate or derive the respective system tag for the device 102. Indeed, different types of parsing rules 210 may be defined and applied to different formats and/or communication protocols on which different source tags are based. Further, at least some of the parsing rules 210 may differ across different process control system providers, across different plant locations, across different types of components or devices, and/or based on other criteria, if desired. Indeed, in some implementations, at least some of the parsing rules 210 are configurable or modifiable.

Returning now to the illustrative example, the tag parsing apparatus 200 also includes an output 212 via which the derived or determined shortened tag ST is provided to another apparatus or device, such as the field device 102, and/or is provided to one or more local or remote memories for storage. The output 212 may be communicatively connected to the recipient apparatus or device via a link 215, which may be the link 205 or a different link. The link 215 may be of any desired implementation, e.g., a wired link, a wireless link, a network link, a function call or other type of software-implemented link, or other suitable link.

In the field environment 122, instances of the tag parsing apparatus 200 may be disposed at any one or more locations therein. For example, the tag parsing apparatus 200 may be included in the AMS or other asset system 132, and/or in one or more field commissioning tools 135a, 135b. The field commissioning tools 135 may be part of the AMS system 132, or may be stand-alone field commissioning devices or tools. Generally speaking, a field commissioning tool 135 is a laptop computer (e.g., reference 135a), a tablet or handheld smart device (e.g., reference 135b), or other portable computing device that is brought to the field environment 122, e.g., to a staging area and/or an installation area of the field environment 122. An operator utilizes the commissioning tool 135 to temporarily connect (e.g., via a wired and/or a wireless connection) to a target device or component (e.g., the field device 102, the I/O terminal block 105, the I/O card 108, the CHARM 110, the controller 120, etc.) to perform one of more commissioning activities on the connected component.

In some arrangements, instances of the tag parsing apparatus 200 are included in the cabinet 115, or in another cabinet disposed in the field environment 122. For example, the tag parsing apparatus 200 may be included in an I/O terminal block 105, an I/O card 108, an electronic marshaling apparatus 140, a controller 120, or in some other device or apparatus housed in a cabinet in the field environment 122.

However, the tag parsing apparatus 200 need not be implemented in a unitary device or apparatus. For example, the set of parsing rules 210 may be stored in a memory housed in the cabinet 115, while the tag parser 208 is included in the field commissioning tool/portable device 135. Alternatively, the tag parser 208 may be stored in a memory housed in the cabinet 115, and the set of parsing rules 210 may be stored at the field commissioning tool/portable device 135. In another embodiment, the parsing rules 210 may be stored at a remote location (e.g., at a remote data bank, in the cloud, etc.) that is accessible to the tag parser 208. By distributing portions of the tag parsing apparatus 200 across multiple devices and/or apparatuses, flexibility as to which parsing rules are applied to which types of source tags is possible.

Furthermore, the field environment 122 may include multiple instances of the tag parsing apparatus 200. In an example, multiple field commissioning tools or devices 135 each include a respective instance of the tag parsing apparatus 200. Additionally or alternatively, the asset management system 132 may include a respective instance of the tag parsing apparatus 200. Indeed, some intelligent field devices 102 and/or other components installed in the field environment 122 may each include a respective on-board tag parsing apparatus 200.

Similarly, in the back-end environment 125, instances of the tag parsing device, component, or apparatus 200 may be disposed at any one or more locations therein. In an example, respective instances of the tag parsing apparatus 200 are included in one or more back-end commissioning tools 138a, 138b. Generally, a back-end commissioning tool 138 is a laptop or desktop computer (e.g., reference 138a), a tablet or hand-held smart device (e.g., reference 138b), or other portable or stationary computing device disposed in the back-end environment 125. At least some of the back-end commissioning tools 138 may be stand-alone back-end commissioning devices or tools. Additionally or alternatively, at least some of the back-end commissioning tools 138 may be a part of the AMS or other asset system 132, and/or at least some of the back-end commissioning tools 138 may be a part of other centralized back-end systems, such as a control module or functional engineering development system, a centralized administrative system, a centralized operator interface system, etc.

Of note is that all instances of the set of parsing rules 210 are consistent across the process plant 5. In particular, the set of parsing rules 210 (and any portions thereof) are consistent across the field environment 122 and the back-end environment 125 of the process plant 5, as well as across the commissioning tools 135, 138 utilized to commission the process plant, and at any other location at which the set of parsing rules 210 for the plant 5 are disposed. However, different instances of the tag parsing apparatus 200 may include different subsets of parsing rules 210 for different target devices or components, e.g., for efficiency purposes.

Figure 3B:
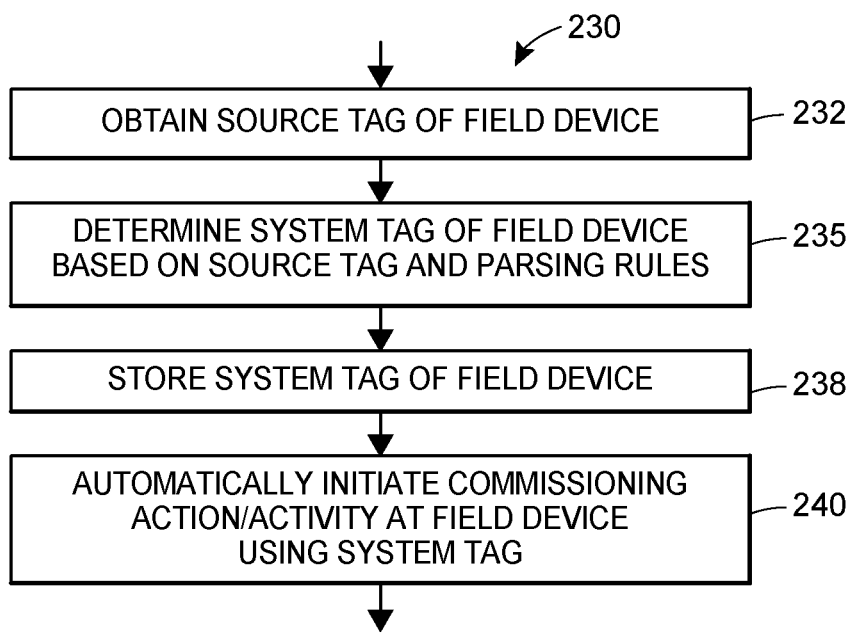
FIG. 3B depicts a flow diagram of an example method of tag parsing.

FIG. 3B depicts an example method 230 of tag parsing, which may be performed at least in part by the tag parsing apparatus 200 of FIG. 3A, or by any other suitable apparatus. In an embodiment, the tag parser 208 of the tag parsing apparatus 200 performs the method 230, or portions thereof. Typically, but not necessarily, at least a portion of the method 230 is performed in the field environment 122 of the process plant 5.

At a block 232, the method 230 includes obtaining 232 a source identifier or tag that uniquely identifies a physical field device 102 within the process plant 5. The format of the source identifier or tag (e.g., alphanumerical characters, other types of characters such as dashes, dots, etc., an ordering and number of characters, etc.) may be in accordance with a particular process communication protocol, such as the HART, WirelessHART, or HART-IP communication protocol or some other industrial process protocol. Alternatively, the source tag may take some other suitable format such as model/serial number, bar code, QR code, etc.

The source identifier or tag of the field device 102 may be obtained 232 by one or more field commissioning devices 135 and/or by an asset management or other system 132 disposed in the field environment 122 of the process plant 5. For some devices, the source tag may be obtained 232 by the field device 102 itself. In an example, a source tag is obtained from a memory of an intelligent field device 102a, 102b. In another example, a source tag is obtained from an asset management or other inventory/installation system 132. In yet another example, a source tag is obtained by a field commissioning device 135, e.g., by reading a file or by receiving the source tag via a communication interface. In some situations, a source tag of the field device 102 is obtained by an interface of a field commissioning device 135, such as by a near-field or short-range communication interface (e.g., NFC, RFID, etc.), or by an optical interface such as a scanner or camera. For instance, a field commissioning device 135 scans, reads, or otherwise optically obtains 230 a label, barcode, image, QR code, or other representation of the source tag of the field device 102, and the field commissioning device 135 automatically determines the characters included in the source tag of the field device 102 by using image processing and/or other suitable techniques.

The format of the source tag (alphanumerical characters, other types of characters such as dashes, dots, etc., an ordering and number of characters, etc.) may be in accordance with a particular process communication protocol, such as the HART, WirelessHART, or HART-IP communication protocol or some other industrial process protocol. Alternatively, the source tag may be of some other suitable format such as model/serial number, bar code, etc. The source tag of the field device 102 may be obtained 232 while the field device 102 is in any of a number of states, such as unpowered, powered up, I/O-unallocated, I/O-allocated, disconnected, connected, and/or the like. Discussions of various states of the field device 102 are described in other sections of this disclosure.

At a block 235, the method 230 includes determining or deriving one or more system tags corresponding to the field device 102 based upon the obtained source tag indicative of the field device 102 and a set of parsing rules 210. For example, a device tag and/or one or more device signal tags associated with the field device 102 are determined or derived at the block 235. Typically, a total number of characters of a system tag is different than a total number of characters of a source tag, and as such, the set of parsing rules 210 indicates a truncation, a deletion of various characters, an addition of various characters, a combination and/or manipulation of numerical characters included in the source tag, and/or another technique for modifying the length of the source tag. Accordingly, at the block 235, the characters of the system tag are derived or otherwise determined from the characters of the source tag.

In some embodiments (not shown), the method 230 includes determining or deriving other tags or identifiers associated with a process loop 100 based on the source tag of the device 102, the system tag of the device 102, and/or the set of parsing rules 210. In an example, a control tag identifying the process loop 100 within the process plant 5 is determined or derived based on the source tag of the device 102, the system tag of the device 102, and/or the set of parsing rules 210.

In some embodiments (also not shown), the method 230 includes defining, configuring, and/or otherwise modifying the set of parsing rules 210. For example, the parsing rules 210 may be defined, configured, and/or modified for additional devices or device types 102, different portions of the process plant 5, different plant locations, different commissioning devices 135, or otherwise as desired.

At any rate, at a block 238, the method 230 includes storing the system tag of the field device 102 (and optionally any other information that was automatically derived or determined at the block 235) into one or more memories disposed in the field environment 122 of the process plant 5. For example, when the field device 102 is an intelligent field device, the system tag may be stored in an internal memory of the field device 102. The system tag may additionally or alternatively be stored in a memory of other components within the process loop 122, such as at the I/O terminal block 105, the I/O card 108, an electronic marshaling block or apparatus, an electronic marshaling component such as a CHARM 110, etc. Still additionally or alternatively, the system tag of the field device 102 may be stored in one or more field commissioning tools 135 and/or in an asset management or other system 132.

At a block 240, the method 230 includes utilizing the stored system tag of the field device 102 to perform one or more commissioning activities or actions at the field device 102 in the field environment 122 of the process plant 5. Typically, but not necessarily, the field device 102 is in an I/O-unallocated or I/O-disconnected state while the one or more commissioning activities or actions are being performed (and for that matter, is in an I/O-unallocated state during the execution of any one or more of the blocks 232-238 of the method 230). Examples of commissioning activities or actions that may be performed at the field device 102 using the stored system tag (block 238) include powering up and powering down the field device 102, injecting test signals and verifying respective responses, automatic generation of at least a portion of an as-built I/O list including the field device 102, automatic generation of at least a portion of an as-built loop diagram or map including the field device 102, etc.

In some scenarios, the block 240 includes automatically initiating the one or more commissioning activities or actions utilizing the system tag of the field device 102. For example, a particular commissioning action using the system tag of the field device 102 is automatically initiated upon completion of the system tag's derivation (block 235) or upon completion of storing the system tag (block 238). In some scenarios, the block 238 additionally or alternatively includes providing the system tag of the field device 102 to another device disposed in the field environment 122 of the process plant 5, e.g., for use in another commissioning action that involves both the field device 102 and the another device. For example, the system tag of the field device 102 may be provided to a respective CHARM 110, and a portion of the control loop 100 including both the field device 102 and the CHARM 110 may be commissioned using the system tag of the field device 102.

Input/Output (I/O) Allocation State

Another key aspect of smart commissioning is the availability, in the field environment 122 of a process plant 5, of an I/O-allocation state of a device, such as the field device 102, and the ability to at least partially configure the device based on its I/O-allocation state. Generally speaking, an I/O allocation state of a device 102 is indicative of whether or not a device has been or is allocated to a particular I/O card and, in some cases, to a particular I/O channel. For example, a device 102 is deemed to be in an I/O-unallocated state when a particular physical I/O address and/or particular I/O channel has not yet been assigned to the device 102 in the field environment 122, that is, the mapping of the particular device 102 to the particular physical I/O address/channel is not available in the field environment 122. On the other hand, the device 102 is deemed to be in an I/O allocated state when a particular physical I/O address (and optionally particular I/O channel, e.g., for wired devices) has been assigned to the device 102 in the field environment 122, and said assignment is stored in one or more components installed in the field environment 122, thereby making available the mapping between the device 102 and the assigned particular I/O card and/or particular I/O channel. With the availability of I/O-allocation states of devices in the field environment 122 and the ability to at least partially configure unallocated devices, various commissioning actions and/or activities can be initiated, performed, and even completed 122 while various devices are in the I/O-unallocated state without having to wait for assignments to particular I/O cards and particular I/O channels, as is currently required during traditional field commissioning.

Referring to FIGS. 2A-2C to illustrate, the I/O-allocation state of the field device 102b, 102d is indicative of whether or not the field device 102b, 102d has been allocated to its respective I/O card 108 and/or to its respective I/O channel of the card 108. For field devices 102a, 102c that are electronically marshaled, the I/O-allocation state of the field device 102a, 102c is indicative of whether or not the field device 102a, 102c has been allocated to its respective CIOC 145, CHARM terminal block 150, and/or CIOC channel. Generally, though, for ease of reading herein, an "I/O-allocation state" of a device and related terms such as "I/O-allocated," "I/O-unallocated," etc. are indicative of whether or not the device has been assigned to any type of I/O card and/or I/O channel at all, e.g., to any legacy or smart I/O card, CIOC, WIOC (Wireless I/O Card), safety information system Logic Solvers (e.g., simplex, complex, smart logic solvers, CSLSs (CHARM Smart Logic Solvers) etc.), or any other known type of card/channel used in process control and/or safety information systems to perform I/O functions corresponding to a device. As such, for ease of reading, the terms "I/O card "I/O channel," and "I/O node" are generally used herein to refer to any type of I/O card, I/O channel, and I/O node.

Device containers or placeholders enable the availability of I/O-allocation states of the devices 102 in the field environment 122, as well as the ability to at least partially configure and commission a device 102 in the field environment 122 while its specific I/O connection has not yet been defined or provided by the back-end environment 125. Generally speaking, a device container or a placeholder for a field device 102 holds or stores an I/O-abstracted configuration for the device 102, as is explained below.

A device container or placeholder is implemented, for example, as a configurable object (or as another suitable definition storage representation) that is able to be configured, in the field environment 122, into particular instances of containers or placeholders for respective devices. Device containers or placeholders may be provided in the field environment 122 by the asset management or other inventory or installation system 132, and/or by field commissioning devices 135. For certain smart field devices 102c, 102b, a respective instance of a device placeholder or container corresponding to the smart field device 102a, 102b may be stored in the device's memory, either a priori, or by way of transfer into the device's memory, e.g., prior to the device 102 being installed in the field environment 122, or after the device 102 has been installed in the field environment 102.

A device container or placeholder object includes a field or property for storing a device's I/O-allocation state. The device container or placeholder object includes additional fields or properties for storing various device configuration parameter values prior to the device's physical I/O layout being defined. That is, for a device 102 in an I/O-unallocated state, at least a partial or abstracted configuration of a device 102 can be defined and stored in its corresponding device container or placeholder along with abstracted I/O type information so that the device 102 can be at least partially configured and commissioned without knowledge of the device's exact I/O configuration, and in some cases even without the presence or even the creation of the device's corresponding physical I/O node. Further, a device container or placeholder object is common for multiple types of devices and independent of a particular type of I/O of a corresponding physical device. Generally speaking, various properties of a device container or placeholder object may be exposed properties, and/or various properties of a device container placeholder object may be hidden properties.

Figure 4A:
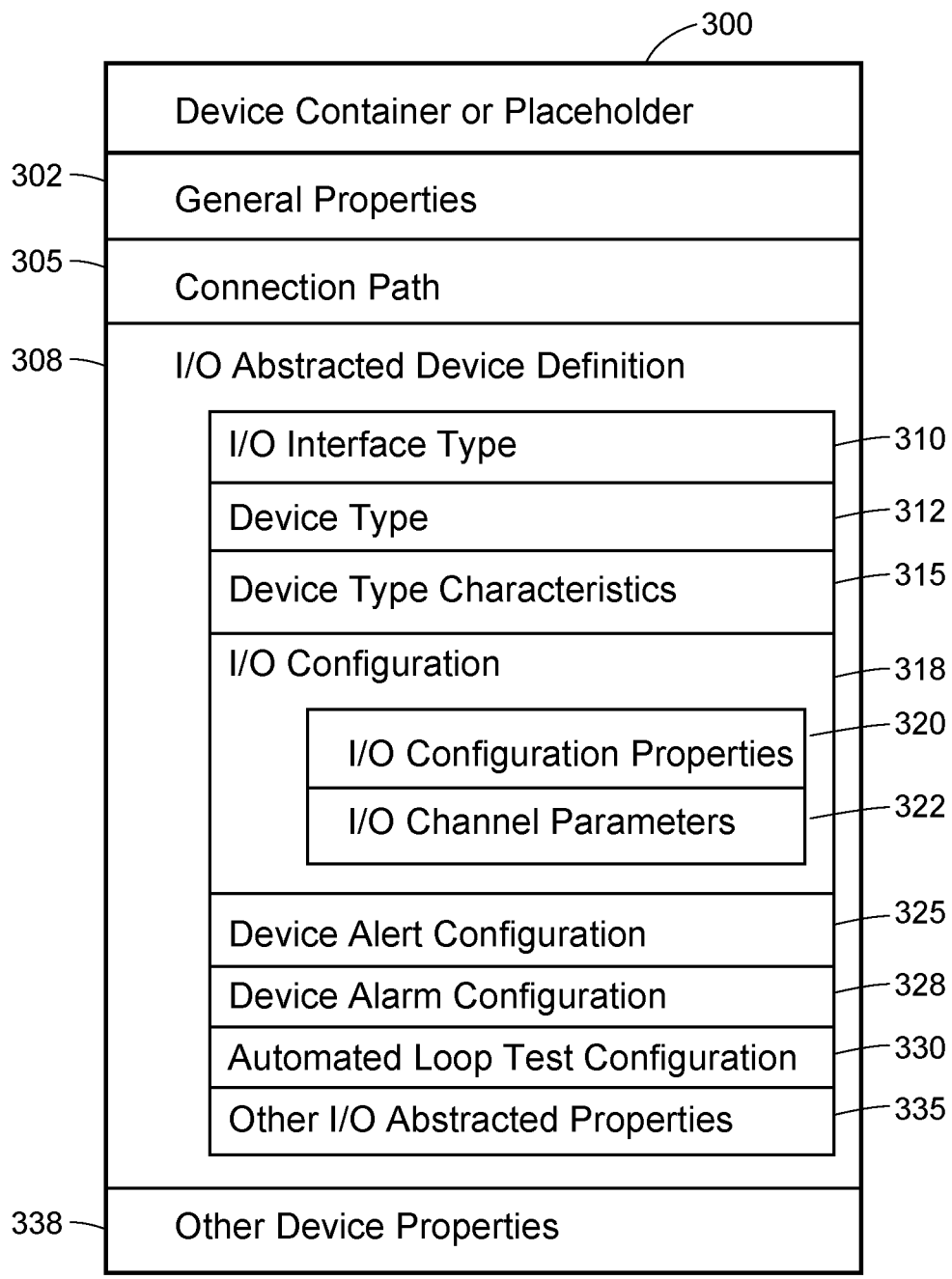
FIG. 4A illustrates an example device container or placeholder object which may be used during smart commissioning.

FIG. 4A depicts an example device container or placeholder object template 300 utilized in the field environment 122 of the process plant 5. Using the device container or placeholder object 300, a user is able to create an instance of the device placeholder object 300 to define, using I/O-abstracted information, a device 102 to the process control system 5 so that, for example, various commissioning actions involving the device 102 are able to be performed while the device 102 is in an I/O-unallocated state (that is, before the device 102 has been allocated to a particular physical I/O card, I/O channel, and/or I/O node). For example, a user may begin defining an instance of the device container or placeholder object 300 for the device 102 by entering desired values for a set of General Properties 302 corresponding to the device 102, e.g., Name, Description, Cabling ID, Typical Wiring Diagram, etc. For HART devices in particular, the General Properties 302 additionally include HART-specific properties such HART Description, HART Device Definition, HART Long Tag, Naming Reference Type, and Naming Reference SubType, to name a few. For other types of devices that are non-HART (not shown), other properties corresponding to the type of devices may be included in the object 300. In an embodiment, a device container or placeholder object 300 indicates whether the object 300 corresponds to a Basic Process Control System (BPCS) device or to a Safety Instrumented System (SIS) device, e.g., by exposing another General Property 302 or by having different types of device placeholder objects 300 respectively correspond to BPCS devices and SIS devices.

The device placeholder object 300 also includes a Connection Path property 305, whose value is indicative of whether or not a corresponding device is in an I/O-allocated state or in an I/O-unallocated state. Typically, but not necessarily, upon initialization of an instance of a device placeholder object 300 that a user wishes to configure for a corresponding device, the default value of the Connection Path property 305 of the instance is set to "I/O-unallocated," and after the explicit I/O hardware connections have been defined, the Connection Path property 305 of the instance is changed to "I/O-allocated." At any rate, based upon the Connection Path property 302 being set to "I/O-unallocated" for the device 102, one or more other properties or fields (e.g., references 308-338) of the object 300 are exposed for the user to enter respective values therein to further define or configure the instance. At least some of the properties 308-338 are "I/O-abstracted" properties, that is, properties whose values indicate the abilities, characteristics, and/or behaviors of the subject device, but whose values are not based on (and do not require knowledge of) an actual, assigned physical I/O connection to the subject device.

For example, the device placeholder object 300 includes a set of I/O-Abstracted Device Definition properties 308 via which the user may define or configure a subject device using I/O abstractions. For a device 102 in an I/O-unallocated state (e.g., as indicated by the Connection Path property 305), the I/O-Abstracted Device Definition 308 includes an I/O-Abstracted Interface Type property 310 whose value can be defined or selected to be indicative of a type or category of I/O interface via which the physical device 102 is able to physically connect. Possible values for the I/O-Abstracted Interface Type property 310 include, for example, "conventional" (e.g., for dumb, non-smart, non-HART, traditional, and/or legacy devices), "HART," "WirelessHART," "SIS conventional," "SIS HART," etc.

After the I/O-Abstracted Interface Type 310 in the object 300 has been defined, additional properties corresponding to the defined/populated I/O-Abstracted Interface Type 310 may be exposed to allow the user to further refine the I/O-Abstracted Device Definition 308. For example, for a defined I/O-Abstracted Interface Type 310 of "conventional," "SIS conventional," or "HART," an I/O-Abstracted Device Type property 312 is exposed. Generally speaking, the I/O-Abstracted Device Type property 312 indicates the type or category of the device 102, thereby further refining the I/O-Abstracted Device Definition 308 of the device 102. Examples of possible I/O-Abstracted Device Types 312 include Current Input, Current Output, Discrete Input, Discrete Output, Pulse Input, Continuous Pulse Output, Thermocouple Input, Millivolt Input, RTD (Resistance Temperature Detector) Input, Thermocouple Input, Voltage Input, 24 VDC Power, HART Analog Input, HART Two-State DVC Output, WirelessHART, etc.

Some I/O-Abstracted Interface Types 310, though, may not result in any I/O-Abstracted Device Types 312 being exposed (e.g., various properties may remain hidden), while other I/O-Abstracted Interface Types 310 may result in one, two, or more I/O-abstracted Device Types 312 being exposed. The mappings or associations of particular I/O-Abstracted Interface Types 310 to one or more I/O-Abstracted Device Types 312 (if any) may be defined a priori, and in some cases, may be modifiable.

After the I/O-Abstracted Device Type 312 in the object 300 has been defined, for some I/O-Abstracted Device Types 312, one or more I/O-Abstracted Device Characteristic properties 315 may be exposed to still further refine the I/O-Abstracted Device Definition 308. For example, if the I/O-Abstracted Device Type 312 is defined to be "Current Input," a corresponding I/O-Abstracted Device Characteristic 315, e.g., "Device SubType," is exposed for storing a corresponding descriptive value, e.g., "0-20 mA," "4-20 mA," etc. In another example, if the I/O-Abstracted Device Type 312 is some type of HART device (e.g., HART analog input, HART Two-State DVC Output, WirelessHART, etc.), corresponding I/O-Abstracted Device Characteristics 315 such as the "HART Manufacturer," "HART Model," and "HART Revision" of the device 102 are exposed so that the respective HART information can be stored in the Definition 308. Some I/O-Abstracted Device Types 312 do not result in any I/O-abstracted Device Characteristics 315 being exposed, while other I/O-Abstracted Device Types 312 may result in one, two, or more I/O-abstracted Device Characteristics 315 being exposed. The mappings or associations of particular I/O-Abstracted Device Types 312 to one or more I/O-Abstracted Device Characteristics 315 (if any) may be defined a priori, and in some cases, may be modifiable.

The I/O-Abstracted Device Definition 308 also includes a set of I/O-Abstracted I/O Interface Configuration properties 318 via which the abstracted properties of an I/O interface configuration for the device 102 are defined. The possible types or categories (and in some cases, specific values) of the I/O-Abstracted I/O Interface Configuration properties 318 are based on the defined I/O-Abstracted Device Definition 308, at least in part. As shown in FIG. 4A, I/O-Abstracted I/O Interface Configuration properties 318 may include various I/O Configuration Parameter properties 320 and/or I/O Channel Parameters 322 that are exposed.

For example, based on the defined property values 310-315 of the configured or defined I/O-Abstracted Device Definition 308 of the device 102, the types of I/O hardware (e.g., CHARM, I/O Card, etc.) that are compatible with the configured or defined device 102 are determined. The compatibility between various Device Definition values 308 and various types of I/O hardware may be defined a priori, and in some cases, may be modifiable. In an embodiment, the compatibilities between Device Definition values 308 and types of I/O hardware are stored in compatibility matrices or in other suitable formats. Additionally, each type of I/O hardware that is compatible with the configured or defined I/O-Abstracted Device Definition 308 of the device 102 in turn corresponds to a respective set of I/O-Abstracted I/O Configuration Parameter properties 320. Accordingly, the respective set of I/O-Abstracted I/O Configuration Parameter properties 320 is exposed in the I/O-Abstracted I/O Interface Configuration 318 for further refinement of its definition for the device 102. For some analog, wired, or conventional types of I/O hardware, the respective I/O-Abstracted I/O Configuration Parameter properties 320 include one or more Channel Parameter properties 322 that are exposed for further refinement of the I/O-Abstracted I/O Interface Configuration 318 for the device 102. For types of I/O hardware that are not analog, wired, and/or conventional (e.g., digital or smart I/O hardware types), Channel Parameter properties 322 are excluded, e.g., are not exposed or are hidden.

To illustrate, suppose the I/O-Abstracted Device Definition 308 of the device 102 is configured as a Conventional Current Input 4-20 mA Device. Such an I/O-Abstracted Device Definition 308 is compatible (e.g., as determined based on the compatibility mappings or associations) with two particular types of I/O hardware, e.g., an AI (Analog Input) 4-20 mA HART CHARM and an IS (Intrinsically Safe) AI 4-20 mA HART CHARM. Accordingly, the respective sets of I/O-Abstracted I/O Configuration Parameter properties 320 for both the an AI (Analog Input) 4-20 mA HART CHARM and the IS AI 4-20 mA HART CHARM are exposed in the I/O-Abstracted I/O Interface Configuration 318 for configuring and/or defining. As both compatible types of I/O hardware are conventional types of I/O hardware, respective Channel Properties 322 corresponding to each of the compatible types (e.g., Anti-Aliasing Filter, Underrange Limit, Overrange Limit, NAMUR Limit Detection, etc.) are exposed for further refinement of the I/O-Abstracted I/O Interface Configuration 318 for the device 102.

The mappings or associations of one or more particular Channel Properties 322 to one or more particular types of I/O-Abstracted I/O Configuration Parameter properties 320 and/or to one or more particular types of I/O hardware (and therefore, to respective, particular I/O Abstracted Device Definitions 308) may be defined a priori, and may be modifiable. Similarly, for types of I/O hardware that are not analog, wired, and/or conventional (e.g., digital or smart I/O hardware types), the mappings or associations of one or more particular I/O-Abstracted I/O Interface Configuration properties 318 to one or more particular types of I/O hardware (and therefore, to particular I/O Abstracted Device Definitions 308) may be defined a priori, and may be modifiable.

Other properties which may be included in the I/O-Abstracted Device Definition 308 include device protocol specific properties, such as the example HART Device Alert properties 328, the example HART Device Alarm properties 330, Automated Loop Test Configuration properties 332, and/or other I/O-Abstracted properties 335. Of course other device protocols, such as Foundation Fieldbus protocol devices, CAN devices, Profibus devices, etc. may have other predefined properties that may be configured according to those protocols. As illustrated in FIG. 4A, the example HART Device Alert properties 328 and HART Device Alarm properties 330 are exposed for definition when the I/O-Abstracted Device type 312 is set to HART or WirelessHART. Generally speaking, the HART Device Alert properties 328 and the HART Device Alarm properties 330 define what types of alarms (if any) are to be raised for various types of alerts, and their respective behaviors. Examples of types of alarms include Advisory, Failed, Maintenance, Not Communicating, No Alarm, etc. Examples of types of alerts include, e.g., Field Device Malfunction, Configuration Changed, Primary Variable Out of Limits, CPU EEPROM write failure, and/or other alerts that relate to HART devices. The Automated Loop Testing Configuration properties 332 define values of various aspects of and Automated Loop Test that involves the subject device. For example, values indicative of the types and levels of test signals that are to be generated for an Automated Loop Test may be stored in the Automated Loop Testing Configuration properties 332. Of course, any other desired I/O-Abstracted properties 335 of the I/O-Abstracted Device Definition 308 may be additionally or alternatively exposed for definition or configuration. Additionally, any other properties 338 of the object 300 (which may or may not be I/O-Abstracted) may be additionally or alternatively exposed for definition or configuration. Generally speaking, for the device 102, the particular values 302-338 stored in the instance of its device container object 300 define or configure the particular device 102 in an I/O abstracted manner, at least in part.

Generally, a conventional device is considered to be sufficiently defined or configured, using I/O-abstracted information, when its corresponding I/O-Abstracted I/O Interface Type 310, I/O-Abstracted Device Type 312, Device SubType Characteristic 315 properties have been provided, selected, or otherwise defined, and a HART device is considered to be sufficiently configured or defined, using I/O-abstracted information, when its I/O-Abstracted I/O Interface Type 310, I/O-Abstracted Device Type 312, and I/O-Abstracted Device Characteristics 315 Manufacturer, Model, and Revision properties have been provided, selected, or otherwise defined.

Further, in some implementations, at least some of the values of the properties held or stored in the instance of the device placeholder 300 of the field device 102 are stored as metadata. For example, any one or more of the property values 305-308 and one or more General Property values 302 may be held or stored as metadata.

Thus, the device container or placeholder object 300 enables the configuration, in an I/O-abstracted manner, of a particular device 102 and the field environment 122 before the device's particular I/O card, I/O channel, and/or I/O node has been assigned to the device 102. In particular, the device placeholder object 300 allows the configuration of the particular identity of the field device 102 (e.g., its Name, its Long Tag, its HART Device Definition if the device 102 is a HART device, etc.) and various attributes of the device 102 (references 308-335, and optionally, selected properties in 302 and 338), at least some of which are I/O-abstracted. The attributes of the field device 102 include descriptive attributes of the device 102 as well as behavioral attributes or behaviors of the device 102 when various conditions occur, such as alarms, alerts, detection of under range and/or over range limits, as well as other behaviors. At least some of the attributes of the field device 102 are indicative of a respective category, type, or characteristic corresponding to the device 102 instead of an explicit identification (e.g., types 310, 312, 318, etc.), and as such are "I/O-abstracted."

Further, at least some of the property values 302-338 that are held or stored in the device placeholder object instance of the device 102 are preserved or carried through in the process control system 5 upon or after the assignment of the device 102 to a particular I/O card, particular I/O channel, and/or particular I/O node, e.g., after the device's Connection Path property 305 is changed to indicate that the device 102 is in an I/O-allocated state, as will be described in a later section.

For clarity, the above discussion of configuring device container or placeholder objects 300 includes a user entering, configuring, or otherwise defining the desired values for various properties 302-338 via a user interface, such as via a user interface of an asset management system 132 and/or a field commissioning tool 135. However, at least due to the I/O-abstracted nature of the Device Definitions 308 of devices that are in the I/O-unallocated state, at least some of the desired property values 302-338 (e.g., for exposed properties and/or for hidden properties) may be automatically configured, defined, and populated by a configuration application 340 executing at the asset management system 132, at a field commissioning tool 135 (e.g., as depicted in FIGS. 2A and 2C), or at some other computing device. In an example, the configuration application 340 automatically populates at least some of the property values 302-338 based on information stored in one or more files, databases, or data stores 342. At least some of the data files or stores 342 may be disposed locally with respect to the configuration application 340 (e.g., at the asset management system 132, at the field commissioning tool 135 as depicted in FIGS. 2A and 2C, and/or at some other local data store). Additionally or alternatively, at least some of the one or more files or databases 342 may be disposed remotely (e.g., at a remote server, databank, in cloud storage, etc., not shown) and remotely accessed by the configuration application 340.

The data stores 342 store indications or definitions of various mappings or associations of I/O-Abstracted information, e.g. between I/O-various Abstracted Interface Types 310 and various I/O-Abstracted Device Types 312, between various I/O-Abstracted Device Types 312 and various I/O-Abstracted Device Characteristics 315, between various I/O-Abstracted Device Definitions 308 and various types of I/O hardware, between various types of I/O hardware and various I/O-Abstracted I/O Interface Configuration Properties 318, between various I/O-Abstracted Device Definitions 308 and various I/O-Abstracted I/O Configuration Properties 318, between various I/O-Abstracted I/O Configuration Properties 318 and various I/O-Abstracted Configuration Parameter properties 320, between various I/O-Abstracted Configuration Parameter properties 320 and various Channel Parameter properties 332, and the like. Additionally or alternatively, the files or databases 342 may also store values of General Properties 302, such as Name, Description, Cabling ID, Typical Wiring Diagram, HART Long Tag, HART Device Definition, etc., and/or of other device properties 338. The files, data bases, or data stores 342 may be implemented in any suitable format (e.g., compatibility matrices, tables, referential databases, etc.) and may be implemented across any number of data storage devices.

Accordingly, based on the I/O-abstracted nature of the Device Definitions 308 of devices that are in the I/O-unallocated state and using the contents of the data stores 342, the configuration application 340 is able to bulk-configure at least some of the property values 302-338 for multiple devices, e.g., those that share one or more common property values 302-338, thereby facilitating consistency in tracking of device configurations across different areas within the process plant 5 and efficiencies during commissioning.

Turning now to the Name property included in the General Properties 302 of the object 300, the Name property is subject to the same Naming and Namespace rules as are logical device identifiers utilized within the process control system 5, such as the Naming and Namespace rules for Device Tags and Device Signal Tags. As such, in an embodiment, the Name property stores the Shortened Tag (ST) of the device 102, which, as discussed above with respect to FIGS. 3A and 3B, may be automatically derived from the device's Long Tag (LT), e.g., by a tag parser apparatus 200. Accordingly, in some situations, the tag parser apparatus 200 receives a particular device's Long Tag (LT) from the configuration application 340, or directly accesses the files or databases 342 to read or otherwise obtain the particular device's Long Tag, and then operates on the obtained Long Tag to determine the device's Shortened Tag (ST), e.g., in a manner such as described above. In some situations, the tag parser apparatus 200 bulk reads a plurality of device Long Tags (LTs) from one or more of the files or databases 342, generates a corresponding plurality of device Shortened Tags (STs), and stores the generated plurality of Shortened Tags (ST) in one or more of the files or databases 342 for subsequent access by the configuration application 340 to populate respective Name properties of multiple devices. In some situations, rather than reading or accessing the files 342 to obtain a device's Shortened Tag (ST), the configuration application 340 receives a device's Shortened Tag (ST) from the tag parser apparatus 200, either on a per-device basis or in bulk.

It is noted that although the configuration application 340 and the tag parser apparatus 200 are discussed as separate entities, in some implementations, the configuration application 300 and the tag parser apparatus 200 are at least partially an integral entity. For instance, the tag parser apparatus 200 may be included in the configuration application 340, or the tag parser 208 may be included in the configuration application 340.

Figure 4B:
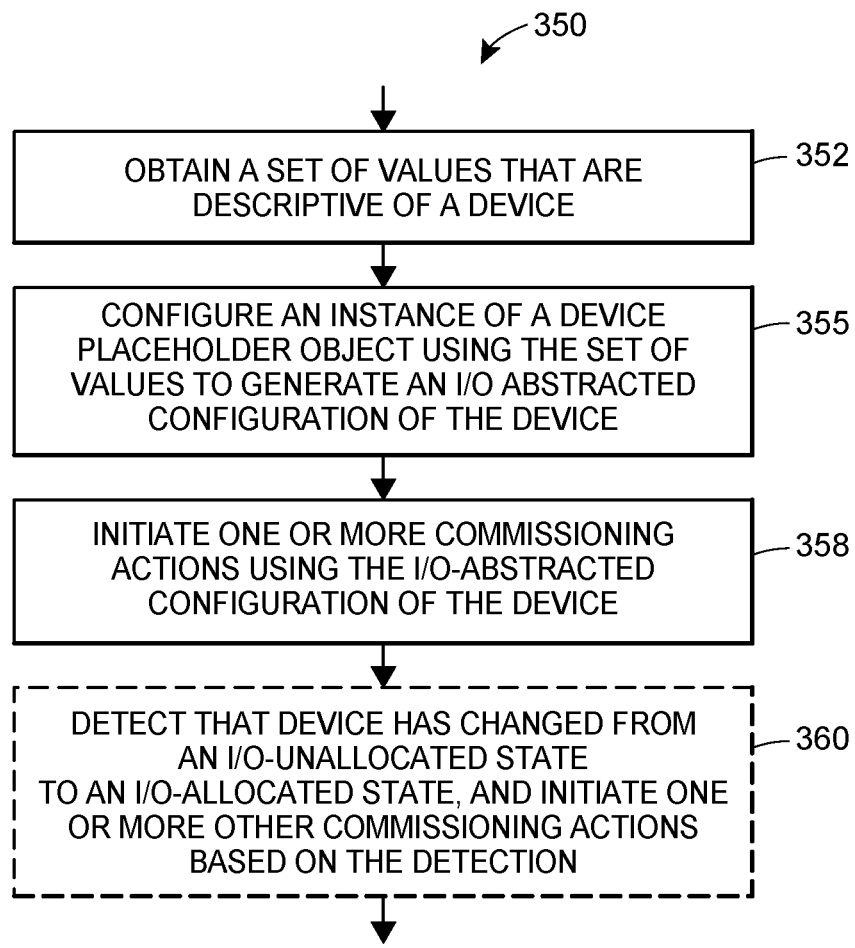
FIG. 4B depicts a flow diagram of an example method for commissioning a process plant.

FIG. 4B depicts an example method 350 of commissioning a process plant, which may be performed at least in part by the asset management system or other system 132 disposed in the field environment, by one or more field commissioning devices 135, and/or by any other suitable apparatus disposed in the field environment 122 of the process plant 5. For ease of illustration, but not for limitation purposes, the method 350 is described with simultaneous reference to FIGS. 1-4A. Generally speaking, at least a portion of the method 350 (and in some situations, the entirety of the method 350) executes within the field environment 122 of the process plant 5, for example, in a staging area of the field environment 122 and/or in an installation area of the field environment 122.

At a block 352, the method 350 includes obtaining a set of values that are descriptive of a field device 102 for population into various properties of a device placeholder object 300 for the field device 102. During run-time of the process plant 5, the field device 102 is to perform a physical function in the field environment 122 of the process plant 5, and is to send and/or receive data corresponding to the physical function to control a process within the process plant 5. The data corresponding to the physical function is to be sent and/or received via a port that is communicatively connected to an I/O device. However, during the execution of the method 350, the field device 102 is in an I/O- unallocated state, e.g., the field device 102 is unassigned (e.g., not yet assigned) to communicate via any I/O device.

At least some of the set of values particularly identify the field device 102 within the process plant 5, e.g., its Name, its Long Tag, a HART Device Definition (if the field device 102 is a HART device), etc. Additionally, at least some of the set of values are respectively indicative of a respective category of type that is descriptive of the field device 102. For example, the set of values may include one or more values, each of which is respectively indicative of an I/O interface type 310, a device type 312, a characteristic of the device type 315, an I/O configuration type 318, one or more properties/parameters of the I/O configuration type 320, one or more channel parameters of the I/O configuration type 322, a device alert configuration 328, a device alarm configuration 330, an automated loop test configuration 332, or other types or categories 335, 338 of descriptive attributes of the field device 102.

At least some of the set of values corresponding to the field device 102 are obtained (block 352) from one or more sources. For example, at least some of the values descriptive of the field device 102 may be obtained by reading the values from a file or data store, by receiving the values via a communication link, by receiving the values via a user interface, by receiving the values from another application, and/or by any other known means of obtaining data. Significantly, though, the set of values that are descriptive of the field device 102 are obtained (block 352) while a loop (or portion thereof) in which the field device 102 is included is communicatively disconnected from the back-end environment 125 of the process plant 5. For example, none of the set of values is able to be obtained from a control configuration tool or application that is utilized at the back-end environment 125 of the process plant 5, as communication paths between the field environment 122 and the back-end environment 125 via the control loop 100 (e.g., via the field device 102, an assigned I/O card, the controller 120, and the back-end data highway or backbone 10) have not (yet) been set up or established.

Some of the set of values corresponding to the field device 102 may be obtained (block 352) by automatic derivation from another obtained value. For example, the device's source tag may be obtained from a source, and a system tag of the field device 102 may be automatically derived from the obtained source tag.

At a block 355, the method 350 further includes configuring an instance of a device placeholder object 300 for the field device 102 using the obtained values that are descriptive of the field device 102, thereby defining an I/O-abstracted configuration of the device 102. Configuring the device placeholder object instance of the field device 102 includes populating respective fields or properties of the object 300 with respective values descriptive of the field device 102.

It is noted that not all configured instances of device placeholder objects 300 include the same set of properties. Different sets of properties may be exposed based on one or more populated values of other properties included in the object 300. As such, configuring the instance of the device placeholder object 300 for the field device 102 (block 355) includes, for some scenarios, exposing an additional property of the object 300 based on a value that has been populated into another property of the object 300 (not shown in FIG. 4B). For example, based on the I/O-Abstracted Interface Type property 310 being populated as Conventional, the I/O-Abstracted Device Type property 312 is exposed for its respective population (e.g., to Current Input, Current Output, etc.). The associations of the particular exposure of additional properties based on particular populated values of other properties may be stored, for example, in a file, database, or data store 342 that stores indications of the associations or mappings. Further, the range of possible population values for the newly exposed property may also be stored in the file, database, or data store 342.

It is also noted that while a configured instance of a device placeholder object 300 includes I/O-abstracted values for various properties (e.g., I/O-Abstracted Interface Type, I/O-Abstracted Device Type, etc.), the configured instance may include explicit values for other properties. For example, alarm limits may be set to explicit values, and certain I/O configuration property parameter values may be set to explicit values.

At a block 358, the method 350 includes initiating one or more commissioning actions at the field device 102 while the field device is in the I/O-unallocated state. The one or more commissioning actions are initiated based on the I/O-abstracted configuration of the field device 102. In an example, upon detection that the field device 102 is in the I/O-unallocated state, as indicated by the value held or stored in the configured device placeholder object instance of the field device 102, one or more commissioning actions are initiated (block 358). Additionally or alternatively, one or more commissioning actions may utilize at least some of information or data stored in the I/O-abstracted configuration of the field device 102. For example, the Name of the field device 102 (which may be, for example, a Device Tag or Device Signal Tag corresponding to the field device 102) may be utilized to verify the identity of the installed field device 102 and to generate test signals. In another example, the values populated into the HART Device Alert 328 and HART Device Alarm Configuration 330 define the behavior or the field device 102 for alerts and/or alarms, and these expected behaviors are identified, tested, and/or verified by one or more commissioning actions.

In an optional block 360, the method 350 includes detecting or determining that the field device 102 has changed to the I/O-allocated state, thus signifying that the field device 102 has been assigned to a particular I/O device, particular I/O channel, and/or particular I/O node. Based upon the detection that the device 102 is in the I/O-allocated state, one or more other commissioning actions may be initiated, and these other commissioning actions may utilize at least some of the information or data that was held or stored by the I/O-abstracted configuration of the field device 102. For example, an Automated Loop Test performed on the loop 100 may utilize the values that were populated into the Automated Loop Test configuration properties 332 for the field device 102, and that indicate the different signal levels that are to be generated at the field device 102 to test and/or verify the process control loop 100 behavior.

In some embodiments, the method 350 is executed in its entirety without requiring or using any user input aside from possibly receiving an initiation command for the method 350 from a user interface. For example, upon receiving a user command to initiate the method 350, and I/O-abstracted configuration for the field device 102 is automatically generated or defined (e.g., blocks 352, 355) without any intervening user input and one or more commissioning actions that utilize the generated I/O-abstracted configuration of the device 102 are automatically initiated (e.g., block 358) without any intervening user input.

Further, in some scenarios, the method 350 is extended to apply to a plurality of field devices 102, which may include different types of field devices (e.g., sensors, valves, measurement devices, etc.). In an example scenario, block 355 of method 350 is performed for the plurality of field devices 102 (e.g., in serial and/or in parallel without any intervening user input), thereby bulk configuring the plurality of field devices 102 in an I/O-abstracted manner. Indeed, in one embodiment, the entirety of the method 350 is automatically performed for a plurality of field devices without requiring or using any user input (aside from possibly receiving an initiation command from a user interface). That is, I/O-abstracted configurations for the plurality of field devices are automatically generated or defined without any intervening user input, and one or more commissioning actions that utilize generated the I/O-abstracted configurations are automatically initiated without any intervening user input.

Distribution of Device Information in Field Environment

Accordingly, the I/O-abstracted configuration of the device 102 is available in the field environment 122 for use in various commissioning activities while the device 102 is in the I/O-unallocated state and/or while the loop 100 including the device 102 is communicatively disconnected from the back-end environment 125. In the field environment 122, one or commissioning activities that utilize at least some of the information held or included in the I/O-abstracted configuration of the device 102 may be performed at or on the device 102, for example, when the device 102 is initially installed, when a communicative connection is available at the device 102 (e.g., a wire is received at a port of the device, a wireless transceiver of the device 102 is activated, etc.), when the device 102 is communicatively connected to a CHARM 110a, etc. For example, using the I/O-abstracted configuration of the device, test signals in accordance with the I/O-Abstracted Device Definition 308 of the device 102 are input at the device 102 to test its responsive behavior even though the device 102 is in an I/O-unallocated state.

As such, the I/O-abstracted configuration of the device 102 is stored at a location in the field environment 122 so that the field commissioning tools 135 are able to readily access information held or stored therein. For example, at least a portion of the I/O-abstracted configuration of the device 102 may be stored locally at the commissioning device 135, in the asset management system 132, and/or in some other file or data store 342 that is accessible to the commissioning device 135. In some embodiments, an entirety of the I/O-abstracted configuration of the device 102 is stored locally at the commissioning device 135, at the asset management system 132, and/or in the file or data store 342.

Additionally, in some scenarios, at least some of the information stored in I/O-abstracted configuration of the device 102 is distributed for storage at one or more components that are associated with the field device 102 and that have been (and/or that are intended to be) installed for run-time operation in the field environment 122 to control at least a portion of the industrial process, such as other components of the process control loop 100 of which the field device 102 is a part. Of the set of information held in or stored in the I/O-abstracted configuration of the device 102, generally speaking, at the least the identification of the field device 102 such as the Name property value, Shortened Tag (ST), or other specific identification of the field device 102 is distributed to and stored at the receiving component(s). For some devices and/or for some receiving components, additional information that is stored or held in the I/O-abstracted configuration of the device 102 is also distributed and stored into the memory of the receiving components. Typically, the one or more components to which at least some of the information of the field device's I/O-abstracted configuration is distributed exclude any user interface devices (e.g., excludes field commissioning tools 135, user interfaces of the asset management system 132, and other user interface devices).

Instead, in some commissioning scenarios, the field commissioning device 135 and/or the asset management system 132 copies, transfers, or distributes at least some of the information stored in the I/O-abstracted configuration of the device 102 (e.g., the Name of the device 102 and optionally other information) to the one or more receiving components disposed in the field environment 122 of the process plant 5. In an example, the field commissioning device 135 and/or the asset management system 132 establishes (with or without human assistance) a wired or wireless communication link or connection with the receiving component, and copies, transfers, or otherwise distributes the desired information of the I/O-abstracted configuration of the field device 102 to the receiving component via the established connection for storage in a memory of the receiving component.

The distribution of the desired I/O-abstracted configuration information of the field device 102 to the receiving component may utilize any suitable electronic communication technology or technique. An example of such a suitable electronic communication technology is a short range wireless condition protocol, e.g., RFID (Radio Frequency Identification), Bluetooth, NFC (Near Field Communications), or other short range wireless communication protocol, such as is described in U.S. patent application Ser. No. 15/291,200, filed concurrently herewith and entitled "Method and System for Commissioning Process Control Hardware", the entire disclosure of which is incorporated by reference herein. It is noted, however, that different short-range wireless techniques may be utilized in different situations. For example, when the receiving component is not (yet) powered up, RFID can be used to transfer the desired device configuration information of the field device 102 from the portable commissioning device 135 or other handheld device into a memory attached to an external surface or some other external portion of the receiving component, whereas when a receiving component is powered up, another technique such as Bluetooth, Wi-Fi, or a direct, physical wire or cable may be utilized.

Indeed, when the receiving component is at least partially powered up and includes an internal memory, various wireless and/or wired techniques may be used to transfer the desired configuration information of the field device 102 for storage at the receiving component. Typically, in these situations, the receiving component includes hardware, software, and/or firmware that is configured to receive the desired configuration information of the device 102 via a wired or wireless port of the receiving component, and store the received information into the internal memory. In an example, a portable commissioning device 135 or other handheld device utilizes Bluetooth, NFC, or other short-range wireless protocol to transmit the desired device configuration information of the field device 102 via a wireless link to a wireless port of the receiving component, and the receiving component causes the received information to be stored in its internal memory. In another example, a dongle or other similar wired communication interface securely and temporarily connects the portable commissioning device 135 or other handheld device to a port of the receiving component for transferring the desired I/O-abstracted configuration of the device 102 from the portable commissioning device 135 or other handheld device to the receiving component, and the receiving component causes the received information to be stored in its internal memory. For example, a first end of a wired dongle is plugged into a port of the portable commissioning device 135 or other handheld device, and the second end is plugged into the receiving component.

In an example scenario, the receiving component of the configuration information of the field device 102 is the field device 102 itself, such as when the field device 102 is a smart field device (e.g., field device 102a, 102b). For smart field devices, the desired device configuration information is stored directly into its internal memory. For legacy field devices (e.g., devices 102c, 102d), or as desired for smart field devices 102a, 102b, the desired configuration information of the field device 102 is stored into the memory of another component or device that is (or is to be) communicatively connected to the field device 102 (e.g., a component that is included in the process control loop 100 of which the field device 102 is a part), thereby storing the configuration information at a proxy location for the legacy field device 102. In an example, the configuration information of the field device 102 is distributed to and stored at a CHARM 110a that is physically connected to the field device 102, but that has not yet been plugged into and/or assigned to a CHARM terminal block 150 or CIOC 145. In another example, the configuration information of the field device 102 is distributed to and stored at a CHARM extender disposed between the CHARM 110a and its slot at the CHARM terminal block 150.

Figure 5A:
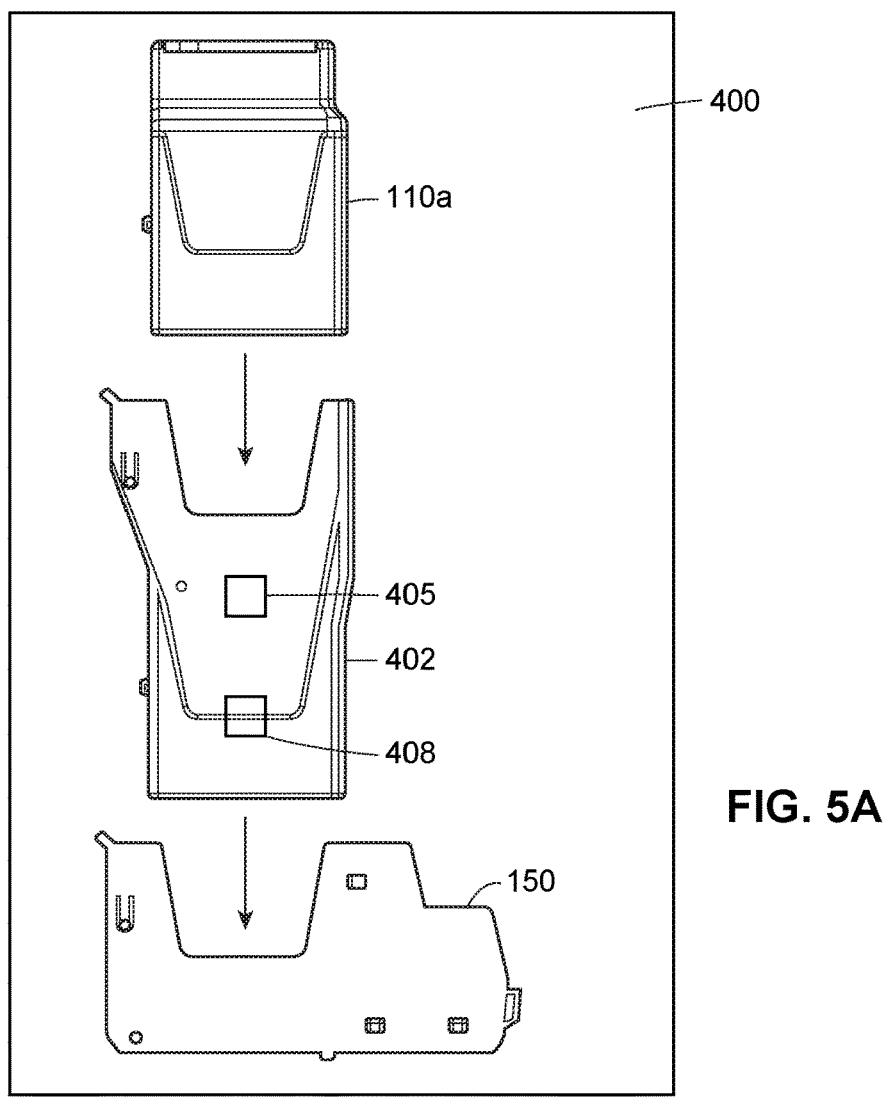
FIG. 5A illustrates an example extender for an electronic marshaling component, which may be utilized during smart commissioning.

An example of an extender for an electronic marshaling component (e.g. a CHARM extender) is shown in FIG. 5A. FIG. 5A illustrates an example exploded view 400 that includes the CHARM 110a, a CHARM extender 402, and a CHARM terminal block 150 of a field device 102. Generally speaking, a CHARM extender 402 is a physical component that is securely attachable to the CHARM 110a at one end and is securely attachable to the slot of the CHARM terminal block 150 at its another end. For example, as illustrated in FIG. 5A, the CHARM 110c may be securely received into the CHARM extender 402, which in turn may be securely received into the CHARM terminal block 150. When the CHARM 110a, the CHARM extender 402, and the CHARM terminal block 150 are securely attached to one another, a signal path from the CHARM 110a to the CHARM terminal block 150 through the CHARM extender 402 is established.

The CHARM extender 402 includes an on-board or internal memory 405 into which at least some of the configuration information of the device 102 (such as the device's system tag and/or other desired information) may be stored. In some configurations, the CHARM extender 402 includes a processor 408 to enable the read or reception of the device's configuration information from a source (e.g., from the field commissioning device 135 and/or the asset management system 132), and the storage of the device's configuration information into the memory 405. In some configurations, multiple CHARM extenders 402 are disposed and interconnected between the CHARM 110a and its terminal block 150, e.g., to provide additional memory storage capability for the legacy device 102 or for other reasons.

It is noted that although the above discussion of distributing at least some of the configuration information of the field device 102 for storage in the memory of one or more receiving components takes place after the receiving component has been installed in the field environment 122, in other scenarios, the desired device configuration information of the field device 102 its stored into a receiving component's memory at any time prior to the receiving component being installed in the field environment 122. For example, the desired configuration of the field device 102 information may be pre-configured into a receiving component, e.g., at the factory. In another example, the desired configuration information of the field device 102 may be loaded into the memory of the receiving component in a staging area of the field environment 122 prior to physical installation of the receiving component in the field environment 122.

Further, in addition to distributing desired configuration information of the field device 102 into the field device 102 itself or into its proxy, the field device's configuration information may be automatically distributed to be stored at other components associated with the field device 102 (e.g., at other components that are included with the field device 102 in a process loop 100). Said automatic distribution to additional receiving components may be triggered by one or more other conditions. For example, the automatic distribution of the field device's configuration information to another component may be triggered by the detection of a connection that has been established between the field device 102 and the other component, and/or the automatic distribution may be triggered upon a successful completion of one or more commissioning actions performed at the field device 102. Automatic distributions to some components may occur while the field device 102 is in an I/O-unallocated state, and other automatic distributions to other components may occur after the field device 102 has transitioned into an I/O-allocated state. Indeed, the transition of the field device 102 into the I/O-allocated state may itself trigger an automatic distribution of the field device's configuration information to one or more components. Generally, but not exclusively, the automatic distribution of the field device's configuration information is performed in the upstream direction in the field environment 122, e.g., distribution from components that are closer to the field device 102 towards components that are further away from the field device 102 but closer to the back-end environment 125.

The above discussed distribution concepts are illustrated by an example commissioning scenario that utilizes these and other novel techniques of said disclosure. In this example scenario, a smart field device 102 has been installed in the field environment 122 of the process plant 5, but has not yet been connected to any other devices. A field operator utilizes a hand-held field commissioning tool 135 to obtain data from an asset management system 132 to configure an instance of a device placeholder object 300, thereby defining an I/O-abstracted configuration for the smart device 102. The I/O-abstracted configuration of the device 102 includes a Shortened Tag that is indicative of the device 102, where the Shortened Tag (ST) has been automatically derived from the Long Tag (LT) (e.g., the device's HART tag) that is stored at the asset management system 132. In this example scenario, the I/O-abstracted configuration of the device 102 (or a copy thereof) is stored at the field commissioning device 135 for use during commissioning portions of the process plant 5 that include the field device 102.

The field operator performs one or more commissioning actions at the field device 102 by using the field commissioning tool 135 and at least some of the information held or stored in the I/O-abstracted device configuration of the field device 102. For example, the operator utilizes the commissioning device 135 to compare/verify device identification that is held or stored in the device's I/O-abstracted configuration information with identification information that appears on labels that are attached to the physically installed device 102 (e.g., on RFID tag or an affixed label), or that are provided on tag or label that is attached to a cable of the physically installed device 102. Upon a successful identification verification, the field commissioning tool 135 distributes the Shortened Tag (ST) of the field device 102 (and optionally, other information) to the field device 102 for on-board storage in an internal memory of the field device 102. The distribution may be triggered by the field operator's manual command at the field commissioning tool 135, or the distribution may be triggered automatically, e.g., automatically by the field commissioning device 135 or the field device 102 upon detection of a successful verification of the field device's identification information.

Additionally, one or more other commissioning activities are performed at the field device 102 while the field device 102 is in a stand-alone (and therefore, I/O-unallocated) state to verify that the device 102 operates as expected, e.g., power-up, power-down, reset, hard and soft re-starts, etc. Some of these commissioning actions or activities may include connecting the field commissioning device 135 to a port of the field device 102, and sending simulated signals from the commissioning device 135 via the port to verify the field device's resultant behavior. The simulated signals may be in a format that is in accordance with the I/O-abstracted configuration of the device 102 which is available to the field commissioning device 135.

Continuing further in the example scenario, after an initial round of commissioning actions/activities have been performed on the stand-alone device 102, the field operator then connects the device 102 to another component (e.g., another component included in the process control loop 100 of the device 102) and performs one or more commissioning actions or activities on the combination of the two connected components. For example, the field operator connects one end of a wire or cable into a port of the smart device 102 and the other end of the wire or cable at a CHARM 110*a*, thereby connecting the smart device 102 and its CHARM 110*a*. The CHARM 110*a* is thus considered as being disposed "upstream" of the device 102 as the CHARM 110*a* is closer (from a communication path perspective) to the back-end environment 125 than the field device 102. Upon detection of the establishment of the connection between the smart device 102 and the CHARM 110*a*, at least some of the device configuration information that is stored in the internal memory of the field device 102 (e.g., the Shortened Tag (ST) of the device 102 and optionally other information) is automatically distributed to an internal memory of the upstream CHARM 110*a*, e.g., by automatically pushing the information to the upstream CHARM 110*a*, or by the upstream CHARM 110*a* automatically pulling the information from the smart field device 102. As such, the device's configuration information is now available at both the CHARM 110*a* and at the smart device 102, and can be utilized respectively by both CHARM 110*a* and by the smart device 102 while one or more commissioning actions involving both the CHARM 110*a* and the smart device 102 are performed, as well as other commissioning actions or activities. Example commissioning activities involving both the CHARM 110*a* and the smart device 102 include sending signals or messages in accordance with a format indicated by the device's configuration information are between the CHARM 110*a* and the smart device 102 for verification of format, fidelity, signal strength, and the like, and/or injecting simulated CIOC signals in accordance with the device's configuration information at the CHARM 110*a* to test resultant behavior of the field device 102.

Further, automatic upstream distribution of the configuration information of the field device 102 and the use of the distributed configuration information in commissioning activities need not only occur while the field device 102 is in an I/O-unallocated state, while the field environment 122 is communicatively disconnected from the back- and environment 125, and/or while the loop (or portion thereof) 100 is communicatively disconnected from the back-end environment 125. For example, continuing with the example scenario, the contents of the configuration information of the device 102 that is initially distributed to the smart device 102 and then subsequently to the CHARM 110*a* includes the Shortened Tag of the device 102 as well as a bank and slot into which the CHARM 110*a* is intended to be plugged/inserted. When the CHARM 110*a* is plugged into a CHARM terminal block 150, the stored bank and slot information corresponding to the field device 102 and stored at the CHARM 110*a* may be used to verify that the CHARM 110*a* is plugged in at the correct location. Additionally, upon plugging the CHARM 110*a* into the CHARM terminal block 150, the configuration information of the field device 102 (e.g., Shortened Tag (ST) and optionally other information) is automatically distributed to and stored in a memory of the CHARM carrier 142. For example, the configuration information of the field device 102 may be automatically pulled or pushed into the memory of the CHARM carrier 142, and commissioning of the CIOC 145 may utilize the configuration information of the field device 102 stored in the memory of the CHARM carrier 142.

Of course, distribution of device configuration information such as Shortened Tags and other information may also be directly distributed from field commissioning device 135 into upstream components rather than being automatically sensed and distributed by components that are (or that are to be) installed for run-time operations with the field device 102. For example, field operator may utilize a field commissioning device 135 to bulk load configuration information of multiple field devices into a memory of a CHARM carrier 142 or CIOC 145, e.g., in a manner similar to that discussed above for distributing device configuration information into CHARMS 110*a*, CHARM extenders 402, and field devices 102.

Example Commissioning Activities

Thus, in view of the discussion, by using one or more of the novel smart commissioning techniques described herein, individual field devices, components, and various portions of process control loops can be commissioned as they respectively are installed and interconnected. Additionally, the novel smart commissioning techniques described herein allow for incremental or piece-wise implementation of loop-related commissioning activities as a process control loop's devices, components, and portions are respectively commissioned, rather than needing to wait for the entire loop to be installed and commissioned.

For example, portions of as-built lists, as-built loop diagrams, as-built loop maps and as-built documentation are able to be incrementally generated as individual devices, components, and portions of a loop 100 are respectively commissioned. In traditional commissioning, generating as-built lists, diagrams, maps and documentation is difficult, as specialized software applications must be provided within the process control system 5, and as typically, the as-built lists, diagrams, maps, and documentation can only be generated after loops have been commissioned and connected to the back-end environment 125 of the process plant 5. (For ease of reading herein, as-built lists, as-built loop diagrams, as-built maps, and as-built documentation are generally referred to as "as-built information." Thus, the term "as-built information" as used herein refers to any number of individual and/or combinations of as-built lists, as-built loop diagrams, as-built loop maps, and/or other as-built documentation.)

Locally and incrementally generating portions of as-built loop information as afforded by smart commissioning, though, removes the restrictions and delays of traditional commissioning. Instead, as-built loop information is locally and incrementally generated while the loop 100 is communicatively disconnected from (e.g., has not yet been communicatively connected to) the back-end environment 125 of the process plant 5. For example, portions of as-built information are locally generated while field devices 102 are in I/O-unallocated states, before the controller 120 has been physically connected to the I/O cabinet 115, before the field device 102 has been assigned to a particular I/O card 108, and/or in other similar interim states of commissioning a process loop 100 or plant 5. Local generation of as-built loop information has particular usefulness and provides particular benefits when process plants are constructed modularly, e.g. when various portions of the process plants are separately built at disparate physical locations before being brought together and integrated into the process plant 5 as a whole at the plant site. Local generation of as-built loop information also has particular usefulness and provides particular benefits when a new loop is to be added to an on-line process plant, as the new loop may be commissioned without disrupting or delaying the on-line operations of the process plant. Generally, local generation of as-built loop information allow the commissioning of loops to be performed at disparate physical locations when desired, thus saving time and person-hours needed to perform overall system commissioning at the plant site.

Figure 5C:
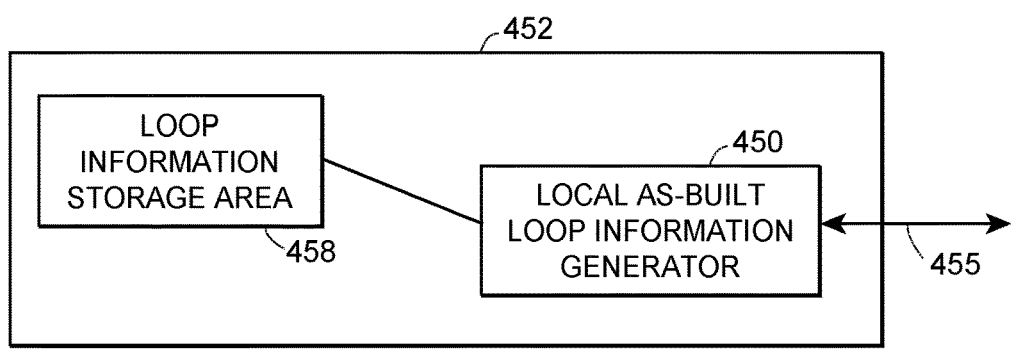
FIG. 5C depicts a block diagram of an example local as-built loop information generating apparatus or device.
Figure 5B:
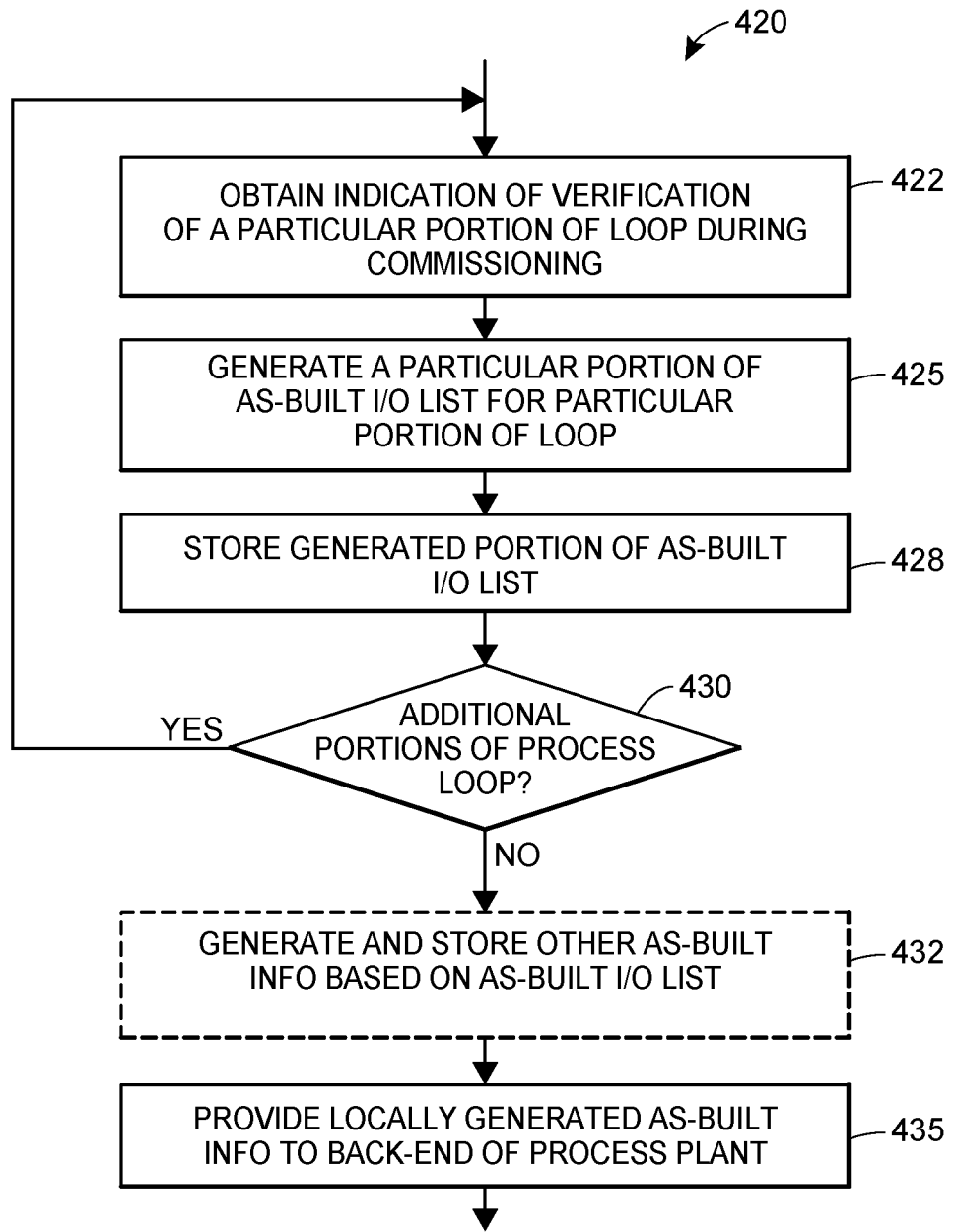
FIG. 5B provides a flow diagram of an example method for generating as-built loop information locally in the field environment of the process plant while a loop is communicatively disconnected from the back-end environment of the process plant.

FIG. 5B is a flow diagram of an example method 420 for locally generating as-built loop information while a loop is communicatively disconnected from (e.g. is not yet connected to) the back-end environment 125 of the process plant 5. For example, at least some portions of the method 420 may be executed while the loop is being built and commissioned in the field environment 122 of the process plant 5, or at an off-site staging area. At least a portion of the method 420 may be performed by a local as-built loop information generator (which is described in more detail with respect to FIG. 5C), in an embodiment, and the method 420 is described below as such for ease of discussion and not for limitation purposes. Typically, but not necessarily, the method 420 is executed in the field environment 122 of the process plant 5, e.g., by a field commissioning device 135 and/or by an asset management system 132. Further, for ease of discussion and not for limitation purposes, the method 420 is described below with simultaneous reference to FIGS. 1-5A.

At a block 422, the method 420 includes obtaining an indication that a first portion of a process control loop 100 has been verified, e.g., based on completion of one or more respective commissioning activities. For example, a local as-built loop information generator obtains the indication that the first portion of the process control loop 100 has been verified (block 422) from a field commissioning tool 135 or asset management system 132.

The method 420 also includes generating a first portion of an as-built I/O list that indicates or describes therein the first portion of the process control loop as built (block 425). At a block 428, the generated first portion of the as-built I/O list is stored, e.g., at the field commissioning tool 135, at the asset management system 132, at one or more data stores 342 that are accessible to the as-built information generator, and/or in some other suitable memory or data store. If desired (block 430), the blocks 422-428 may be repeated for subsequent portions of the process control loop 100 as the subsequent portions are respectively verified via respective commissioning actions or activities.

The method 420 may optionally include generating and storing other types of as-built information based on the stored portions of the as-built I/O list (block 432). For example, portions of an I/O-loop diagram or map corresponding to respective portions of the as-built I/O list may be generated and stored 432, either incrementally as each portion of the as-built I/O list itself is generated 425 and stored 428, or for a batch of multiple portions of the as-built I/O list that has been stored. Similarly, portions of as-built I/O documentation corresponding to respective portions of the as-built I/O loop diagram or map may be generated and stored 432, either incrementally as each portion of the as-built I/O diagram or map is generated and stored, or for a batch of multiple portions of the as-built I/O diagram or map that has been stored.

At a block 435, the method 420 includes providing the locally generated, as-built I/O information to the back-end environment 125 of the process control system 5. The locally generated, as-built I/O information may be provided to the back-end environment 125 of the process control system 5 (block 435) while the loop 100 is communicatively disconnected from the back-end environment 125, e.g., via a manual and/or external network transfer. In an example, while the loop 100 is communicatively disconnected from the back-end environment 125, the locally generated, as-built I/O information is downloaded from the field commissioning tool 135 or the asset management system 132 into a centralized database or data store 128 included in the back-end environment 125 of the process plant 5. The as-built I/O information may be provided to the back-end environment 125 (block 435) in an incremental manner, e.g., as each portion of the as-built I/O information is generated, or in a batch that includes multiple portions of the as-built I/O information.

In another example, the locally generated, as-built I/O information is automatically provided to the process control system 5 upon connection of the loop 100 to the back-end environment 125 of the process plant 5 (e.g., is automatically provided via the controller 120 and one or more internal, run-time communication networks of the process control system 5). For example, upon detection of the establishment of the communicative connection of the loop 100 to the back-end environment 125, at least a portion of as-built I/O information that has been generated and stored in the field environment 122 is automatically provided to the back-end environment 125 via the loop's communicative connection. At the back-end environment 125, e.g., via an operator workstation 71, the process control system 5 may utilize the locally generated, as-built I/O loop information for testing, troubleshooting, and visualization of portions of the loop 100, as well as the loop 100 in its entirety. For example, an as-built loop diagram or map may be utilized to test and verify the entire loop 100.

FIG. 5C depicts a block diagram of an example local, as-built loop information generator 450. In an embodiment, the local as-built loop information generator 450 is included or implemented in a local loop information generating device or apparatus 452, which may be at least partially housed or implemented in the field commissioning tool 135, the asset management system 132, the I/O terminal block 105, the I/O card 108, and/or in any other component that is housed within the I/O cabinet 115. In an example, the local loop information generating device or apparatus 452 is housed in the I/O cabinet 115, and as such the local, as-built loop information generator 450 is communicatively connected to other components of the loop 100 that are also housed in the cabinet 115, as indicated by the reference 455. In another example, the local loop information generating device or apparatus 452 is at least partially included or implemented in a field commissioning tool/portable device 135, and consequently the local, as-built loop information generator 450 is able to communicatively connect (e.g., in a wired and/or wireless manner) to the field device 102, the I/O card 108, and/or any other components disposed in the field environment 122, as indicated by the reference 455.

The local as-built loop information generator 450 may comprise (i) a set of computer-executable instructions stored on a tangible, non-volatile memory and executable by a processor, (ii) executable firmware instructions, and/or (iii) executable hardware instructions that are executed locally in the field environment 122 in which the loop 100 is being installed and commissioned. The instructions comprising the local as-built loop information generator 450 may be executable to perform at least a portion of the method 420, for example.

Further, the local loop information generating device or apparatus 452 may include a loop information storage area 458 in which the locally generated, as-built loop information is stored and that is accessible to the loop information generator 450. For example, the loop information storage area 458 may be included in an internal memory of a field device 102, I/O card 108, other memory residing the cabinet 115. Additionally or alternatively, the loop information storage area 458 may be included in an internal memory of the field commissioning tool 135, a memory of the asset management system 123, and/or in the data store 342.

Figure 6:
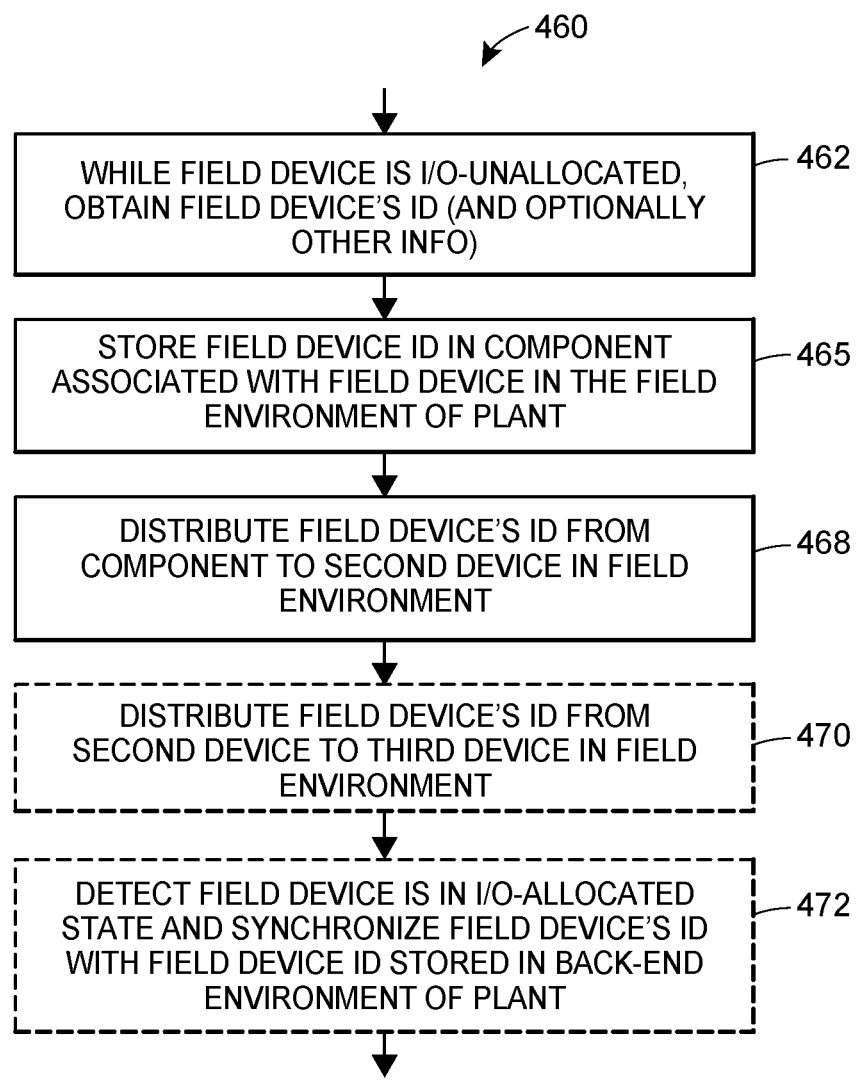
FIG. 6 provides a flow diagram of an example method for commissioning a process plant.

FIG. 6 depicts an example method 460 of commissioning a process plant 5, which may be performed at least in part by the asset management system or other system 132 disposed in the field environment, by one or more field commissioning devices 135, by one or more loop components 102, 105, 108, 110, 120 disposed in the field environment 122 of the process plant 5, and/or by any other suitable components, devices, and/or apparatuses disposed in the field environment 122 of the process plant 5. For ease of illustration, but not for limitation purposes, the method 460 is described with simultaneous reference to FIGS. 1-5B. Generally speaking, but not necessarily, at least a portion of the method 460 (and in some situations, the entirety of the method 460) executes within the field environment 122 of the process plant 5, for example, in a staging area of the field environment 122 and/or in an installation area of the field environment 122.

At a block 462, the method 460 includes obtaining, while the field device 102 is in an I/O-unallocated state, an identification of the field device 102. As previously discussed, the I/O-unallocated state of the field device 102 is indicative of the field device 102 being not assigned (e.g., not yet assigned) to any particular I/O card 108. The identification of the field device 102 typically (but not necessarily) includes a system tag that identifies the field device 102 the process plant 5. The system tag may be, for example, a device tag or a device signal tag indicative of the field device 102, and may have been automatically derived from a source tag of the field device 102.

Obtaining the identification of the field device 102 (block 462) includes, for example, receiving the field device identification from a field commissioning tool 135 or an asset management system 132 disposed in the field environment 122 of the process plant 5, in an example. In another example, obtaining the identification of the field device 102 (block 462) includes accessing a data store 342 disposed in the field environment 122 to obtain the identification of the field device 102. In some scenarios, additional information corresponding to the field device 102 is obtained (block 462) in conjunction with the identification of the field device 102. For example, a bank and a slot of a cabinet 115 corresponding to a CHARM 110a related to the field device 102, selected information included in the I/O-abstracted configuration of the field device 102, and/or other information corresponding to the field device 102 is obtained (block 462) in conjunction with the field device's identification.

At a block 465, the method 460 includes storing, while a field device 102 is in the I/O-unallocated state, the obtained identification of the field device 102 into a memory of a component of a process control loop 100 of which the field device 102 is a part. Optionally, the block 465 additionally includes storing any other information corresponding to the field device 102 that has been obtained (block 462) in conjunction with the field device's identification.

The component into which the identification of the field device 102 is stored (block 465) may be the field device 102 itself, such as when the field device 102 is a smart device and includes an on-board memory. For non-smart field devices, or as desired for smart field devices, the component may be a proxy for the field device 102, such as a CHARM 110a, a CHARM extender 402, or other upstream component of the field device 102 that is also included in the loop 100.

At a block 468, the method 460 includes distributing the stored identification of the field device 102 (and any information that has been stored in conjunction with the field device's identification) to a second device that is communicatively connected to the field device 102 in the field environment 122 of the process plant 5, and that is included in the loop 100 of which the field device 102 is a part. The field device identification is distributed 468 from the component to the second device so that the distributed field device identification may be used in commissioning a portion of the process control loop 100 that includes both the field device 102 and the second device. Typically, but not necessarily, the second device is upstream of the field device 102, and includes an on-board memory into which the distributed identification of the field device 102 is written or stored. For example, when the component into which the field device's identification is stored (block 465) is a CHARM extender 402, the second device may be a CHARM terminal block 150 or a CHARM carrier 142.

In some scenarios, distributing the identification of the field device 102 from the component at which it is stored to the second device (block 468) includes automatically distributing the stored field device identification upon detection of an establishment of a communicative connection between the field device 102 and second device. For example, upon detection of a wired connection being established between a smart field device 102 and its CHARM 110a, the identification of the field device 102 is automatically distributed from the smart field device 102 to the CHARM 110a, e.g., by automatically pulling the field device identification into the CHARM 110a, or by automatically pushing the field device identification from the smart field device 102.

In some scenarios, distributing the identification of the field device 102 from the component which is stored in the second device (block 468) includes automatically distributing the stored field device identification upon completion of a commissioning action performed at the field device. For example, upon receiving the indication of a completed commissioning action performed at a smart field device 102

(e.g., a field operator electronically signing off on a completed commissioning action, or a field commissioning tool 135 automatically recording a successful result of a commissioning action), the identification of the field device 102 is automatically distributed from the smart field device 102 to the CHARM 110a, e.g., by automatically pushing or pulling the field device identification into the CHARM 110a.

In an optional block 470, the method 460 includes distributing the identification of the field device 102 that is stored in the second device (and any information that has been stored in conjunction with the field device's identification) to a third device that is communicatively connected to the second device in the field environment 122 of the process plant 5. Typically, but not necessarily, the field device 102, the second device, and the third device are included in the process control loop 100. The field device identification is distributed 470 from the second device to the third device so that the distributed field device identification may be used in commissioning another portion of the process control loop 100, e.g., a portion of the loop 100 that includes the field device 102, the second device, and the third device. Typically, but not necessarily, the third device is upstream of the second device, and includes an on-board memory into which the distributed identification of the field device 102 is written or stored. The identification of the field device 102 may be automatically distributed from the second device to the third device upon the third detection of an establishment of the communicative connection between the second device and the third device, in an example. In another example, the identification of the field device 102 is automatically distributed from the second device to the third device upon receiving an indication of a completion of a commissioning action that has been performed on the communicatively connected field device 102 and the second device.

In an optional block 472, the method 460 includes detecting that the field device 102 has changed from being in the I/O-unallocated state to being in the I/O-allocated state, where the I/O-allocated state is indicative of the field device being assigned to communicate via particular I/O device 108. Upon detecting that the field device 102 is in the I/O-allocated state, the block 472 of the method 460 includes synchronizing the stored identification of the field device 102 with a respective identification of the field device 102 stored in a back-end environment 125 of the process plant 5. For example, as the communication path of the field device 102 to its respective controller 120 is now defined as being via the assigned, particular I/O device, thereby communicatively connecting the loop 100 with the back-end environment, the identification of the field device 102 that is stored in the field environment 122 may be synchronized via said communication path with the identification of the field device 102 known to the back-end environment 125 of the process plant 5. If a discrepancy is discovered during synchronization, an alert may be generated and presented at the operator workstation 71, the commissioning tools 135, 138, and/or some other operator interface. Additionally or alternatively, steps to mitigate the discrepancy may automatically be taken. These and other aspects of the synchronization process are described in more detail in subsequent sections of this disclosure.

Additionally, as mentioned above, various configuration and commissioning activities can be initiated and performed in the back-end system 125 at the same time as, or in parallel with at least some of the commissioning activities described above as taking place in the field environment 122. This parallel commissioning of the back-end system 125 enables, for example, control routines, communication routines, simulation routines, user interface routines, and the like (that are ultimately to be implemented at the controllers or in one of the back-end system computer devices) to be developed and tested prior to the field equipment being installed or connected to the controllers or to other back-end system devices, and/or prior to the I/O cards and/or channels connecting the field equipment to the controllers and the back-end equipment being assigned, configured, or allocated.

Generally speaking, during the commissioning process of a plant, various applications and modules which are to be run or executed during on-line operation of the plant need to be created, configured, tested and commissioned. Such applications or modules include, for example, control modules (e.g., control routines to be implemented in the plant controllers or field devices), safety system modules (e.g., safety system logic modules that execute safety system functions or SIS functions in safety logic solvers in the plant), control and safety application interfaces (which execute in various user interface devices in the back-end environment 125 to enable control and safety operators to interface with the control and safety systems during operation of the plant), communication modules (which enable other modules and devices to communicate with devices within the field environment 122), asset management modules and applications (which are used by maintenance personnel to communicate with, track, repair and in some instances control, field equipment within the plant), simulation modules (which execute various of the other modules and applications, such as control modules and user interface modules, in a simulation environment to test the operation of these modules, to train users, etc.), database modules (which collect and store data from the plant equipment), analytic modules (which perform analytics on data from the plant), etc. Of course many other types of modules, applications, and user interface programs, can be created for other purposes and can be tested during the commissioning of the plant.

Importantly, these modules, applications, user interface programs, etc., typically communicate with various field devices and other field equipment within the plant and, to do so, must generally be configured with enough information to know how to reach a particular field device (i.e., the I/O communication path to use to communicate with a field device), and must generally be programmed to communicate with the field device in a manner that is compatible with the device itself. That is, the module, application, or user interface program, etc., in the back-end environment 125 must know the type of device and the capabilities of the device (e.g. what communication or design protocol the device conforms to, what information is available from the device, what actions or data requests can be sent to the device, what limitations or ranges the device has, what signals are available from or created by the device, etc.) in order to be able to communicate properly with the device when the device is connected in the plant field environment 122. In the past, this configuration and commissioning information was provided to the modules, applications, user interface programs, etc. using a system tag of the device that uniquely defined the device (or a particular signal associated with the device) in the process control system and which enabled the module, application, or program to communicate via the configured I/O network with the device. Additionally, a communication path was associated with the system tag of the device, which communication path defined the path through the I/O network of the plant that needed to be traversed to reach the field device. This communication path information was typically stored in the module, application, program, etc. or was stored in a configuration database in the back-end system 125 and provided to the module, application program, etc. when needed based on the system tag of the device. The module, application, or user interface program then communicated with the field device via the installed and allocated I/O network using the system tag and/or communication path information of the device. However, generally speaking, the system tag of and/or the communication path information for the field equipment was not available to (of if available not useable for communications by) these modules, applications, and user interface programs until the field equipment was connected within the field environment 122 and the I/O network was configured to actually connect the field equipment to the back-end system 125 (via the process controllers, for example). Moreover, the system tag and/or communication path information is only usable to communicate with the field equipment when the field equipment is installed and allocated via a specific one of the I/O networks in the plant. As such, the back-end modules, applications, and programs could not be fully tested for proper operation prior to the field equipment being connected to the plant and the I/O network being configured and allocated, because these modules, applications and programs could not test that they were configured properly to actually communicate with the desired or appropriate field device. In particular, it was not possible, or it was at least very difficult to test these modules, applications, and programs to make sure that these entities were configured to communicate with the correct field device or other field equipment, that they included the correct configuration information as to how to communicate with a particular device, to determine if the device had the information or capabilities required by the module, application or program, etc. This I/O connection requirement thereby made it difficult to fully develop and test the various modules, applications, and programs that are to be run in the back-end environment 125 during the early stages of commissioning, i.e., prior to the I/O network being configured and the field devices of the plant being allocated to particular cards and/or channels of the I/O network.

Figure 7A:
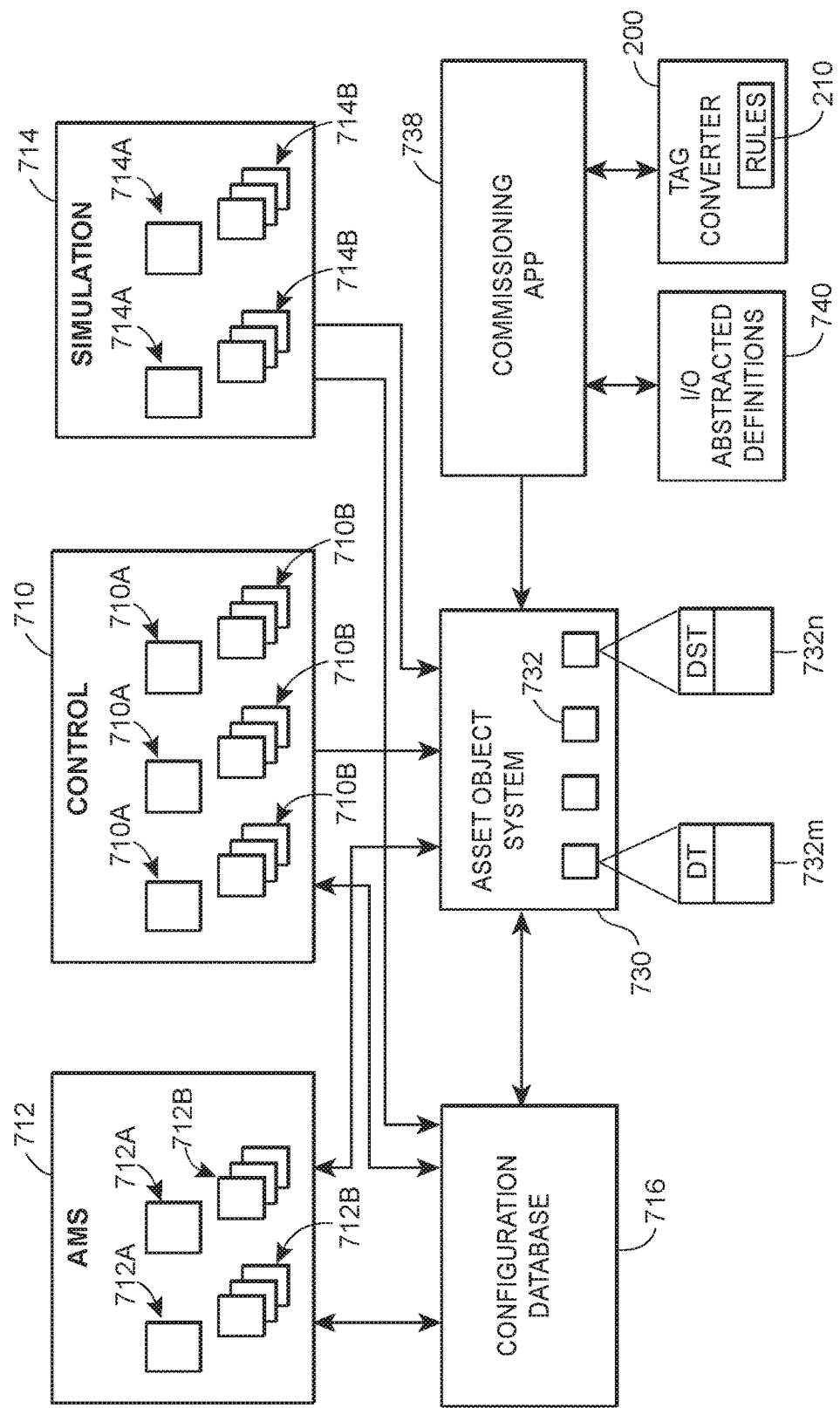
FIGS. 7A-7B illustrate views of components within a back-end system of a process or industrial plant that provides the ability to configure and perform commissioning actions on the back-end components, such as modules, applications, and interface programs, prior to field equipment being connected and/or allocated via I/O networks in the plant.

FIG. 7A illustrates an example back-end system 700 that includes hardware and software entities that enable back-end system components to be created, tested, configured and commissioned (at least partially) prior to the field equipment being connected to and/or allocated to various I/O network cards and/or channels in the plant. The back-end system 700 may be used as any of the back-end systems 125 of the previous embodiments, including for example, those of FIGS. 1, 2A and 2C. In some cases, like components are numbered the same in FIGS. 7A-7C as in previous figures.

More particularly, as illustrated in FIG. 7A, the back-end system 700 may include typical control, maintenance, and simulation systems, depicted as a control system 710, an asset management system (AMS) 712, and a simulation system 714. The control system 710, which is illustrated for the sake of simplicity as a single block, may include many different control applications and databases stored in and executed in the same or different control system processing devices, such as in the various different processing devices, user workstations, servers, and databases of FIG. 1. More particularly, the control system 710 may include one or more control system design applications 710A which may be used to create various control modules, control user interface applications and other control programs (illustrated in FIG. 7A as modules 710B). The control modules 710B, which may ultimately be stored and executed in one or more process controllers or safety system logic devices, may perform control logic to implement control actions, safety system logic to implement safety logic, etc. The control user interface applications, which may be executed in one or more back-end system computer devices, such as workstations having user interfaces, etc., may enable control engineers, control operators, or other personnel to perform various control based activities in the plant. Still further, the control applications 710A may be used to create database modules that collect data from the process plant and store that data in a database, analytic modules which perform analytics on data from the plant, etc. Once created, such control modules, routines, applications, and programs 710B may be downloaded to and executed in various ones of the controllers, I/O devices, field devices, databases, user interface devices, servers, processing devices, etc., of the control system during runtime of the process plant. Moreover, the created control modules (which may be made up of various interconnected function blocks, for example), safety instrumented modules, user interface modules, communication modules, analytic modules, database modules, etc., may be stored in a configuration database 716. At some point, these control modules, programs, interfaces, etc., may also be downloaded and installed in various computer processing devices, such as in process controllers, workstations, user interface devices, databases, servers, etc. during the commissioning process.

Likewise, the asset management system (AMS) 712 may include various maintenance system creation and configuration applications 712A which are used to create maintenance systems objects, user interfaces, database objects, or other applications or modules 712B, which may be stored in and executed in various devices in the plant to perform maintenance activities in the plant, including in user workstation devices, handheld devices, portable computing devices, etc. The modules, objects, programs, and applications 712B may be run by or in conjunction with other maintenance system components, and may be run on various platforms or devices, such as back-end system devices, handheld or portable devices that can be moved within the plant, etc. Moreover, these modules, applications, programs, interfaces, etc., may be used to perform any desired or known types of maintenance activities on the devices within the process or industrial plant, including on devices in the control system and the safety instrumented system of the plant. As illustrated in FIG. 7A, the components of the AMS system 712 may be connected to and may store information and receive information from the configuration database 716, and may operate to update or change data, objects, or other information in the configuration database 716 during operation of the plant.

Still further, the back-end environment 700 of FIG. 7A is illustrated as including a simulation and testing system 714 that may include various applications 714A that may be used to test various ones of the control modules 710B, safety modules 710B, communication modules 710B, asset management system modules 712B, user interface applications 710B and 712B, etc. that are developed using applications 710A and 712A within the control system 710, and the AMS 712, and/or that are stored in the configuration database 716. In some cases, the simulation system applications 714A may be used to create a simulation environment for running various ones of the other modules and applications 710B and 712B to train operators, users, maintenance personnel, etc. In some cases, the simulation system applications 714A may be used to create simulation scenarios or modules 714B that simulate particular types of problems, conditions, actions, etc., in the plant and these modules 714B may need to communicate with various devices in the plant during operation thereof.

Likewise, as illustrated in FIG. 7A, the back-end environment 700 includes an asset object system database 730 which stores a set of device placeholder objects 732, and one or more configuration/commissioning applications 738, such as any of the commissioning applications described herein, that enable or assist plant commissioning personnel in performing commissioning activities in the plant. The commissioning applications 738 may be the same as or similar to the commissioning applications 340 or commissioning devices 138 described above with respect to FIGS. 1-4 and may perform the various functions of these applications as described above. However, in this case, the commissioning applications or devices 738 operate in the back-end environment 700 to perform commissioning activities on data, software, modules, and devices in the back-end environment 700. Moreover, in many cases, the applications 738 may operate prior to the back-end environment 700 being communicatively connected to the field equipment in the field environment 122 (of FIGS. 2A and 2C) and/or prior to the I/O network that connects the field equipment in the field environment 122 to the controllers or other equipment in the back-end environment 700 being allocated or configured.

To enable commissioning activities to be performed on the software and hardware components of the back-end environment 700 prior to the back-end environment 700 being communicatively connected to the field equipment or prior to the I/O network being configured to provide communication paths from the back-end environment to the field equipment, the back-end environment 700 includes the asset object system 730 that, as illustrated in FIG. 7A, is connected to the control system 710, the AMS 712, the simulation system 714, and the commissioning application 738, as well as to the configuration database 716. In some cases, the asset object system 730 may be part of the configuration database 716. Importantly, the asset object system 730 stores various device placeholder objects 732 therein, and generally stores such a device placeholder object 732 for each piece of field equipment in the field environment (e.g., each field device). The device placeholder objects 732 for field devices or other pieces of hardware are generally indicated as a device tag (DT) placeholder object. Additionally, the asset object system 730 may store a device placeholder object for each different signal or addressable parameter of a device, and these device placeholder objects 732 are generally indicated as a device signal tag (DST) object. A DST object 732 may use the same device tag as the device tag of a device to which the device signal tag corresponds as a root tag, with additional or other information included therein. Thus, the device tag for a DST object may be the device tag for the DT object to which the signal belongs, with additional signal tag information concatenated thereto, for example.

The device placeholder objects 732 are generally the same as or similar to the device placeholder objects 300 described with respect to FIG. 4A above and, generally speaking, a device placeholder object 732 will be created for each of the same devices (and device signals where appropriate) as created in the field equipment environment 122 described above. Thus, the device placeholder objects 732 in the back-end environment 700 have the same format and the same types of information stored therein as described for the device placeholder objects 300 in the field equipment environment 122. However, it should be noted that the device placeholder objects 732 in the asset object system 730 are created separately from the field equipment device placeholder objects 300 and are stored in the back-end environment 700 to describe or define various ones of the field equipment or field devices in the field environment 122 prior to the field environment 122 being communicatively connected to the back-end environment 700 and/or prior to the I/O network being configured to allocate the field equipment to particular cards and/or channels in the I/O network of the plant. Moreover, if desired, the device placeholder objects 732 (or instances thereof) may store I/O communication channel information, such as I/O channel properties which may be definitions, parameters, I/O device types, I/O devices, etc., that will be used to communicatively connect the field device to the back-end system 700 such as to a process controller in the back-end environment 700.

In particular, the configuration and commissioning application 738 may be used to create the device placeholder objects 732 (two of which are illustrated as device placeholder object DT and DST 732*m* and 732*n*) in the manner described above with respect to FIG. 4A. However, it is again noted that the commissioning application 738 may create the device placeholder objects 732 and may store these objects 732 in the asset object database or system 730 independently of the device placeholder objects 300 described with respect to FIG. 4A, which are stored in, for example, the field devices 102 and the I/O devices 105, 108 down within the field equipment environment 122. Of course, the commissioning application 738 may create the device placeholder objects 732 in essentially the same manner as described for the field equipment environment 122 using the same sets of configuration rules, predefined data formats, etc., as those described with respect to FIG. 4A.

Thus, for example, the commissioning application 738 may obtain a list of field devices and/or other field equipment to be used in the plant for various purposes, including information regarding the source tags of each of the field devices (from a database for example, such as the configuration database 716), and may create a device placeholder object 732 for each such field device and/or signal of each such field device. In some cases, the application 738 may automatically create a device placeholder 732 for each such device and, in other cases, users may individually create device placeholder objects 732 for field devices and other field equipment. In either of these cases, the commissioning application 738 may, for example, call or access the source tag-to-system tag conversion application or system 200 (described above with respect to FIG. 3A) which uses the set of parsing rules 210 (as also described with respect to FIG. 3A) to convert the device source tag(s) into device system tag(s). The commissioning application 738 may then store either or both of the source tag and/or the system tag of the field device or other field equipment in a device placeholder object 732 for the particular field device (a DT object) or for a particular field device signal (a DST object). As an example, the commissioning application 738 may obtain the device source tag of the particular process control device by obtaining a unique identifier of the particular process control device, the unique identifier being in accordance with the HART communication protocol, the WirelessHART communication protocol, the Foundation Fieldbus communication protocol, or another industrial communication protocol. Moreover, the commissioning application 738 may determine the system tag identifying the particular process control device by determining at least one of a control tag, a device tag, or a device signal tag of the process control device, and/or may determine the system tag based on the set of parsing rules as described above. Thus, the commissioning application 738 may generate the system tag based on at least one of a truncation of the source tag, a deletion of one or more characters from the source tag, an addition of one or more characters to the source tag, a combination or manipulation of at least some of the numerical characters included in the source tag, an expansion or contraction of the source tag, or another technique for converting the source tag into a system tag.

Still further, the commissioning application 738 may obtain device type and other device description information about the field device (e.g., the I/O abstracted device definition information of the fields 308-318 of FIG. 4A, and/or other device configuration and property information of the fields 325-338 of FIG. 4A) from a user, a database (such as the configuration database 716) or otherwise, and the application 738 may use this information to populate the various fields of the device placeholder objects 732 for each of the field devices or other field assets to be used in the plant. As part of this process, the configuration or commissioning application 738 may access predefined I/O abstracted definitions 740 defining the various forms of, sub-fields of, or possible sub-fields of each device placeholder object 732 based on the device type or other more general information of the device, to thereby define various fields or properties of the different device placeholder objects 732, the contents of the various fields/properties of the different device placeholder objects 732, and the possible configuration and commissioning activities to be taken with respect to the device placeholder objects 732. In some cases, configuring the instance of the device placeholder object 732 for a field device may include storing respective values of one or more exposed or hidden properties of the device placeholder object, each respective value being indicative of a respective category or a type that is descriptive of the field device. Moreover, storing the respective values that are indicative of the respective categories or types descriptive of the field device may include storing one or more values, each of which is respectively indicative of an I/O interface type, a device type, a characteristic of the device type, an I/O configuration type, a property of the I/O configuration parameter type, or a channel parameter of the I/O configuration type, for example. Likewise, the commissioning application 738 or other system may expose, set, configure, or store a first property of the instance of the device placeholder object 732 of a field device based on a value stored for a second property of the instance of the device placeholder object 732 of the field device.

As noted above, the device placeholder objects 732 may also store properties, such as parameters, definitions, types, configuration information, etc. for (or that defines) the associated I/O channel that will be used to communicatively connect the associated field device through an I/O network in the plant even before the location of the I/O channel (e.g., the devices and communication paths of the I/O channel) is/are known or set. This I/O channel information for the field device as stored in a device placeholder object provides the commissioning system with the ability to configure, use, and test a device placeholder object (or an instance thereof) without assigning this placeholder object to a particular I/O channel. This configuration information also enables the commissioning system to test other objects that are created to communicate with the field device to assure that these other objects are configured properly to communicate with the field device via the appropriate I/O channel types, devices, etc.

Still further, commissioning application 738 may enable the user to take various intermediate commissioning actions in the back-end environment 700 based on or using the device placeholder objects 732. In particular, as information is stored in the device placeholder objects 732, defining the types and natures of the field devices or field assets to which these objects belong and the I/O channel properties used to reach the field device, more and more commissioning activities and testing activities may be performed on other objects in the back-end environment 700 using these device placeholder objects 732 as proxies for the actual field devices or other field assets in the field environment 122. For example, when the various field devices used in the plant are defined by the various device placeholder objects 732, and these device placeholder objects 732 indicate that the associated field devices are in an I/O-unallocated state, the control system 710 and, in particular, one or more of the control module creation or testing applications 710A, may connect to or communicate with these device placeholder objects 732 (as if the device placeholder objects 732 were the actual field devices in the plant) using, for example, the system tag of the device, and these applications 710A may then test the operation of the created modules, applications, and programs for proper configuration and operation with respect to communications with the field device to which the module, application, or program is to connect during operation of the plant. Thus, in one case, the commissioning application or unit 738, or an execution engine or communication interface associated therewith, determines if the communication initiated by the module, application, program, etc., being tested with respect to one of the plurality of field devices is proper (e.g., has the correct format, syntax, device or signal tag, etc., requests information that is actually available from the device, is a message that is within the capabilities or supported communications of the device, is configured to be sent via the appropriate type of I/O channel or device, etc.) based on the configuration information for the one of the plurality of field devices as obtained from the one of the stored device placeholder objects 732, also referred to herein as instances of device placeholder objects 732. In a similar manner, the maintenance and simulation creation applications 712A and 714A may create, configure, and test various modules, objects, applications, and programs 712B and 714B using the placeholder objects 732 in the same manner.

Thus, the created objects, modules, applications, and programs 710B, 712B, 714B, that require or involve sending signals to or receiving signals from one or more of the field devices in the plant may be created (as is typical) in the control system configuration applications 710A, in the maintenance system configuration applications 712A, and in the simulation system creation applications 714B, using the system tag of the field device or the device signal tag (which refers to a specific signal or parameter of a field device using the system tag of the field device). A user may then use the control, maintenance, and simulation system applications 710A, 712A, 714A or a stand-alone simulation or configuration application to configure and execute the modules, objects, applications, and programs 710B, 712B, 714B, which, during execution, will use the device system tag (and/or device signal tag based on the device system tag) to locate the device placeholder object 732 in the asset object system 730 for a referenced device or device signal. When the device placeholder object 732 as stored in the asset object system 730 is indicated to be in an I/O-unallocated state, the control system 710, the maintenance system 712, the simulation system 714, or other simulation or testing engine will recognize that the actual field device is not connected to the back-end system 700 via the control system I/O communications network. However, in these cases, the device placeholder object 732 may still store information about the device (and/or the I/O path or channel needed to reach the device via the I/O network) that is needed by or being referenced by the calling module, application, or program and so the device placeholder object 732 may provide a response or be used to provide a response based on the configuration data stored within the device placeholder object 732 to mimic the operation of the device or the response of the actual device, or to indicate whether the call is properly configured based on the device and I/O channel information stored about the device being addressed. In other cases, the commissioning application 738, the control application 710A, the maintenance application 712A, the simulation application 714A, or a separate execution engine in, for example, the asset object system 730, upon recognizing from the device placeholder object 732 that the device is in an I/O-unallocated device state, may create a simulated response from the device to provide a known signal back to the requesting object to enable testing and simulation of the requesting object as if the device were actually connected to the back-end environment 700 via the control system I/O network.

Figure 7B:
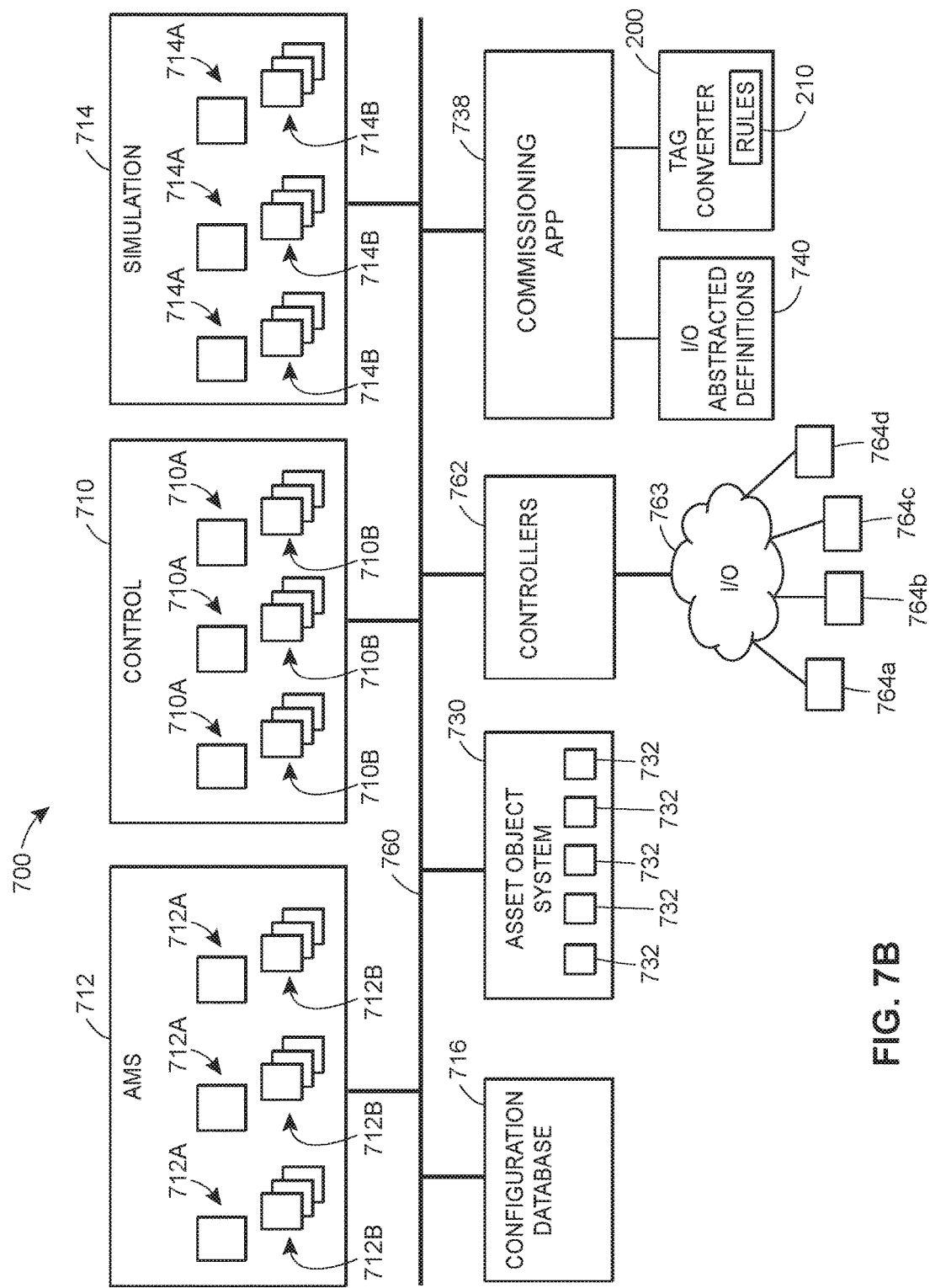

FIG. 7B illustrates a back-end system 700 having the various back-end functional systems of FIG. 7A interconnected together via a bus or communication network 760 and, in particular, includes the control system 710, the asset management system 712, the simulation system, the configuration database 716, the configuration/commissioning utility application 738, and the asset object system database 730 connected to the communication bus 760, which may be any type of communication network, such as a wired or wireless Ethernet connection, etc. Additionally, one or more controllers 762 are illustrated as being connected to the bus 760. The controllers 762 are illustrated in FIG. 7B as being connected through an I/O network 763 to various field devices or field assets 764. However, it should be noted that the I/O network 763 may not be connected to the controllers 762 during the commissioning process, or while the I/O network 763 may be connected to the controllers 762, the I/O network 763 may not be configured or allocated, meaning that the controllers 762 may have no understanding or indication of how to access a particular field device, or field asset 763 via the I/O network 763 (because the signal path through the I/O network 763 to each such field device 764 has not yet been established or allocated), or the controllers 762 may not be able to communicate with the field devices via a configured signal path because the field devices 764 may not yet be physically connected to the I/O network 763. Thus, while the I/O network 763 and the field devices 764 are illustrated in FIG. 7B, the I/O network 763 may not actually be connected to the controllers 762 and/or ones of the various field devices 764 may not be connected to the I/O network 763 during some of the commissioning activities occurring in the back-end system 700.

Additionally, as illustrated in FIG. 7B, the various systems 710, 712, and 714 include configuration applications such as control applications or control module creation applications 710A, maintenance object or interface creation applications 712A, and simulation system applications 714A, which may be used during commissioning of the plant or to create various ones of the modules, objects, applications, and/or user-interface programs 710B, 712B, 714B, which will be downloaded to and potentially run in various computing devices either within the back-end network 700, such as any of those shown in FIG. 1, or which may be provided to one of the controllers 762 (or safety system logic solvers not shown) or other devices, for execution during the operation of the plant when the plant is operating online, i.e., after the plant has been commissioned. Moreover, the device placeholder objects 732 may be used to test these other types of object, modules, programs, applications, etc. as well. Still further, the use of the device placeholder objects 732 and specifically the configuration information stored therein may enable a commissioning system, such as the commissioning application 738, to take various different commissioning or configuration actions based on the state of the objects 732. Thus, for example, the commissioning application 738 may first enable testing of one or more modules, applications, programs, user interfaces, etc., and if these tests are successful, may enable these modules, applications, programs, user interfaces, etc., to be instantiated and/or downloaded into the various back-end environment devices in which these modules, applications, programs, and user interfaces, etc. will be executed during on-line operation of the plant. Such instantiation may be performed to enable the modules, applications, programs, user interfaces, etc., to use the system tags of the field devices for communication purposes. Moreover, the modules, applications, programs, user interfaces, etc. may be downloaded to process controllers, workstations (having user interfaces associated therewith), databases, servers, or any other computing devices in the back-end environment for execution. Moreover, these further commissioning and configuration actions, such as instantiation and downloading of modules, applications, programs, and user interfaces, etc., may be performed in or from any desired computing device in the back-end environment 700, such as a workstation in which the commissioning application 738 is executed, a different workstation, the configuration database, 716, etc. Furthermore, as will be understood, these further or additional commissioning actions may be performed when the device placeholder object 732 for a field device indicates that the field device is in an I/O-unallocated device state, meaning that the field device is not connected to the back-end environment 700 via an I/O network, or that the I/O network is not allocated in a manner that provides a communication path to the field device, or that a user such as a person performing commissioning actions prefers not to use communications with the actual field device even if such communications are possible via an allocated I/O network to a connected field device.

As will be understood, the asset object system or database 730 stores the device placeholder objects 732 for each of the field device assets 764, and thus provides configuration information about these objects to the other systems 710, 712, 714 when these placeholder objects are in an I/O-unallocated device state. The use of the asset object system database 730, and the device placeholder objects in particular, enables the other applications, such as the programs 710A, 712A, 714A, to complete various commissioning and testing activities on the objects, modules, applications, and programs 710B, 712B, 714B prior to the field devices 764 actually being connected or allocated through the I/O network 763 to the various controllers 762. As noted above, the configuration application 738 may operate and receive user inputs individually or group inputs, such as from a spreadsheet, for all of or a group of the field assets that are to be used in the plant, including various information about those field assets such as device type, device name, long or source tags, I/O channel information, etc., and the configuration and commissioning application 738 may then create and/or fill out the various device placeholder objects 732 with the various information therein. During this process, the configuration and commissioning application 738 may use the source-tag to system-tag (also called the long-tag-to-short-tag) converter application 200 and the various conversion rules 210, and the I/O allocation or abstract definitions 740 associated with the various field devices to create the device placeholder objects 732, as described above.

Once the device placeholder objects 732 are configured, at least to some degree, for example, with such information as a device system tag, device type, and various sub-information that may be determined or based on the device type (including such sub-information provided by a user), and/or with I/O channel information pertaining to the I/O channel which will be used to communicate with the field device, the various other applications 710A, 712A, 714A, may use these device placeholders objects 732 as proxies for communicating with the actual field devices or with signals within the field devices 764. Thus, the device placeholder objects 732 serve as proxies for the actual field devices 764 and, during the commissioning process or testing process, the other applications, such as the control, maintenance, and simulation applications 710A, 712A, 714A, can communicate with the device placeholder objects 732 (using system, device, or device signal tags) instead of trying to communicate with the actual devices via the I/O network 763. This feature enables the applications 710A, 712A, 714A, to test the modules created thereby using the only information they will have during online operation of those applications (i.e., the device system tag) to perform testing, configuration, simulation, and various other commissioning activities prior to the field devices 764 being connected to the control system and allocated via the I/O network 763.

Moreover, it will be noted that more and more configuration and commissioning activities can be performed in the back-end system 700 as more and more information is stored in or about the field devices within the device placeholder objects 732. Thus, in one instance, the configuration application 738 may fill out information in various ones of the device placeholder objects and then enable various different and specific commissioning or testing activities to be taken by other applications with respect to those objects. More and more such commissioning activities may be enabled or initiated as more and more information is stored in the device placeholder objects (e.g., I/O channel information, ranges, limits, etc.). That is, the inclusion of specific types of configuration information in the device placeholder objects 732 may enable more and more specific commissioning activities to be initiated by the configuration application 738. Moreover, in some cases, such commissioning activities may include instantiating one or more control modules or other applications, programs, user interface applications, etc., and/or downloading instantiated modules, programs, user interface applications, or other applications to process controllers, workstations, servers, or other computing devices in which these modules, programs, etc. will be executed during operation of the plant.

Figure 7C:
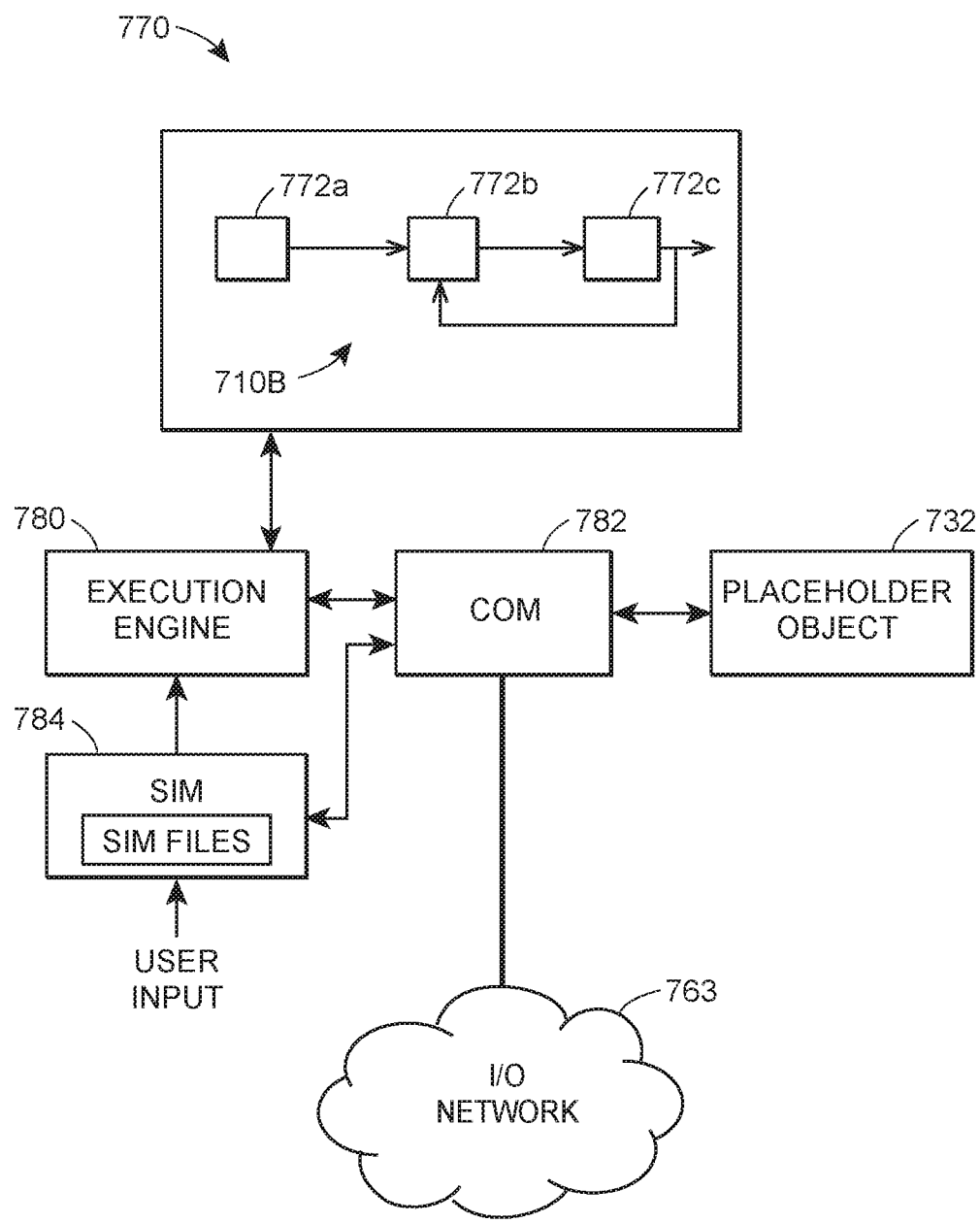
FIG. 7C depicts a system and method for communicating with device placeholder objects as proxies to field equipment when configuring and commissioning back-end system components prior to the field equipment being connected and/or allocated via I/O networks in the plant.

One example of a system or an environment in which the device placeholder objects 732 act as proxies for the actual field devices 764 in the back-end system 700 during the commissioning and testing activities in the back-end system 700 is illustrated with respect FIG. 7C. More particularly, FIG. 7C illustrates a simulation or testing system 770 that may operate in conjunction with one of the control system design applications 710A used to simulate or test the operation of one or more control modules 710B that are being created during the commissioning of the plant, to thereby enable testing of control objects or modules 710B prior to those modules or objects being downloaded to a controller 762 (or to one or more field devices 764 to be connected to a controller 762 responsible for the control module being tested). In particular, the system 770 of FIG. 7C is illustrated as executing and testing a control module 710B made up of a set of interconnected function blocks 772a, 772b, 772c, interconnected with communication links, with the control module 710B being part of the control system 710. However, the system 770 could also or alternatively execute and test other modules, applications, programs, objects, etc., associated with other systems in the back-end system 700, such as the asset management system 712 and the simulation system 714.

In any event, the system 770 includes an execution engine 780 that, in turn, executes each of the function blocks 772a-772c of the control module 710B and provides communications between these function blocks 772a-772c as defined by the communication links. It should be noted that the execution engine 780 can be a computer processing device that implements any one of the applications 710A, 712A, 714A, or can be the execution engine running the commissioning application 738, a processor running a dedicated simulation or testing application designed for commissioning purposes (which may be different than the simulation applications 714A), etc. Thus, the execution engine 780 may be part of the control system 710, the asset management system 712, the simulation system 714, etc., or the execution engine 780 may be a stand-alone component designed or dedicated to implementing testing and commissioning activities when called by the commissioning application 738 prior to the field devices 764 of a plant being connected to or allocated via an I/O network within the plant. Moreover, the execution engine 780 may be implemented anywhere (in any desired computing device) in the back-end system 700 as long as the execution engine 780 is communicatively coupled to the asset object system or database 730. If the execution engine 780 is associated with or implemented by the commissioning application 738, the commissioning application 738 may perform commissioning testing on the control modules 710B, for example, to test the operation of these modules with respect to configured device communications. In this case, the commissioning application 738 may obtain the control modules 710B (or other modules, applications, etc. 712A, 714A) being tested from the control system 710 (or other systems 712, 714) or from the configuration database 716 prior to these modules being downloaded to one of the controllers 762.

In any event, during the execution of a particular function block 772 that requires communication with a field device or other field asset, the execution engine 780 calls or uses a communication interface 782 to interface with the field device using, for example, a system tag of the field device (which is common for control, maintenance, and simulation modules). At this point, the communication engine 782 does not know the communication path (i.e., the I/O network path) needed to reach the field device in the field environment. However, the communication interface 782 accesses the asset object system database 730 and, using the system tag of the field device or device signal as provided by the module being tested, locates the particular device placeholder object 732 in the asset object database 730 for the field device.

Next, the communication interface 782 determines, from the device placeholder object 732, if the associated field device (or other field asset) is in an I/O-unallocated device state or in an I/O-allocated device state. If the device placeholder object 732 indicates that the field device is in an I/O-allocated device state (meaning that the I/O path to the field device has been configured and assigned), the communication interface 782 may obtain other configuration from other fields of the device placeholder object. In particular, in this case, the communication interface 782 may ask for and the device placeholder object 732 may return the I/O communication path for the device as previously allocated for the device and as stored in the device placeholder object 732, and the communication interface 782 uses this path to send signals to and receive signals from the actual field device in the field environment, i.e., to communicate with the field device via the allocated I/O communication path. In some cases, the communication interface 782 may initiate these communications via the one of the controllers 762 that is connected to the I/O network 763 to which the field device is attached.

However, if the device placeholder object 732 indicates that the field device is in an I/O unallocated device state, then the communication interface 782 may again access other configuration information for the device and/or the I/O channel for the device to determine if the requested information is stored in the device placeholder object 732. If so, the communication interface 782 retrieves that desired or needed information and provides that information back to the execution engine 780. In some cases, the device placeholder object 732 may store configuration information associated with or defining the actual field device, such as device type, source (long) tag, system (short) tag, device ranges, limits, capabilities, etc. In the case in which the requested information is actually stored in the device placeholder object 732, this information may be returned from the device placeholder object 732 as if it were from the field device itself. Still further, in some cases, the communication interface 782 may just determine if the requested communications from control module 710B match or conform to the proper protocol or device configuration of the device or the I/O channel for the device associated with the device placeholder object 732. This determination still enables the commissioning personnel to determine if the control module 710B is configured correctly to communicate with a particular device based on device type, device configuration parameters, I/O channel configuration parameters, etc. as stored within the device placeholder object 732.

In other instances, however, in which requested device data (or device parameters) is not stored in the device placeholder object 732 (as it may relate to non-configuration data collected by or generated by the field device based on actual operation of the field device), the communication interface 782 may access a simulation response block or module 784 that may provide a simulated response for the field device to simulate the operation of the field device. The simulation response block or module 784 may be specific to the commissioning process and may thus be part of the commissioning application 738 or may be provided as part of the asset object system 730 if desired. Such simulated responses may be provided by a user or a testing system, may be stored in a simulation file created for testing and commissioning purposes, may be generated on the fly, or may be provided in other manners. This simulated device response (which may be a simulated value for a device state, a device measurement, a device parameter, etc.) is provided to the execution engine 780 as if this value were a value or signal returned from the field device itself. This simulated response thereby enables further testing of the control module 710B based on predefined device responses. Generally speaking, the simulation block 784 may be configured to make the device placeholder object 732 look like a smart object or appear to be capable of providing actual device responses back to the requesting module (i.e., the module being tested). However, in the normal case, the communication interface 782 is simply using the simulation block 784 to mimic operation of the device defined by the device placeholder object in some known manner for testing purposes only. Moreover, the communication interface 782, which may also be part of the commissioning application 738 or the asset object system 730, may test communication requests from the modules being tested by the execution engine 780 against the configuration data stored in the device placeholder object 732 for proper format, context, syntax, I/O addressing or other I/O specific parameters, etc. as needed by the actual device or the I/O channel that connects to the device, to assure that, in the actual plant, the communication request would work for its intended purpose if this request were sent to and reached the actual device to which it was being sent. Of course, if there is an error in any of these communications, for example, because the device placeholder object configuration data does not match or conform to the request from the control module 710B, the communication interface 782 or the execution engine 780 may generate an error indication, indicating that there is a configuration or other type of error or problem within the function block or module being tested. Such an error indication may be provided to a user via a user interface associated with the testing system or with the commissioning application 738.

In another embodiment, the commissioning system 770 may operate to test modules, such as control modules, by downloading these control modules into a process controller 762 or other computing device that will actually implement these modules during operation of the plant and then executing these modules in the process controller to test the modules. In this case the processor of the controller 762 may operate as the execution engine 780 of FIG. 7C. However, the output of the controller 762 that is normally connected to the field devices via an I/O device in the I/O network 763 may be connected (physically or electronically) to a communication interface 782 that is up within the back-end environment 700, such as within the commissioning application 738. Typically the controller 762 may be undergoing a bench test in this scenario, or if the controller 762 is installed in the plant, a separate shunt connection may be provided from the field side communication port of the controller 762 to the network 760 of FIG. 7B, for example, or to a handheld device that may execute the commissioning application 738, Thus, in this case, the field side facing communication port of the controller 762 may be looped back to the back-end environment 700 to connect to the communication interface 782 which takes the output of the controller 762 and uses this output to access the appropriate device placeholder object 732 as stored in the asset object system 730. The interface 782 may then perform configuration, format, syntax, I/O channel property, etc., testing on the communication using the appropriate device placeholder object 732 (based on, for example, the system tag of the communication request) as described above, and/or may engage the simulation object 784 to produce a simulated device response, which can be provide back to the field side communication port of the controller 762 as if this response came from an actual field device connected to the controller 762. Likewise, in the case of an error or problem with the communication because of some configuration error, the communication interface 782 may inform the commissioning application 738 of the problem, and so inform the user of a commissioning error. Of course other types of modules, applications, programs, user interfaces, etc. may be instantiated and downloaded to other computing devices, such as workstations, databases, servers, etc. in the back-end environment 700, and be tested in the same manner.

I/O Binding

When the device placeholder objects 732 have been completely filled out or configured (but are still in an I/O unallocated device state) and the other commissioning activities have been performed, for example, the applications 710A, 712A, 714A have used those device placeholder objects 732 to test various ones of their modules, applications, objects, models, etc., the device placeholder objects 732 will include sufficient information to uniquely define each of the field devices in the plant. One of the final stages of the commissioning process is to then bind the field devices 764 in the field equipment environment 122 with the controllers 762 and other equipment within the back-end system 700 by allocating or assigning the field devices 764 and other field equipment to specific components of the I/O network 763. This binding, which is referred to herein as "I/O binding," can occur after the field devices 764 are physically connected to the I/O network. As part of this binding process, the commissioning system must match up the device placeholder objects 732 (created in the back-end system 700) with the actual field devices to which they pertain to determine an I/O communication path that enables the components in the back-end system 700 to communicate with the actual field devices, and vice versa. It is important to remember, however, that on the field equipment side 122 of the plant network, device placeholder objects 300 may have been created for each of the field devices and/or signal tags associated with the field devices, and that these field equipment device placeholder objects 300 are stored somewhere down within the field equipment environment 122, such as within one of the I/O network devices, within one of the I/O cards, within the field devices themselves, etc. Moreover, in theory, because commissioning activities have been taking place from both ends (the back-end environment 700 and the field equipment environment 122) using the device placeholder objects on both sides, the information within respective corresponding pairs of placeholder objects should be the same (i.e., the information stored in the two placeholder objects for a particular field device or field device signal should match each another exactly). Put another way, the field device configuration information as stored in the field devices themselves and as possibly stored in the device placeholder objects created within the field environment should match the configuration information stored within the device placeholder objects 732 in the back-end system 700. However, such a condition is not guaranteed, and so there may be discrepancies between the information in the two device placeholder objects for a particular field device or field device signal (referred to herein as the back-end device placeholder object and the field equipment device placeholder object). This situation needs to be addressed when the field devices are actually bound to and allocated within the I/O network 763 because the various commissioning activities performed separately in the back-end system 700 of the plant and in the field environment 122 of the plant may have then been performed using different field device and I/O channel configuration information, which could lead to operational errors or problems.

Figure 8:
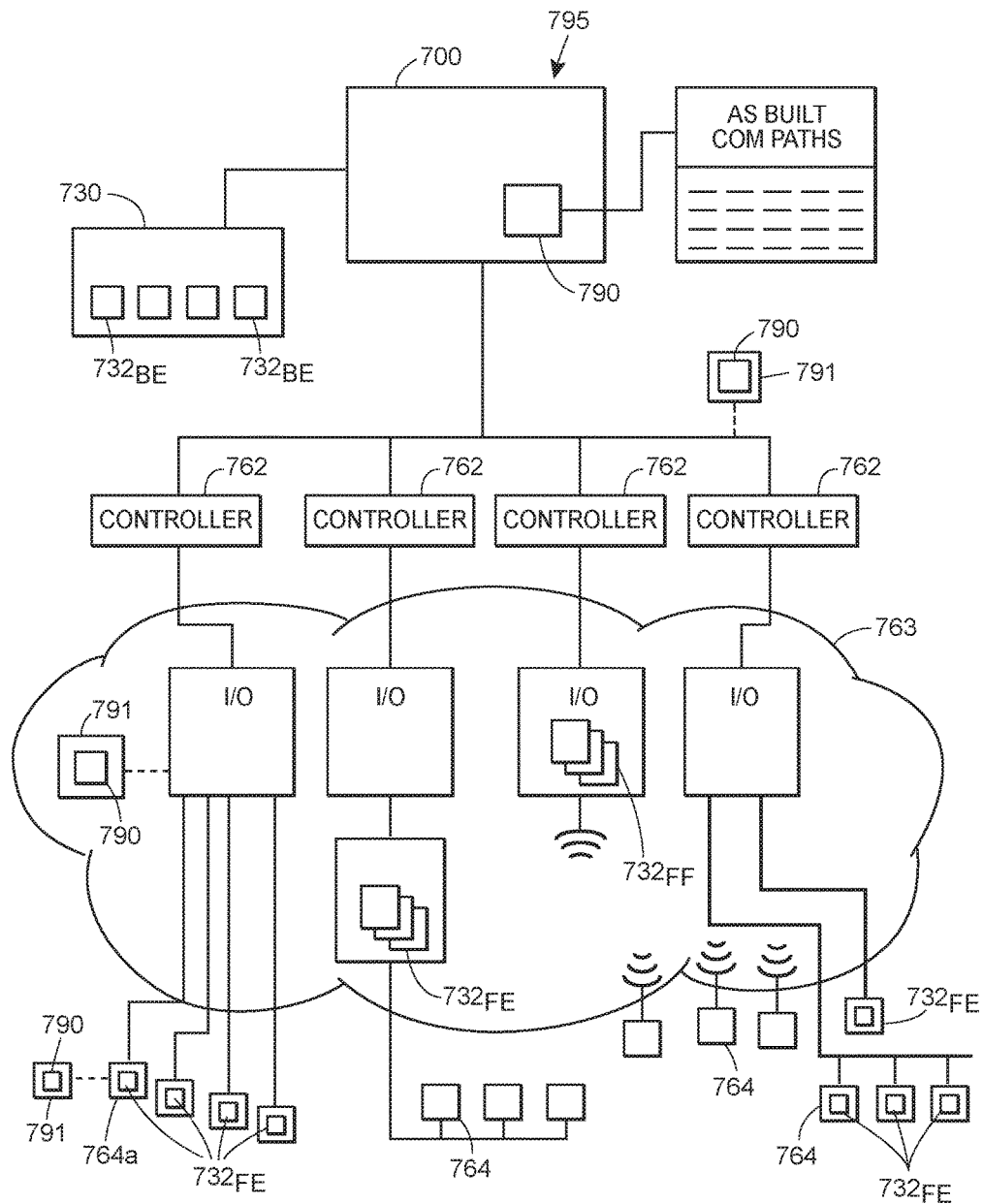
FIG. 8 depicts a binding application and system used in the commissioning of a process or industrial plant to bind objects in the back-end system of the plant with the field equipment in the plant via established I/O networks.

FIG. 8 illustrates a system and methodology of I/O binding, e.g., binding the field devices 764 through the I/O network 763 to the controllers 762 and other devices within the back-end system 700, in order to complete commissioning of the process plant. Generally speaking, a binding tool 790 may be stored somewhere in the back-end system 700, such as in a device on the communication network 760 of FIG. 7B, and/or somewhere in the field equipment environment such as in one of the field devices 764, in one of the I/O network devices 763, in a handheld or portable device 791 connected to one of the field devices 764 or to one of the I/O network devices in the I/O network 763. Generally speaking the binding tool or application may be used to initiate binding of the plant or of particular field devices within the plant to the controllers 762 and other devices in the back-end system 700, which may be the back-end system 125 of FIGS. 2A and 2C.

More particularly, as illustrated in FIG. 8, the back-end system 700 is illustrated as a block 795, which may include various ones of the computers, databases, etc., stored within the back-end system 700 described in FIGS. 7A-7C. The devices in the block 795 are connected to various controllers 762 which, in turn, are connected through the, at this point, unallocated I/O network 763 to various ones of the field devices 764. In particular, the I/O network 763 may include various standard I/O devices or cards and terminals, CHARM-based I/O devices or modules, and/or any of the other I/O network devices illustrated and described with respect to, for example, FIGS. 2A and 2C. Importantly, as illustrated in FIG. 8, there are now two sets of configuration information for each of the field devices 764 or other field assets, including the configuration information stored in the field devices themselves (as configured) and/or in the device placeholder objects for each field device and/or device signal of a field device stored within the field environment of the plant 5, and the configuration information stored in the device placeholder objects 732 in the back-end environment 700. In particular, in the back-end system 700, the asset object database 730 stores a device placeholder object $732_{BE}$ for each of the field devices and field signal tags (associated with more complex field devices), while in the field equipment side 122, a device configuration (which may or may not be a device placeholder object) $732_{FE}$ is stored within the field devices themselves or somewhere within the I/O devices of the I/O network 763 for each of the field devices and field device signals. As will be noted, the device placeholder objects created in the back-end system 700 are referred to as objects $732_{BE}$, and the field device configuration information or objects created for field devices and stored in the field equipment environment 122 are referred to as objects $732_{FE}$.

During the I/O binding process, the binding application 790 performs binding actions to bind the back-end system 700 with the field equipment 764 via the I/O network 763. The binding application 790 may be implemented within a device connected to the back-end system 700, such as in a back-end user interface device, a controller 762, a handheld device connected to the network 760, or the commissioning application 738, or the binding application 790 may be implemented in a device in the field equipment environment, such as in one of the field devices 764, one of the I/O network devices of the I/O network 763, or in a handheld or portable device 791 that may be connected to a field device 764 or to an I/O device in the I/O network 763, such as an I/O card or other portion of the I/O network 763. This portable and typically removable connection is illustrated in FIG. 8 with a dotted line. Thus, the binding actions described herein may be initiated from either the field equipment side 122 or from the back-end equipment side 700 to perform binding of the field equipment 764 to the back-end system 700 through the I/O network 763.

Moreover, the binding application 790 may perform binding for the entire plant network at one time or may perform binding for limited parts of the plant or a plant network, such as for a single device, for sets of devices connected to a particular I/O card or network, for sets of devices connected to a particular controller 762 or any other combination of devices. To perform this action, the binding application 790 may provide a user interface that enables a user or commissioning personnel to limit the binding activities that takes place to various ones of the field devices 764 and/or controllers 762 and/or I/O devices in the I/O network 763, in order to limit the actual binding that occurs to a subset of all of the field devices or field equipment in the plant. Limited and controlled binding is preferable when, for example, a new field device 764 is added to an existing I/O network 763 that has already been bound, a new controller 762 is added to the plant, a new or different I/O device is added to or substituted for another device in the I/O network 763 of the plant, etc., to prevent having to rebind all of the other non-effected field devices that are already bound within the network in these situations.

In any event, during binding, the binding application 790 communicates through the device to which it is connected either up from the field equipment side to the back-end system 700 or down from the back-end system 700 (e.g., from a controller 762) to auto-sense the devices to which that device is connected. Thus, generally speaking, the binding application 790 performs a discovery process through the I/O network by detecting a first device, and then autosensing each of the further devices communicatively connected to the first device to determine a communication path to each of the further devices through the first device, and repeating this process until all of the devices connected to the first device are found or until a particular device for which the binding application 790 is attempting to bind is found. The binding application 790 may repeat this discovery process for any number of devices and may perform the process in either or both directions (e.g., from the controller side down through the I/O network to the field devices or from the field device side up through the I/O network to the controllers). Moreover, this discovery process may take place via wired or wireless device connections, or both, and may use the autosensing capabilities (protocols, commands, etc.) of the devices or communication protocols of the as-connected devices and networks within the plant.

In particular, if the binding application 790 is implemented from the back-end system 700, the binding application 790 may attempt to communicate through a controller 762A of FIG. 8 and auto-sense all of the I/O cards connected to that controller 762A. Such I/O cards may be standard I/O cards or dumb cards, may be configurable I/O cards such as CHARM I/O cards, etc. (This communication may take place via wired I/O networks or wireless I/O networks as illustrated schematically in FIG. 8). Moreover, the binding application 790 will store a list of "as connected" devices identifying each of the auto-sensed or detected I/O cards or other I/O equipment, including the various ports, addresses, etc., at which these devices are connected to the controller 762A. Thereafter, the binding application 790 may go down (or up) to the next level of devices in the I/O network 763 to detect the particular devices, ports, addresses, terminal blocks, etc. at which each of the next level of devices is connected and may auto-sense each of these devices and their as configured connections. Thus, for a particular controller 762A, the binding application 790 may identify each I/O card connected to the controller 762A and may then auto-sense the devices connected to each terminal block of each of those I/O cards. In the case of smart- or CHARM-I/O cards, the I/O cards may tell the controller 762A which devices are connected to which terminals of the card or the device addresses or signal paths below the cards. For example, in a typical I/O case, such as that illustrated in the system of FIG. 1, the binding application 790 may cause a controller to communicate through an I/O card and provide communications through a particular port or terminal block of the I/O card to auto-sense the device connected to that terminal block. In that case, the binding application 790 will detect a field device, for example, or other field asset connected to a particular terminal block of an I/O port of an I/O card, and the application 790 will then identify the signal path needed to reach the field device. The binding application 790 may then communicate with the field device, asking the field device to identify itself and provide information regarding its identity. In other cases, the binding application 790 may reach an I/O network device, such as a smart- or CHARM-I/O network card, which may be able to provide information regarding each of the devices below that network card and the terminals or ports to which they are connected at the I/O card to the application 790. In any event, the application 790 cycles through each of the ports, terminals, and connections of each of the I/O network elements and sub-elements until the application 790 gets to a level at which it finds some information regarding the field devices connected through that I/O connection port, terminal, etc.

In some cases, the binding application 790 will detect when it reaches a device that has one or more field side configuration objects therein (such as a device placeholder object $732_{FE}$ stored in an I/O device providing field device configuration information for a field device connected to the I/O device or configuration information $732_{FE}$ stored in an actual field device 764), and will ask for the system tag of the field device or for other identifying information of the field device associated with the configuration object or file. The configuration object or information on the field equipment side will identify the as-configured field asset associated therewith, e.g., by the asset's system tag. As noted above, the field device configuration information may be stored in the field devices themselves or may be stored in field equipment device placeholder objects which may be stored in, for example, an actual field device or may be stored in an I/O card or a database stored within the I/O network. In any event, when the application 790 detects such field device configuration information such as a device placeholder object, the application 790 goes to the database 730 to find the corresponding back-end system device placeholder object corresponding to that same system tag or field device, and then matches those two sets of configuration information. In the preferred case, the information within the two device placeholder objects will match exactly, at the higher levels at least, and at this point the binding application 790 can provide the I/O path connection information necessary to reach that device to the device placeholder object $732_{BE}$ in the back-end system 700 (as well as to the field device configuration information in the field device or in a field equipment device placeholder object $732_{FE}$) to thereby enable future direct communications with those devices from either side. Additionally, in this case, the binding application 790 may set the device placeholder objects (both of them if two exist) for a field device into an I/O allocated device state meaning that the actual I/O network connection path information is stored within the device placeholder objects or within the field device configuration itself, and this communication path information may be provided to other objects, modules, applications, and programs that communicate with the device placeholder objects or that use the device placeholder objects to perform communications via the I/O networks in the plant. This communication path information may also be stored in the configuration database 716 and provided to other objects in the plant, such as the modules, applications, programs, etc. of the systems 710, 712, 714. Similarly, if the binding application 790 is initiated from the field equipment side of the plant, the binding application 790 goes up through the devices within the I/O network 763, until it finds a controller 762. The binding application 790 may then have the controller 762 communicate with the database 730 to find the device placeholder object $732_{BE}$ associated with the devices for which the binding is to take place, to thereby enable the application 790 to detect and compare the two sets of device configuration information for each field device or field asset at the field equipment side.

Of course, in some instances, the information within the corresponding pair of configuration memories (e.g., two device placeholder objects or the configuration information of a field device and a back-end device placeholder object $732_{BE}$) may not be the same or may be misconfigured in some manner. In that case, the binding application 790 will include a rule or policy database that enables the application 790 to perform binding when the information in the device placeholder object $732_{BE}$ does not match the configuration information for the corresponding field device in the field equipment side of the plant, i.e., when the two sets of configuration information for a particular device or device signal differs. In some cases, a rule or policy in the rule or policy database may indicate that the back-end device placeholder object $732_{BE}$ is the correct information (or is to be the master object), and that the information of the master device placeholder object on the back-end side is to be provided to or stored within the field device or in the field equipment device placeholder object $732_{FE}$ for the field device In other cases, the rule or policy may indicate that the field equipment device configuration information, such as the configuration information within a field device or within a placeholder device placeholder object $732_{FE}$ is controlling or is the master object and then the binding application 790 copies the field equipment device configuration information as stored in the field equipment side of the plant into the back-end system device placeholder object $732_{BE}$. In some cases, however, the rule or policy may enable or require a user to become involved in the conflict, and require the user to decide which information is actually correct, and thus which information to use within both of the device placeholder object $732_{BE}$ and the configuration fields or memory within the field equipment side of the plant. Such a rule or policy may force an alarm or alert to be sent to the user via a user interface from the binding application 790, telling the user of the different information between the two sets of device configuration objects, thereby allowing the user to provide a decision as to which one includes the correct information to be stored in both locations. Of course, other rules or policies may be used, and the rule or policy to be used in any particular instance may be configurable from system to system. Thus, the conflict resolution procedures performed by the binding application 790 may be configurable. Moreover, in some cases, empty or non-configured fields of one of the sets of configuration information may be filled out based on the configuration information within the other set. Thus, if a particular device placeholder object $732_{BE}$ does not include values for some of the configuration fields therein, the values as stored in the field device or in a placeholder object $732_{FE}$ for the field device may be copied into the empty fields of the back-end device placeholder object $732_{BE}$. Of course, configuration information may be copied from the back-end devices placeholder objects $732_{BE}$ to the configuration memories of the field device or a device placeholder object $732_{FE}$ associated with the field device.

Thus, reconciling a detected difference between the information stored in the back-end device placeholder object for a field device and the configuration information for the field device as stored in the field equipment side of the plant may include storing configuration information that is stored in a first one of these configuration memories into the second one of these memories when the second one of these memories, or various fields thereof, does not have any configured information stored therein. Likewise, reconciling a detected difference may include automatically storing configuration information that is stored in a first configuration field of the device placeholder object $732_{BE}$ for the field device that is stored in the back-end environment into a first configuration field of the configuration memory (such as a device placeholder object) for the field device that is stored in the field environment when the information in the first fields of these configuration memories does not match. Still further, reconciling a detected difference may include automatically storing configuration information that is stored in a first field of a configuration memory for a field device stored in the field environment into the first field of the device placeholder object $732_{BE}$ for the field device that is stored in the back-end environment when the information in the first fields of these configuration memories does not match. Additionally, reconciling a detected difference between the configuration information may include generating a message to a user that a difference in the stored configuration information exists between the two sets of configuration information, and may include enabling a user (via a user interface of the binding system) to specify information as to the manner of how to resolve the detected difference between the two sets of configuration information. Thus, for example, the binding system may include a memory that stories a set of rules as to how to resolve a conflict between detected differences in configuration information, and the binding system may enable a user to configure which rule or rules to use to resolve a conflict between detected differences in the configuration information for a particular field device, unit, area, etc. of a plant. In any event, binding the field device to the process controller may include storing the detected communication path associated with the field device in a configuration memory by storing the detected communication path in one or both of the field device configuration memory of the field device or of a device placeholder object $732_{FE}$ in the field environment and in the device placeholder object $732_{BE}$ in the back-end environment.

When the conflict in device placeholder object information is resolved, and both of the device placeholder objects for a particular field device are the same, the I/O network path or communication path information may be stored in both of the configuration memories, such as in both of the device placeholder objects for the field device, and this path may be provided to and used by other applications, programs, etc. to perform communications. Moreover, the binding application 790 may put either or both (if two exist) of the device placeholder objects in the I/O allocated device state. Thus, thereafter, these device placeholder objects may be used to inform other entities, such as modules, applications, programs, etc. within the back-end environment 700, of the actual I/O allocation of each of those field devices to be used during operation of the plant and thus of the communication path through the I/O network 763. Moreover, this information may be stored in the configuration database 716. The storing of this allocation information in the configuration database 716 and in each of the devices modules, systems, etc. that need that information enables the network devices to actually communicate with one another from the back-end to the field equipment and vice versa, using the actual allocated I/O signal paths as detected and configured by the binding application 790. Moreover, at this point, the device placeholder objects may be set into the I/O allocated device state, indicating that the field devices are actually allocated in the plant and thus that communications may take place between the field side and the back-end side via normal communication channels using the determined device allocations and signal paths. In some cases, after binding occurs, the device placeholder objects may be discarded, erased, or simply unused (i.e., when set in the I/O-allocated device state). Moreover, if desired, the binding application or system 790 may take other binding actions to bind a field device to a process controller, such as instantiating and/or downloading a control module to the process controller, wherein the control module communicates with the field device during operation of the control module. The binding application or system 790 may also or instead instantiate and/or download other modules, applications, programs, user interfaces, etc. that will communication with the bound field devices to other computer devices in the plant, such as to workstations, servers, handheld or portable devices, etc.

Automatic Loop Test

After components and portions of a process control loop have been commissioned (e.g., at different geographical locations, such as by way of the techniques described herein), a process control loop(s) may be tested in its entirety by performing a "loop test." The smart commissioning techniques described herein include the performance of an automatic loop test (at times also referred to herein as an "automated loop test") that, unlike conventional loop tests, does not require an operator in the back-end environment 125 to coordinate with an operator in the field environment 122 to inject various inputs and/or generate various conditions and/or states at the process control loop. Instead, by way of the techniques below, a single operator may perform a single operation (e.g., providing an indication that an automatic loop test is to be initiated) in order to perform loop tests of some or all of the otherwise commissioned process control loops. In other implementations, the automatic loop test may be initiated without any operator providing any user input, as further discussed below. As still further discussed below, in some implementations, an automatic loop test may additionally or alternatively be performed at any suitable or desired time, including after the process control loop has been commissioned and has been operating in real-time (in some cases also referred to herein as "run-time" or "on-line"). For instance, an automatic loop test may be performed intermittently as desired after the process control loop has been operating in run-time in order to ensure continued performance of the process control loop as desired.

Figure 9A:
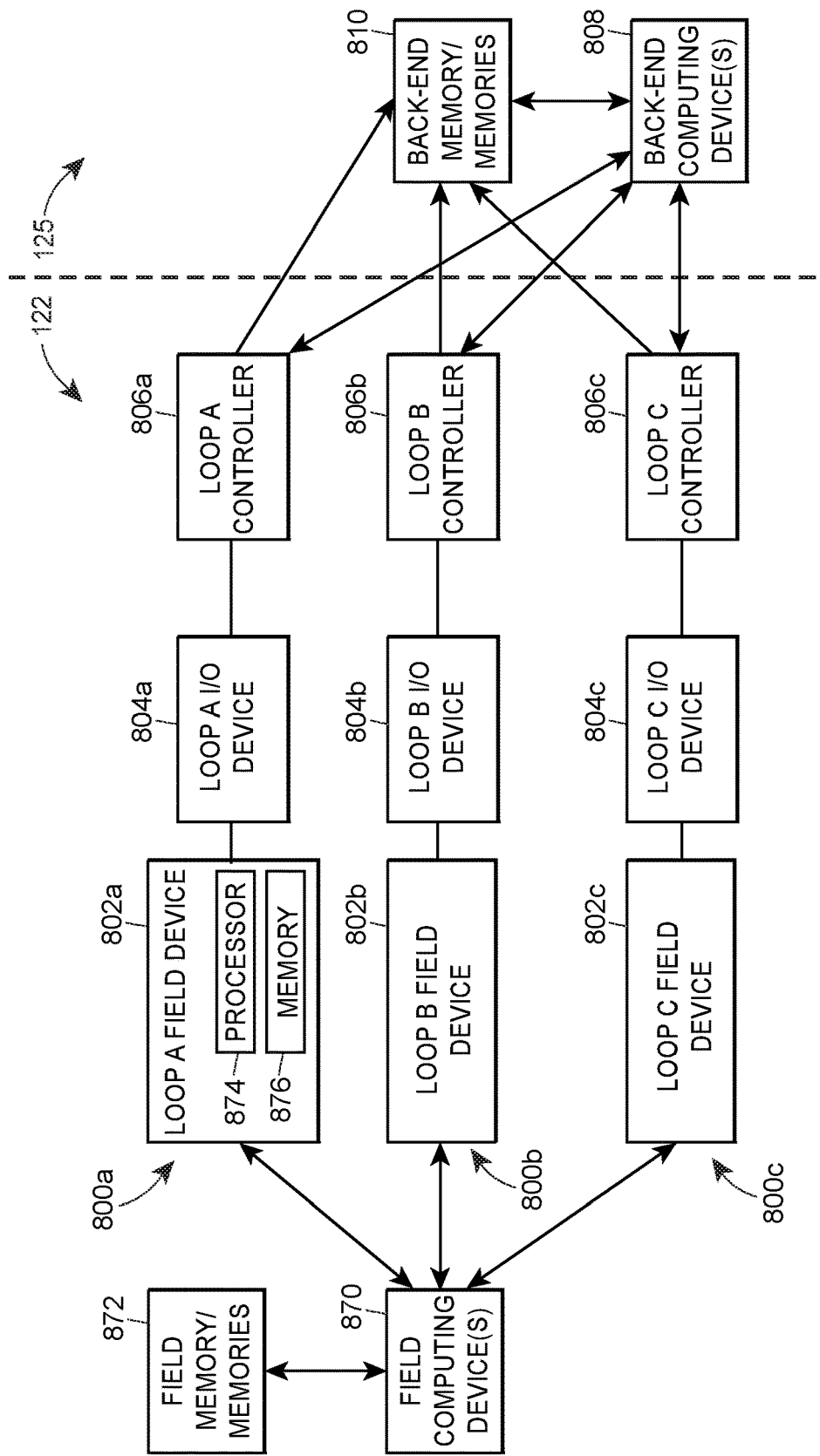
FIG. 9A illustrates a block diagram depicting example process control loops, one or more of which may be tested by the automatic loop test techniques described herein.

FIG. 9A illustrates a block diagram depicting example process control loops 800a-800c, one or more of which may be tested by the automatic loop test techniques described herein. Of course, any suitable number of process control loops 800 may be included in the field environment 122. As shown in FIG. 9A, the process control loops 800a-800c include respective field devices 802a-802c, respective I/O devices 804a-804c, and respective controllers 806a-806c. As will be appreciated from the teaching and disclosure herein, in various implementations, one or more of the process control loops 800 is or includes components of one or more of the process control loops 100 shown in FIGS. 2A and 2C. In various implementations, as discussed below, the automatic loop test techniques include causing the field devices 802a-802c to operate in various test states, e.g., by injecting or supplying test input signals to the field devices 802a-802c, and determining, based on resulting signals generated by the controllers 806a-806c and/or other resultant behaviors of the process control loops 800a-800c, whether or not each of the process control loops 800a-800c operates as required and/or expected.

Each of the field devices 802a-802c may be any suitable smart or legacy field device, and each of the I/O devices 804a-804c may be or include any suitable I/O component or components such as a legacy I/O card, CIOC and CHARM, WIOC, safety information system Logic Solver, etc., as further discussed hereinabove. As shown in FIG. 9A, the process control loop 800a and components thereof are referred to as "Loop A" or as components of "Loop A." "Loop B" and "Loop C" similarly refer to the process control loops 800b and 800c respectively and to components thereof. Thus, for example, FIG. 9A illustrates the I/O device 804a as the "Loop A I/O Device."

FIG. 9A also illustrates one or more back-end computing devices 808 that are disposed in the back-end environment 125 and which may be utilized for automatic loop testing. For ease of readability, the one or more back-end computing devices 808 are at times referred to herein in the singular tense as "the back-end computing device 808," however, it is understood that any suitable number of back-end computing devices 808 may be implemented. In various examples, as further described below, the back-end computing device 808 is utilized for automatic loop testing by, inter alia, causing the field devices 802a-802c to operate in respective pluralities of test states, as described below, and by evaluating respective resultant behaviors of the process control loops 800a-800c. As shown in FIG. 9A, the back-end computing device 808 is communicatively coupled to each of the process control loops 800a-800c via the controllers 806a-806c. Additionally or alternatively, the back-end computing device 808 may be directly communicatively coupled to the field devices 802a-802c (not shown as such in FIG. 9A for simplicity of illustration) so that the back-end computing device 808 causes the field devices 802a-802c to operate in various test states during automatic loop testing as described herein. At least a portion of the back-end computing device 808 may be included in or implemented by the operator workstation(s) 71, the AMS system 132, one or more of the back-end commissioning tools 138a or 138b (which, as noted above, may be a part of the AMS system 132), and/or any other suitable computing device or devices disposed in the back-end environment 125 of the plant 5 and for use in performing the automatic loop testing techniques described herein.

As shown in FIG. 9A, the back-end environment 125 also includes one or more back-end memories 810 coupled to the back-end computing device 808. In some arrangements, such as the arrangement illustrated in FIG. 9A, the one or more back-end memories 810 are communicatively coupled to each of the controllers 806a-806c. The one or more back-end memories 810 store, for example, information indicative of test states that are to be used in the automatic loop testing (e.g., information indicative of input test signals to be supplied to the field device 802*a*, as described herein), results of the automatic loop testing (as further described below), and/or information indicative of acceptable and/or expected resultant behaviors of the process control loop 800*a* respectively corresponding to each input test signal, e.g., generated signals and their expected values and/or value ranges, etc. In an implementation, the centralized database 128 includes at least a portion of the one or more back-end memories.

Figure 9B:
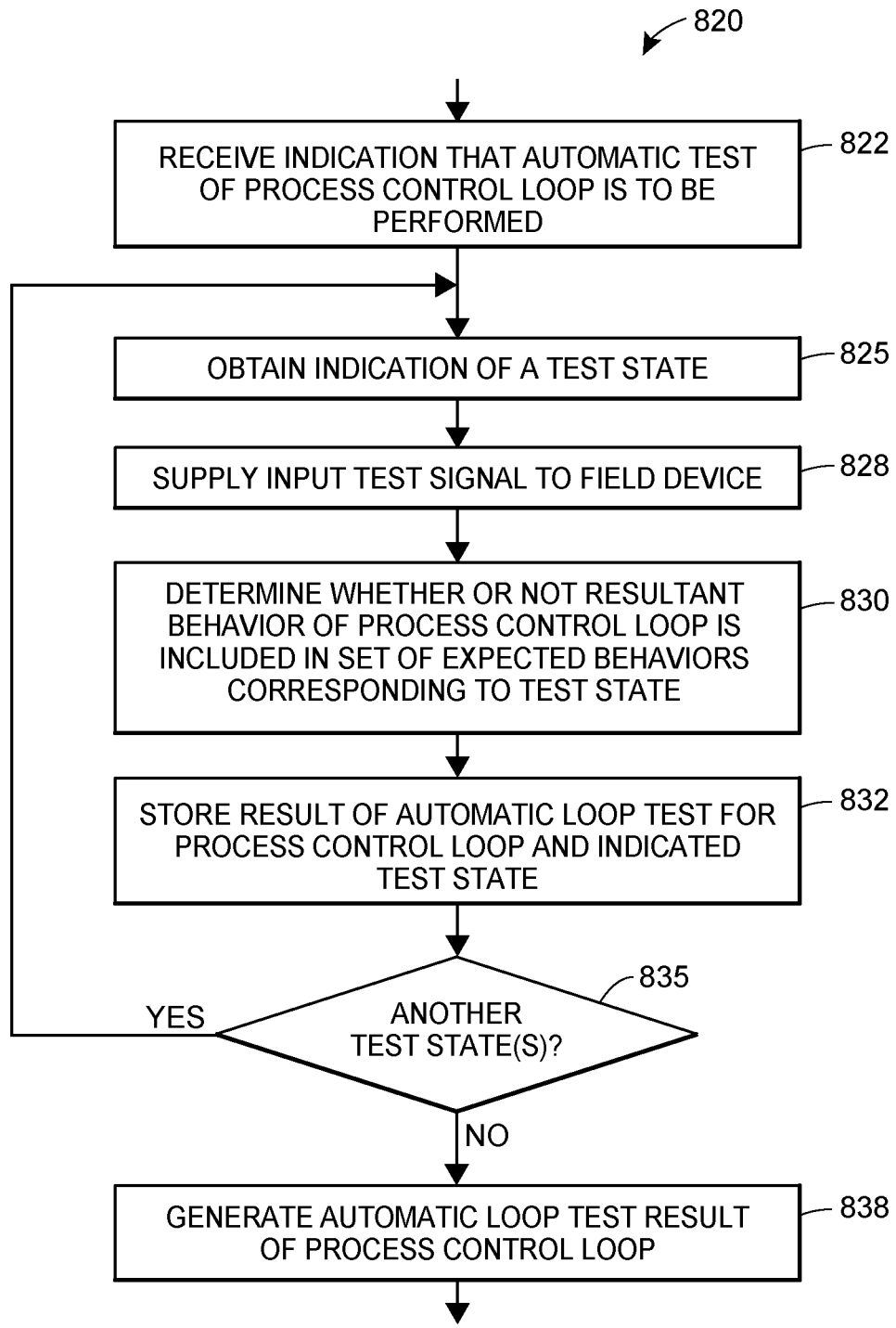
FIG. 9B depicts a flow diagram of an example method for automatically testing a process control loop.

Turning in more detail to the execution of an automatic loop test, FIG. 9B depicts an example method 820 of automatically testing a process control loop, such as the process control loop 800*a* of the process control plant 5. In some implementations, one or more computing devices described above (e.g., the back-end computing device 808 or other suitable computing device or processor) perform the method 820, or at least portions thereof.

At a block 822, the method 820 includes receiving an indication that an automatic test of the process control loop 800*a* is to be performed. In one example, the indication is any suitable user input received via a user interface of the back-end computing device 808 or another user interface. In another example, the back-end computing device 808 receives an indication that the automatic test of the process control loop 800*a* is to be performed exclusive of any user input. For instance, the indication that the automatic test of the process control loop 800*a* is to be performed is automatically generated by another device or application (e.g., another processor or other suitable device, such as one of the computing devices described herein) upon the field device 802*a* being assigned to communicate via the I/O device 804*a* and/or a particular channel of the I/O device 804*a*. In an implementation, the back-end computing device 808 then receives the indication that the automatic test of the process control loop 800*a* is to be performed from the other device or application.

The method 820 also includes, in response to receiving the indication that the automatic loop test is to be performed, automatically causing, exclusively of any user input, the field device 802*a* to operate in each of a plurality of test states. More particularly, at a block 825, the method 820 includes obtaining an indication of a test state for the field device 802*a* (e.g., a first test state of the plurality of test states for the field device 802*a*). In an implementation, the indication of the test state is obtained by the back-end computing device 808 from the one or more back-end memories 810.

At a block 828, the method 820 includes automatically injecting or supplying to the field device 802*a* (e.g., by the back-end computing device 808) an input test signal to cause the field device 802*a* to operate in the indicated test state. For example, in some implementations, such as when the field device 802*a* is a HART® field device, the back-end computing device 808 sends one or more commands in accordance with the HART® communication protocol to the field device 802*a* in order to supply the input test signal, or indicate the input test signal to be supplied, and thereby automatically cause the field device 802*a* to operate in the indicated test state. Similarly, when the field device 802*a* operates in accordance with another industrial protocol, the back-end computing device 808 sends the one or more commands to the field device 802*a* in accordance with the industrial communication protocol of the field device 802*a*.

Continuing as to the block 828, in some implementations, the input test signal is a signal having or indicating a signal strength (also referred to herein as a "signal level") expressed as a percentage signal strength. As just one example, the input test signal has a signal strength expressed as 0%, 25%, 50%, 75%, or 100% of a full signal strength at the field device 802*a* (e.g., across connections between the field device 802*a* and the corresponding I/O device 804*a*). As such, in an implementation, the plurality of input test signals, each of which is supplied to the field device 802*a* as a result of performance of the method 820 as further described herein, includes signals having signal strengths expressed as 0%, 25%, 50%, 75%, and 100% of the full signal strength at the field device 802*a*. The full signal strength at the field device 802*a* is, for example, a maximum signal strength at the field device 802*a* (e.g., a maximum signal strength at a sensor) during normal operation of the field device 802*a*, a maximum signal strength at the field device 802*a* during predetermined conditions corresponding to the signal at the field device 802*a* exceeding the maximum signal strength of normal operation, or any suitable signal strength.

With further reference to the block 828, in some implementations, the input test signal is a signal having or indicating a signal strength expressed in engineering units. As just one example, the input test signal is a signal having a signal strength expressed in units of degrees Celsius, pounds per square inch (PSI), or any other suitable engineering units. For an input test signal having a signal strength expressed in engineering units, in an implementation, the communicative connection of the back-end computing device 808 to the process control loop 800*a* (e.g., to the field device 802*a*, as described above), allows the back-end computing device 808 to appropriately convert or format one or more indications of the input test signal into one or more indications of engineering units. As a result, in an example, the input test signal has a signal strength that is a particular percentage of a maximum signal strength, where the particular percentage in turn corresponds to the indicated engineering units. In various implementations, the indication (or indications) of the engineering units in which the signal strength of the input test signal is expressed is communicated to the process control loop 800*a* so as to cause the field device 802*a* to operate in the test state indicated at the block 825.

At a block 830, the method 820 includes determining, for the test state indicated at the block 825, whether or not a resultant behavior of the process control loop 800*a* is included in a set of expected behaviors for the field device 802*a* corresponding to the test state. In an implementation, the determination described with respect to the block 830 is based upon information stored in the one or more back-end memories 810. In various examples, each one of the plurality of test states in which the field device 802*a* is caused to operate during performance of the method 820 (as further described herein) corresponds to a respective set of expected behaviors of the process control loop 800*a*. Thus, it follows that in some implementations, each one of the plurality of input test signals corresponds to a respective one of the respective sets of expected behaviors of the process control loop 800*a*. Generally speaking, a respective set of expected behaviors in some cases includes a single expected behavior, and in some cases includes more than one expected behavior, which may be expected to occur alternatively or in combination.

For example, in an implementation, the resultant behavior of the process control loop 800*a* may include a respective signal generated by the controller 806*a* in response to the input test signal supplied to the field device 802*a*. For instance, supplying an input test signal to the field device 802*a* that has a signal strength expressed as 25% of a maximum operational signal strength at the field device 802a results in the controller 806a generating a corresponding signal that is 25% of a maximum output signal strength provided by the controller 806a. The signal generated by the controller 806a, in such an instance, is determined to be included in the respective set of expected behaviors corresponding to the test state indicated at the block 825, where the test state indicated at the block 825 corresponds to 25% of a maximum signal strength.

Additionally or alternatively, the resultant behavior of the process control loop 800a is or includes a respective output signal generated by the field device 802a (e.g., as a result of an input test signal supplied to the field device 802a thereby causing the controller 806a to generate a respective input signal that is provided to the field device 802a by way of the I/O device 804a).

With further reference to the block 830, in various implementations, a respective resultant behavior of the process control loop 800a is determined to be included in a respective set of expected behaviors corresponding to one of the plurality of test states when a respective signal generated by the controller 806a (as described above) has an expected value (e.g., expected percentage signal strength), is within an expected range of values (e.g., a range predefined by an operator at the controller 806a, at the back-end computing device 808, or other suitable computing device), and/or meets some other expected criteria, etc. Additionally or alternatively, in another implementation, a respective resultant behavior of the process control loop 800a is determined to be included in a respective set of expected behaviors corresponding to one of the plurality of test states when a respective output signal generated by the field device 802a as a result of a respective input test signal (as described above) has an expected value, is within an expected range of values, meets with some other expected criteria, etc.

It is also noted that a single test state of the field device 802a (e.g., the test state indicated at the block 825) may result in a single or multiple resultant behaviors of the loop 800a. Similarly, an expected set of behaviors corresponding to the single test state of the field device 802a may include a single or multiple expected behaviors of the loop 800a.

At a block 832, the method 820 includes storing the result of the automatic loop test for the process control loop 800a and the indicated test state (i.e., the test state indicated at the block 825). In an example, the result of the automatic loop test as generated at the block 832 is stored in the one or more back-end memories 810. In various examples, the result of the automatic loop test as generated at the block 832 is or includes an indication of whether or not the resultant behavior of the process control loop 800a is included in a set of expected behaviors corresponding to the test state indicated at the block 825. In an example, when the resultant behavior of the process control loop 800a is included in the set of expected behaviors, the result of the automatic loop test of the process control loop 800a indicates a "success" (e.g., proper operation of the process control loop 800a) for the test state indicated at the block 825. Correspondingly, in an example, when the resultant behavior of the process control loop 800a is not included in the set of expected behaviors, the result of the automatic loop test indicates an "out of range" or "failure" (e.g., that the process control loop 800a is not operating properly) for the test state indicated at the block 825. Actual output data (e.g., actual output values) may also be stored in conjunction with the indications, if desired.

At a block 835, the method 820 includes determining whether the process control loop 800a is to be caused to operate in another test state (e.g., whether any test states of the plurality of test states having indications stored in the one or more back-end memories 810 have not yet been implemented as described with respect to blocks 825-832). If the process control loop 800a is to be caused to operate in another test state, the blocks 825-835 are repeated.

If the process control loop 800a is not to be caused to operate in another test state (e.g., it is determined that the field device 802a has been caused to operate in all desired test states of the plurality of test states), then at a block 838, the method 820 includes generating an automatic loop test result of the process control loop 800a (e.g., for all of the plurality of desired test states). For example, the automatic loop test result indicates (i) a first set of test states (e.g., one or more of the plurality of test states) of the field device 802a for which respective resultant behaviors of the process control loop 800a are included in one or more respective sets of expected behaviors corresponding to the test states of the first set of test states, and/or (ii) a second set of test states (e.g., one or more of the plurality of test states) of the field device 802a for which respective resultant behaviors of the process control loop 800a are not included in one or more respective sets of expected behaviors corresponding to the test states of the second set of test states. It will be appreciated from the teaching and disclosure herein that the second set of test states discussed above includes test states for which the automatic loop test indicates an "out of range" or "failure," e.g., test states for which respective resultant behaviors (e.g., controller outputs, field device outputs, etc. as discussed above) were not as expected. The automatic loop test result may additionally include output data (e.g., actual output values) for each test state, if desired.

With continued reference to the block 838, in an example, the automatic loop test result is generated such that information constituting the automatic loop test result (e.g., indications of the first and/or second set(s) of test states as discussed above) may be presented via a user interface of any suitable computing device. For example, the information constituting the automatic loop test result is presented to an operator or other user via a display screen of one or more of the back-end computing device 808. Additionally or alternatively, the automatic loop test result may be transmitted to any desired computing device associated with the plant 5 (such as the operator workstation 71 or the back-end commissioning tools 138), and/or may be stored in any desired data storage, such as the one or more memories 810 or the centralized database 128.

It will be appreciated from the teaching and disclosure herein that in various implementations, automatically causing the field device 802a to operate in each of the plurality of test states exclusively of any user input includes, upon completion of the field device 802a operating in a first test state of the plurality of test states, automatically causing the field device to change between subsequent test states by automatically repeating the blocks 825-835 exclusive of any user input. For example, the back-end computing device 808 repeats the blocks 825-835 until it is determined at the block 835 that no additional test states remain in which to operate the field device 802a. In an implementation, the field device 802a operates in the first test state in response to a user input at the back-end computing device 808, where the user input provides the indication to the back-end computing device 808 that the automatic test of the process control loop 800a is to be performed. However, as will be understood from the discussion above, the field device 802a subsequently and automatically transitions to operating in each of the other tests states without a user instructing the field device 802*a* to do so.

It will be further appreciated from the foregoing discussion that an automatic loop test may be performed, and an automatic loop test result generated, for the process control loop 800*a*. It should be appreciated that descriptions of the automatic loop test of the process control loop 800*a* and the descriptions of actions involving the field device 802*a*, the I/O device 804*a*, and the controller 806*a* are also or alternatively applicable to other process control loops of the process control plant 5. For example, with continued reference to FIG. 9A, in various examples, the automatic loop test further includes respective testing of each of the process control loops 800*b* and 800*c*. In an implementation, the testing of the process control loops 800*b* and 800*c* is performed concurrently with the testing of the process control loop 800*a*. Of course, in various implementations, any suitable number of process control loops (including, for example, additional process control loops not shown in FIG. 9A) are automatically tested concurrently with, sequentially, or distinct in time from automatic testing of other process control loops, and in some examples each process control loop is automatically tested exclusive of any user input causing a respective field device to operate in a respective plurality of test states or exclusive of any user input at all (as described elsewhere herein).

Figure 9C:
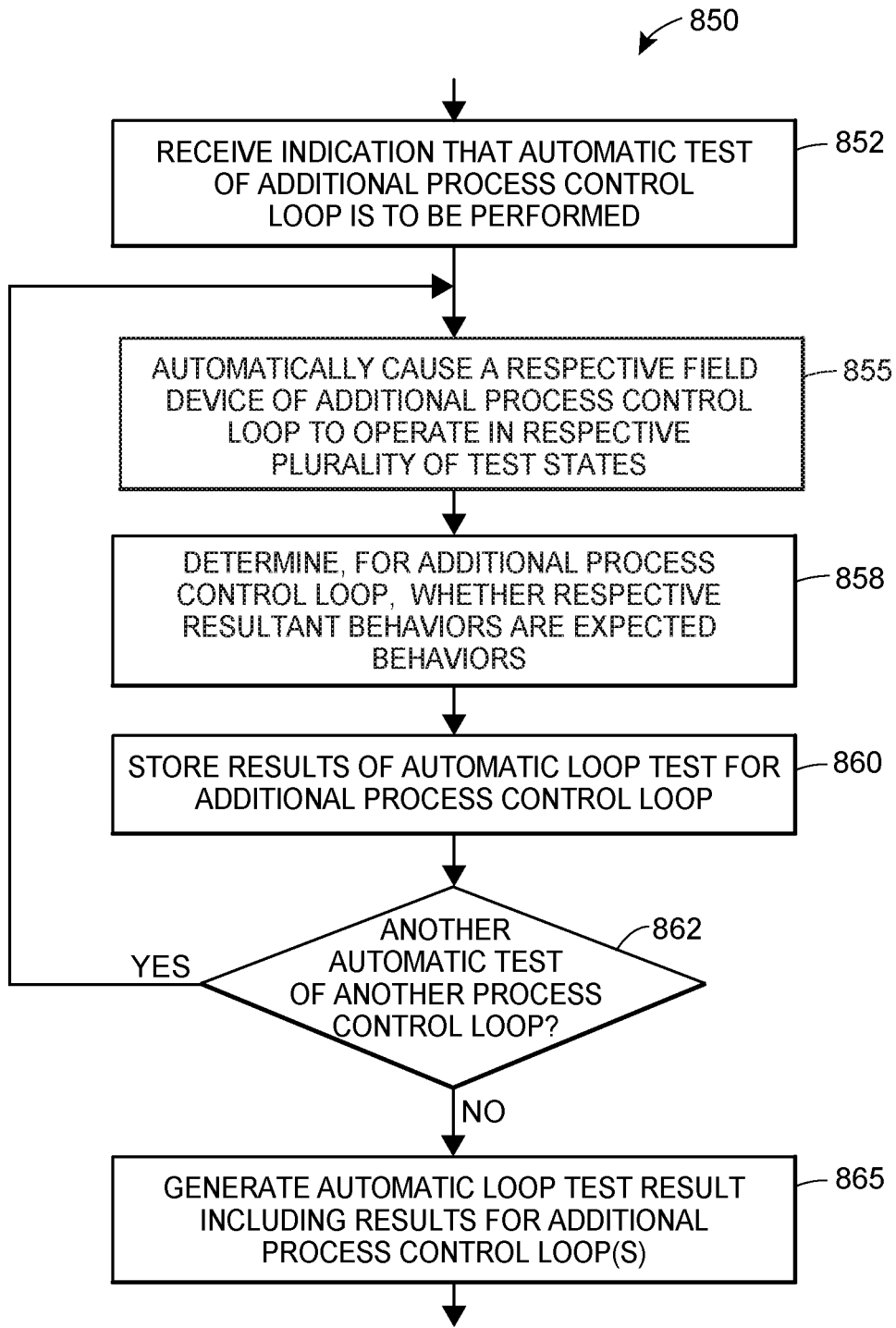
FIG. 9C depicts a flow diagram of an example method for automatically testing multiple process control loops.

With more particular reference to the concurrent automatic testing of the process control loops 800*a*-800*c*, FIG. 9C depicts an example method 850 of automatically testing multiple process control loops, such as the process control loops 800*a*-800*c*. In some implementations, one or more computing devices described above (e.g., the back-end computing device 808 or other suitable computing device or processor) perform the method 850, or at least portions thereof.

At a block 852, the method 850 includes receiving an indication that an automatic test of an additional process control loop (e.g., the process control loop 800*b*) is to be performed. In one example, the indication is any suitable user input received via a user interface of the back-end computing device 808 or another user interface. In another example, the back-end computing device 808 receives a user input to indicate, generally speaking, that an automatic loop test is to be performed (such as described above with respect to FIG. 9B), but the indication that the automatic test of the process control loop 800*b* is to be performed is received exclusive of any user input. For instance, the indication that the automatic test of the process control loop 800*b* is to be performed may be stored in the one or more back-end memories 810, along with indications of any other process control loops (e.g., the process control loop 800*c*) for which an automatic test is to be performed. The stored indication that the automatic test of the process control loop 800*b* is to be performed may be received in response to, or concurrently with, the receipt of the indication that an automatic loop test is to be performed as described with respect to the block 822.

At a block 855, the method 850 includes automatically causing (e.g., by the back-end computing device 808) a respective field device of the additional process control loop (e.g., the field device 802*b*) to operate in a respective plurality of test states, such as in the manner described with respect to FIG. 9B. In some implementations, the respective plurality of test states is a different plurality of test states as compared to the plurality of test states for the field device 802*a*. In such implementations, respective sets of expected behaviors of the process control loop 800*b* are thus also different from the respective sets of expected behaviors of the process control loop 800*a*, and as such, when the process control loops 800*a* and 800*b* test successfully, the respective resultant behaviors thereof are also different among the process control loops 800*a* and 800*b*.

At a block 858, the method 850 includes determining, for the additional process control loop (e.g., the process control loop 800*b*), whether respective resultant behaviors are expected behaviors (e.g., are included in respective sets of expected behaviors) in the same or a similar manner as described with respect to the process control loop 800*a* as described with respect to FIG. 9B.

At a block 860, the method 850 includes storing results of the automatic loop test for the additional process control loop (e.g., the process control loop 800*b*) in the same or a similar manner that results of the automatic loop test for each of the test states with respect to the process control loop 800*a* are stored as described with respect to FIG. 9B. For example, the results of the automatic loop test for the process control loop 800*b* are stored in the one or more back-end memories 810.

At a block 862, the method 850 includes determining whether another automatic test is to be performed for another process control loop (e.g., the process control loop 800*c*). In one example, the determination of whether another automatic test is to be performed is based upon one or more indications stored in the one or more back-end memories 810. If another automatic test is to be performed, the blocks 855-862 may be repeated.

If it is determined that another automatic test is not to be performed (e.g., all process control loops of the process control plant 5 that are desired to be automatically tested have been tested), then at a block 865, the method may include generating an automatic loop test result that includes information corresponding to (e.g., results for) the process control loops 800*b* and 800*c*, in addition to information corresponding to the process control loop 800*a*. In an implementation, the information constituting the automatic loop test result for the process control loops 800*a*-800*c* is presented via any suitable user interface, such as a display screen of the back-end computing device 808. Additionally or alternatively, the automatic loop test result for the loops 800*a*-800*c* may be transmitted to any desired computing device associated with the plant 5 (such as the operator workstation 71 or the back-end commissioning tools 138), and/or may be stored in any desired data storage, such as the one or more memories 810 or the centralized database 128.

With continued reference to the block 865, in an implementation, the automatic loop test result indicates, for each one of the process control loops 800*a*-800*c*, (i) a first set of the respective plurality of test states (e.g., one or more test states of the respective plurality of test states) for which respective resultant behaviors are included in one or more respective sets of expected behaviors corresponding to the first set of the respective plurality of test states, and/or (ii) a second set of the respective plurality of test states for which respective resultant behaviors are not included in one or more respective sets of expected behaviors corresponding to the second set of the respective plurality of test states.

It is noted that while FIG. 9C illustrates sequential determinations of whether automatic loop tests of the process control loops 800*b* and 800*c* are to be performed, it will be appreciated from the teaching and disclosure herein that in various implementations, the determinations of whether such automatic loop tests are to be performed and the subsequent performance of the actions described with respect to FIG. 9C are executed concurrently among the process control loops 800a-800c. That is, in some implementations, the automatic loop testing and generation of the automatic loop test result (and in some cases, the providing of the automatic loop test result as described above) are performed concurrently for multiple process control loops (e.g., the process control loops 800a-800c).

Further, although automated loop testing is described above with respect to the back-end computing device 808 and the one or more back-end memories 810 disposed in the back-end environment 125 of the process plant 5, in some scenarios, automated loop testing is additionally or alternatively performed using computing devices 870 and memories 872 disposed in the field environment 122. In particular, as further shown in FIG. 9A, the field environment 122 includes one or more field memories 872 that store information indicative of test states to be used in the automatic loop testing (e.g., information indicative of input test signals to be supplied to the field device 802a, as described herein), the automatic loop test result, and/or information indicative of acceptable and/or expected resultant behaviors of the process control loop 800a respectively corresponding to each input test signal, e.g., generated signals and their expected values and/or value ranges, etc. In various implementations, such information is stored in the one or more field memories 872 instead of or in addition to being stored in the one or more back-end memories 810. In an implementation, the data files or stores 342 include at least a portion of the one or more field memories 872.

FIG. 9A also depicts one or more field computing devices 870 disposed in the field environment 122 that may be utilized for automatic loop testing instead of or in addition to the back-end computing device 808 being utilized for automatic loop testing (e.g., the one or more field computing devices 870 perform at least some of the actions described elsewhere herein as being performed by the back-end computing device 808). At least a portion of the one or more field computing devices 870 may be included in or implemented by the AMS system 132, one or more of the field commissioning tools 135a or 135b (which, as noted above, may be a part of the AMS system 132), and/or any other suitable computing device(s) disposed in the field environment 122. As shown in FIG. 9A, the one or more field computing devices 870 are communicatively coupled to each of the process control loops 800a-800c via the field devices 802a-802c so that the one or more field computing devices 870 are able to cause the field devices 802a-802c to operate during automatic loop testing as described herein. As also shown in FIG. 9A, the one or more field computing devices 870 are communicatively coupled to the one or more field memories 872. In some configurations, in addition to or instead of being communicatively coupled to each of the process control loops 800a-800c via the field devices 802a-802c, the one or more field computing devices 870 are directly communicatively connected to each of the process control loops 800a-800c via the controllers 806a-806c (not shown as such in FIG. 9A for simplicity of illustration).

In some implementations in the field environment 122, instead of or in addition to the one or more field computing devices 870 and/or the one or more field memories 872 being utilized for automatic loop testing, one or more of the field devices 802a-802c include one or more processors and/or one or more memories that are utilized for automatic loop testing. For example, FIG. 9A depicts the field device 802a as including a processor 874 and a memory 876 which are configured to support automatic loop testing (e.g., to perform at least some of the actions described elsewhere herein as being performed by the back-end computing device 808). In various examples, the field device 802a is any suitable type of smart field device, such as a HART® field device. Additionally or alternatively, in various examples, one or both of (i) the one or more field memories 872 or (ii) the memory 876 store information indicative of test states to be used in the automatic loop testing, the automatic loop test result, and/or information indicative of acceptable and/or expected resultant behaviors of the process control loop 800a respectively corresponding to each input test signal, e.g., generated signals and their expected values and/or value ranges, etc. In various implementations, such information is stored in the one or more field memories 872 and/or the memory 876 in addition to or instead of being stored in the one or more back-end memories 810.

Accordingly, as discussed above, the performance of an automatic loop test advantageously does not require an operator in the back-end environment 125 to coordinate with an operator in the field environment 122 to inject (e.g., supply) various inputs and/or generate various conditions and/or states at a process control loop. Instead, in some implementations, a single operator performs a single operation (e.g., providing an indication that an automatic loop test(s) is to be initiated) in order to perform automatic loop tests of some or all of the commissioned process control loops. In other implementations, the automatic loop test(s) is initiated without any operator providing any user input, as discussed above.

Other Considerations

As discussed above, the smart commissioning techniques described herein significantly reduce the time, personnel, and costs of commissioning a process plant 5. FIG. 10 illustrates a chart 900 that compares the time and resources required to locally commission an example field device (e.g., the field device 102) and/or an example process control loop in which the field device is included (e.g., the process control loop 100) by using traditional commissioning techniques 902 and by using at least some of the smart commissioning techniques 905 described herein. The data shown in the chart 900 was collected during the development and experimental testing of the smart commissioning techniques described herein.

As seen in FIG. 10, the tasks 908a-908g that typically are performed by a user to locally commission a field device include walking up to the physical field device (reference 908a); confirming that the physical field device is the expected device and verify its wiring connections (reference 908b); verifying the identity of the field device, e.g., via a device tag stored in a memory of the field device, and making the device tag available to other systems of the process plant 5, such as process control systems, asset management systems, safety systems, etc. (reference 908c); configuring device parameters 908d; downloading a control module corresponding to the device (reference 908e); performing a commissioning check or test of the device (reference 908f); and generating an as-built loop information indicating the field device (reference 908g). Of course, during device commissioning, more, fewer, substitute, and/or alternate commissioning actions may be performed other than the actions 908a-908g shown in FIG. 10.

Also as seen in FIG. 10, the time in person-hours required to perform traditional commissioning 902 of a field device is shown in the chart 900 for each commissioning action 908a-908g, with a total number of person-hours for traditional commissioning of a field device being two hours and 20 minutes. The time in person-hours required to perform smart commissioning 905 of a field device is shown in the chart 900 for each commissioning action 908a-908g, with the total number of person-hours for smart commissioning being a mere 10 minutes—a reduction of 93% in person-hours needed to configure a single field device. As a process plant may include hundreds, thousands, and even tens of thousands of field devices, each of which must be commissioned before the process plant begin to operate, the resource savings in person-hours (and therefore, financially) are extensive. Moreover, as at least some of the smart commissioning techniques are automatically performed, they are less susceptible to user error and thus are more accurate than traditional commissioning techniques.

It is noted that while the smart commissioning techniques described herein are described with respect to a process control system 5, any one or more of the smart commissioning techniques described herein are equally applicable to a process control safety information system of a process control plant, such as the DeltaV SIS™ product provided by Emerson Process Management. For example, a standalone process control safety system or an integrated control and safety system ("ICSS") may be commissioned using any one or more of the smart commissioning techniques described herein.

Additionally, when implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed:

1. A method of commissioning a process plant, the process plant having a field environment and a back-end environment, and the method comprising:

obtaining, by one or more computing devices disposed in the field environment of the process plant, a first source tag of a physical field device disposed in the field environment of the process plant while the physical field device is in an input-output (I/O)-unallocated state, the first source tag identifying the physical field device, the physical field device to, during run-time of the process plant, perform a physical function and at least one of send or receive, via an I/O device, data corresponding to the physical function to control an industrial process executing in the process plant, and the I/O-unallocated state of the physical field device indicative of the physical field device being unassigned to communicate via any I/O device;

deriving, by the one or more field environment computing devices, based on (i) a first instance of a set of parsing rules that is accessible to the one or more field environment computing devices and (ii) the first source tag, a first system tag that logically identifies the physical field device, the first system tag having a total number of characters different than a total number of characters of the first source tag;

storing the first system tag logically identifying the physical field device in a memory disposed in the field environment of the process plant;

automatically initiating, by the one or more field environment computing devices, one or more commissioning actions at the physical field device in the process plant using the first system tag that logically identifies the physical field device while the physical field device is in the I/O-unallocated state; and subsequent to automatically initiating the one or more commissioning actions at the physical field device:

detecting that the physical field device is in an I/O-allocated state, the I/O-allocated state indicative of the physical field device being assigned to communicate via a particular I/O card;

based on the detection of the physical field device being in the I/O-allocated state, comparing the first system tag of the physical field device stored in the memory disposed in the field environment of the process plant with a second system tag of the physical field device stored in a memory disposed in the back-end environment of the process plant, the second system tag derived or obtained, by one or more computing devices disposed in the back-end environment of the process plant, based on a second instance of the set of parsing rules and a second source tag identifying the physical field device that are accessible to the one or more computing devices disposed in the back-end environment of the process plant; and sending an alert to a user interface when the first system tag and the second system tag corresponding to the physical field device do not match.

2. The method of claim 1, wherein obtaining the first source tag of the physical field device comprises obtaining the first source tag of the physical field device from an asset management system of the process plant.

3. The method of claim 1, wherein obtaining the first source tag of the physical field device comprises obtaining a source tag of the physical field device having a particular format, the particular format based on a user indication.

4. The method of claim 1, wherein obtaining, by the one or more field environment computing devices, the first source tag of the physical field device comprises using an optical interface of the one or more field environment computing devices to scan or read the first source tag of the physical field device.

5. The method of claim 1, wherein obtaining the first source tag of the physical field device comprises obtaining the first source tag from a memory of the physical field device.

6. The method of claim 1, wherein obtaining the first source tag of the physical field device comprises obtaining a unique identifier of the physical field device, the unique identifier being in accordance with the HART communication protocol, the WirelessHART communication protocol, or another industrial communication protocol.

7. The method of claim 6, wherein obtaining the unique identifier of the physical field device comprises:
obtaining a long tag of the physical field device, wherein the total number of characters of the system tag is less than the total number of characters of the long tag; or
obtaining a short tag of the physical field device, wherein the total number of characters of the system tag is greater than the total number of characters of the short tag.

8. The method of claim 1, wherein determining the first system tag of the physical field device comprises determining at least one of a control tag, a device tag, or a device signal tag corresponding to the physical field device.

9. The method of claim 1, wherein deriving the first system tag from the first source tag based on the first instance of the set of parsing rules comprises determining the first system tag based on at least one of a truncation of the first source tag, a deletion of one or more characters from the first source tag, an addition of one or more characters to the first source tag, a combination or manipulation of at least some of the numerical characters included in the first source tag, or another technique for modifying a length of the first source tag.

10. The method of claim 1, further comprising configuring the set of parsing rules.

11. The method of claim 1, wherein the one or more commissioning actions using the first system tag of the physical field device while the physical field device is in the I/O-unallocated state includes at least one of:
an automatic generation, using the first system tag of the physical field device, of an as-built I/O list, the as-built I/O list indicating a portion of a process control loop that includes the physical field device and that has been built in the field environment of the process plant, the I/O as-built list for use in one or more other commissioning actions; or
an automatic generation, using the first system tag of the physical field device, of an as-built loop diagram, the as-built loop map descriptive of the portion of the process control loop including the physical field device that has been built in the field environment of the process plant, and the as-built loop diagram for use during a loop check or test of the process control loop.

12. The method of claim 1, further comprising providing the first system tag of the physical field device to another device disposed in the field environment of the process plant to be used in performing another commissioning action including the physical field device and the another device while the physical field device is in the I/O-unallocated state.

13. A system for commissioning a process plant having a field environment and a back-end environment, the system comprising:
a physical field device in an input-output (I/O)-unallocated state and disposed in the field environment of the process plant,
the physical field device to, during run-time of the process plant, perform a physical function and at least one of send or receive, via a port and an I/O device, data corresponding to the physical function to control a process executing in the process plant, and
the I/O-unallocated state of the physical field device indicative of the physical field device being unassigned to communicate via any I/O device; and
one or more processors disposed in the field environment of the process plant and executing a set of computer-executable instructions to cause the system to:
while the physical field device is in the I/O-unallocated state:
obtain a first source tag identifying the physical field device within the field environment,
generate, based on (i) a first instance of a set of parsing rules that is accessible to the one or more processors disposed in the field environment and (ii) the first source tag, a first system tag that identifies the physical field device, the first system tag having a total number of characters different than a total number of characters of the first source tag, and
store the first system tag in a memory disposed in the field environment of the process plant; and
subsequent to the storage of the system tag in the memory disposed in the field environment:
detect that the physical field device is in an I/O-allocated state, the I/O-allocated state indicative of the physical field device being assigned to communicate via a particular I/O card,
based on the detection of the physical field device being in the I/O-allocated state, compare the first system tag of the physical field device stored in the memory disposed in the field environment of the process plant with a second system tag of the physical field device stored in a memory disposed in the back-end environment of the process plant, the second system tag derived or obtained, by one or more processors disposed in the back-end environment of the process plant, based on a second instance of the set of parsing rules and a second source tag identifying the physical field device that are accessible to the one or more computing devices disposed in the back-end environment of the process plant; and
send an alert to a user interface when the first system tag and the second system tag corresponding to the physical field device do not match.

14. The system of claim 13, wherein the first source tag is obtained from an asset management system in communicative connection with the one or more processors disposed in the field environment.

15. The system of claim 13, wherein a particular format of the first source tag is indicated by a user selection.

16. The system of claim 13, wherein the first source tag is obtained via an optical interface in communicative connection with the one or more processors disposed in the field environment.

17. The system of claim 13, wherein the first source tag is stored in and obtained from a memory of the physical field device.

18. The system of claim 13, wherein the memory disposed in the field environment of the process plant into which the first system tag is stored is a memory included in the physical field device.

19. The system of claim 13, wherein the one or more processors disposed in the field environment are included in the physical field device.

20. The system of claim 13, wherein the one or more processors disposed in the field environment are included in at least one of a commissioning tool or portable device used in the field environment to commission a plurality of physical field devices.

21. The system of claim 13, wherein the first source tag is in one of a HART protocol format, a WirelessHART protocol format, or a format of another industrial communication protocol.

22. The system of claim 13, wherein the first system tag is one of a control tag, a device tag, or a device signal tag usable by the back-end environment of the process plant.

23. The system of claim 13, wherein the set of parsing rules includes at least one of a truncation of the first source tag, a deletion of one or more characters of the first source tag, an addition of one or more characters to the first source tag, a combination or manipulation of at least some of the numerical characters included in the first source tag, or another technique for modifying a length of the first source tag.

24. The system of claim 13, wherein the set of parsing rules is configurable.

25. The system of claim 13, wherein:
a first set of one or more commissioning actions including the physical field device is performed using the first system tag while the physical field device is in the I/O-unallocated state; and
a second set of commissioning actions including the physical field devices performed while the physical field device is in the I/O-allocated state.

26. The system of claim 25, wherein the set of one or more commissioning actions includes an automatic generation of a portion of an as-built I/O list in corresponding to respective portion of a process control loop in which the physical field device is included.

27. The system of claim 25, wherein the set of one or more commissioning actions includes an automatic generation of a portion of an as-built loop diagram, the as-built loop diagram including a description of a respective portion of a process control loop in which the physical field device is included, and the as-built loop diagram for use during a check or a test of the process control loop.

* * * * *